United States Patent [19]

Scholz

[11] 4,105,309
[45] Aug. 8, 1978

[54] LOGIC SYSTEM FOR PHOTOGRAPHIC FILM STRIP HANDLING APPARATUS

[75] Inventor: Donald T. Scholz, Wayland, Mass.

[73] Assignee: Polaroid Corporation, Cambridge, Mass.

[21] Appl. No.: 756,412

[22] Filed: Jan. 3, 1977

[51] Int. Cl.² ............................................. G03C 11/00
[52] U.S. Cl. ..................................... 352/130; 352/176
[58] Field of Search ............... 352/130, 166, 168, 176; 242/71.1, 71.2

[56] References Cited

U.S. PATENT DOCUMENTS

| 3,851,958 | 12/1974 | Land | 352/130 |
|---|---|---|---|
| 3,879,116 | 4/1975 | Land | 352/130 |
| 3,941,465 | 3/1976 | Figge et al. | 352/130 |

Primary Examiner—Russell E. Adams
Attorney, Agent, or Firm—Frederick A. Goettel

[57] ABSTRACT

An apparatus for processing and viewing cassette contained film strips automatically in response to the condition of a cassette containing the film strip in accordance with programmed operational modes determined by an electro-mechanical logic system. The logic system enables the use of a single unidirectional electric motor for driving all viewer apparatus components including a programming cam disc between "off", "project" and "process/rewind" positions. A power switch organization brings about energization of the motor upon cassette insertion as well as movement of the logic disc to the off position upon a combination of cassette ejection and rotation of the camming disc to the off position. Motor operation in the process mode is controlled by an electronics system controlled by a combination of the programming disc position and the conductive or non-conductive state of cassette contained contacts which correspond respectively to the unprocessed or processed state of the film strip in the cassette.

8 Claims, 56 Drawing Figures

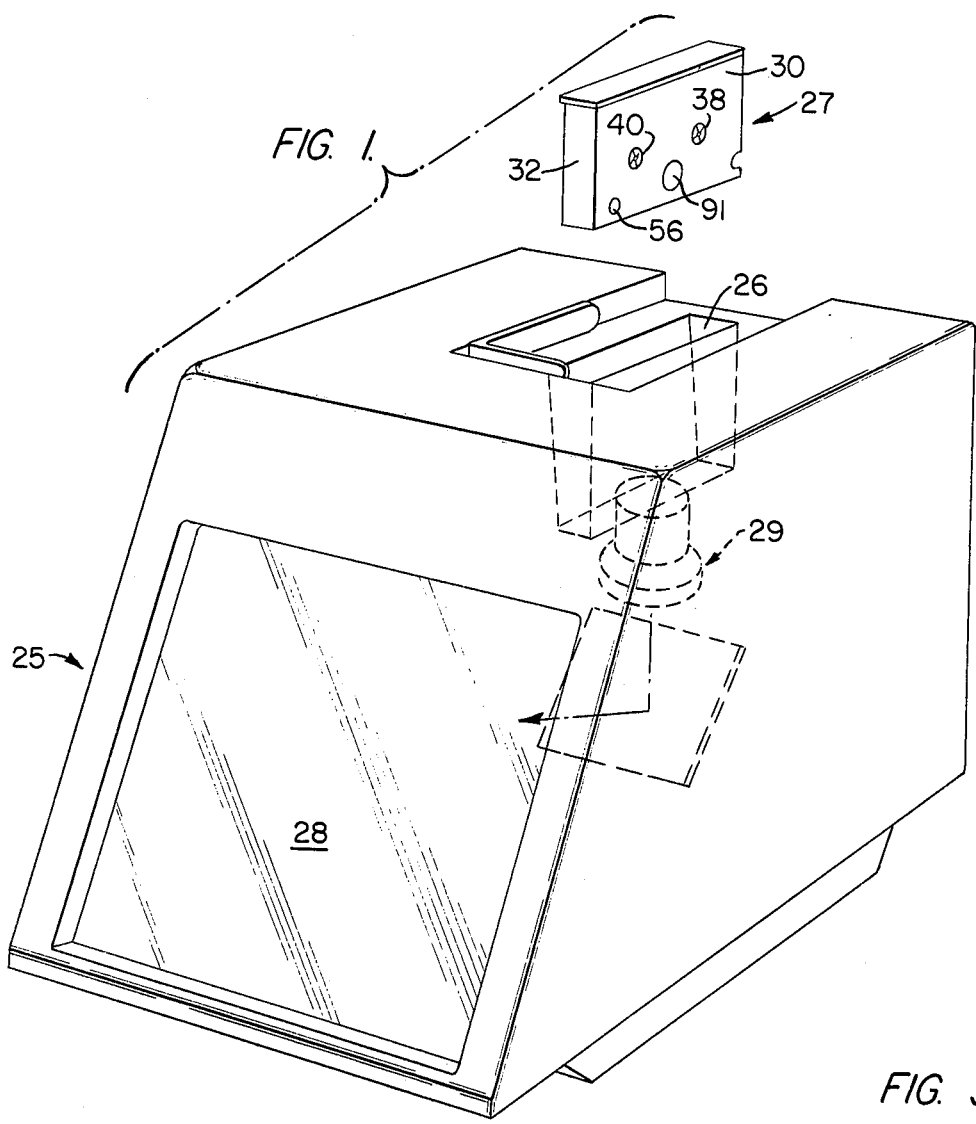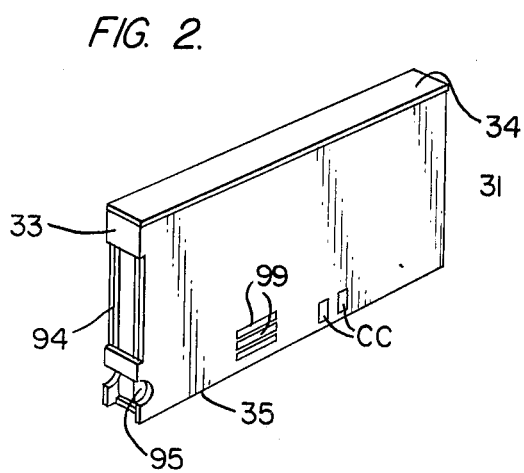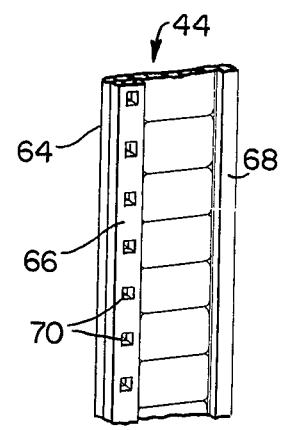

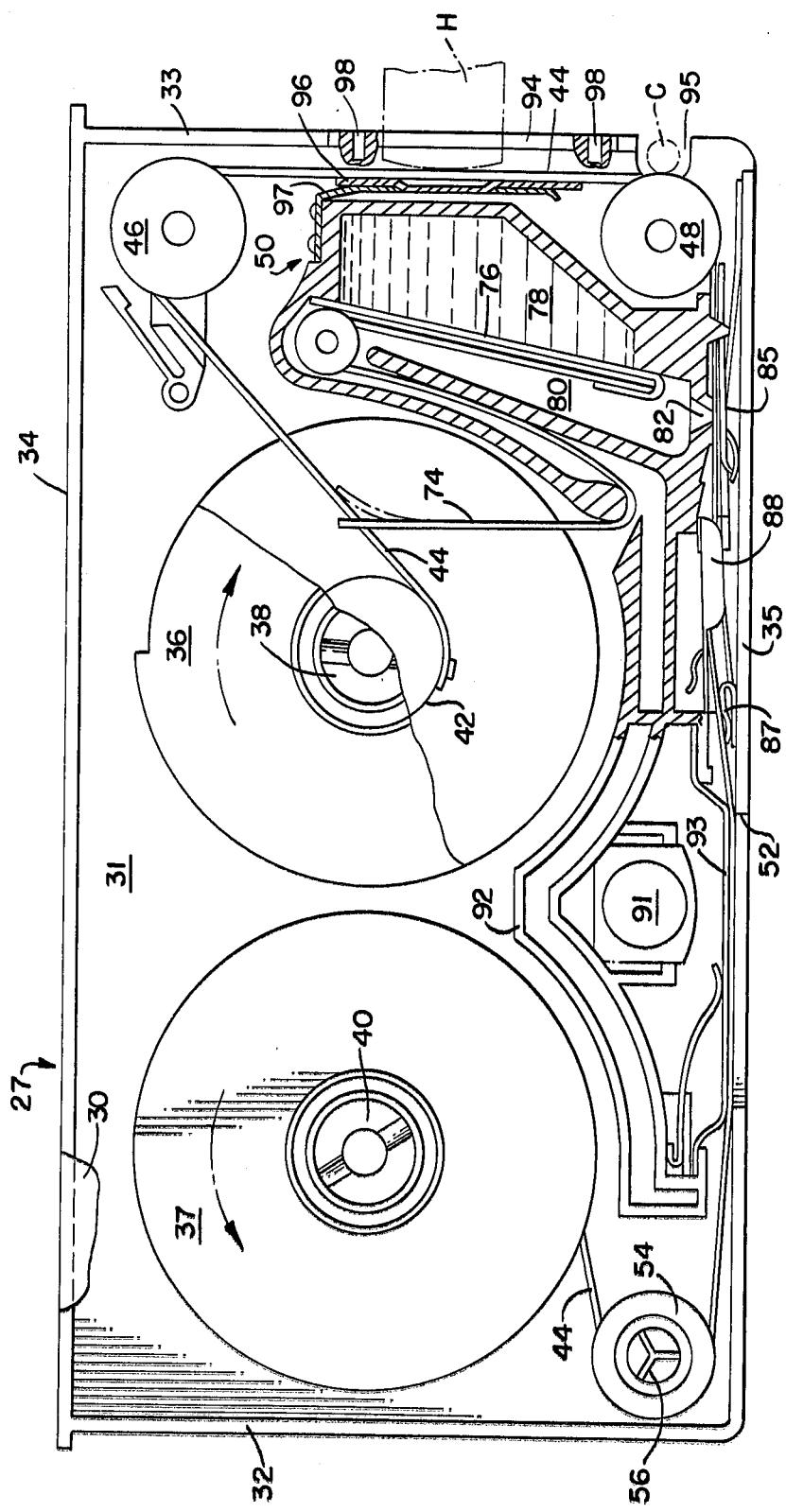
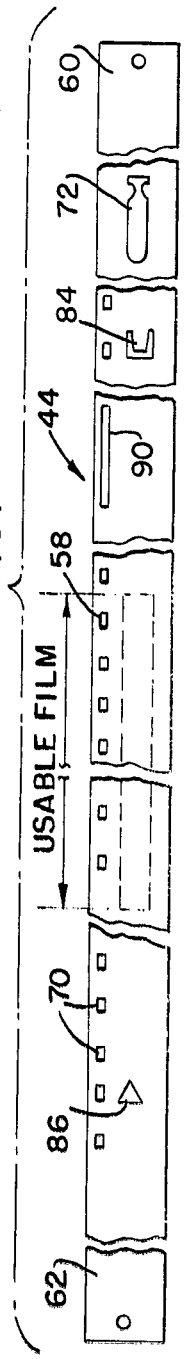
FIG. 4
FIG. 5.

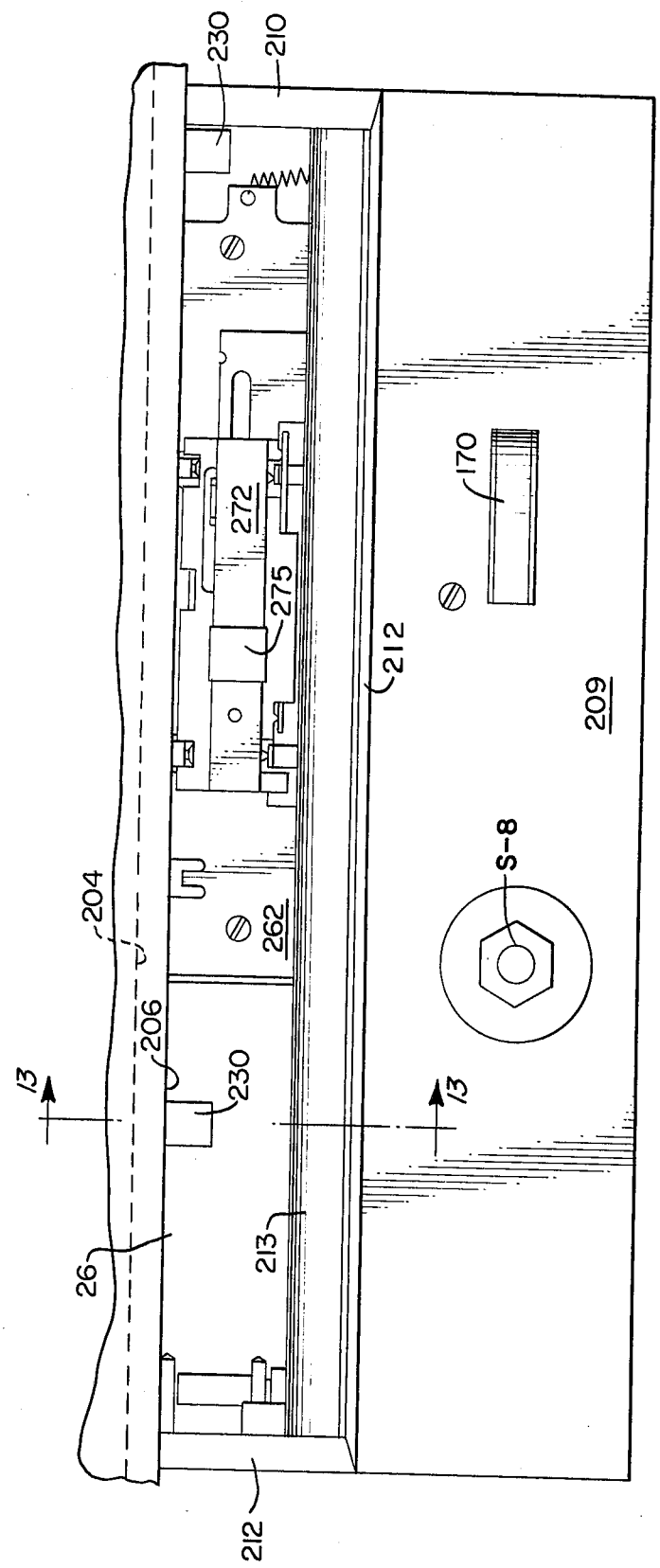

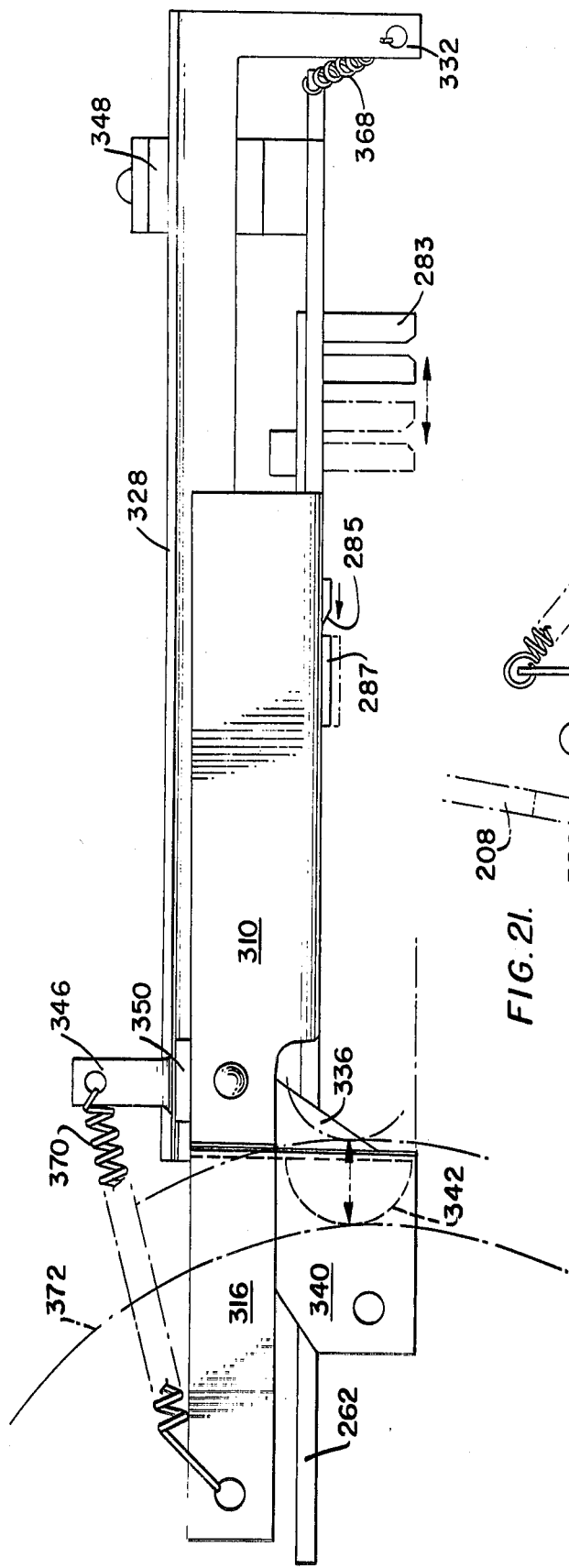
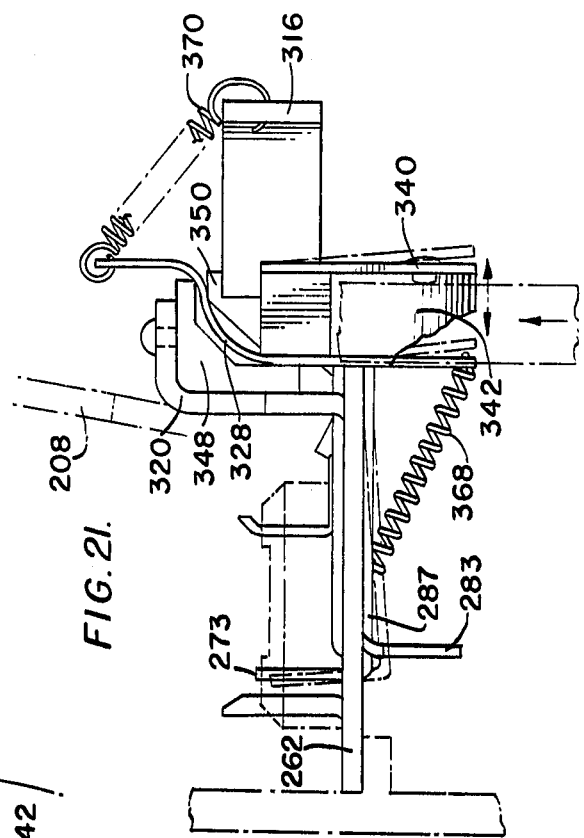
FIG.20.
FIG.21.

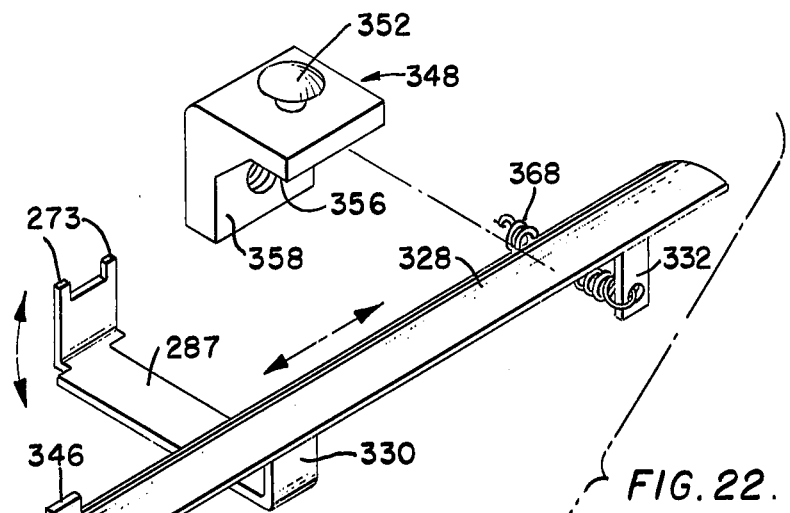
FIG. 22.
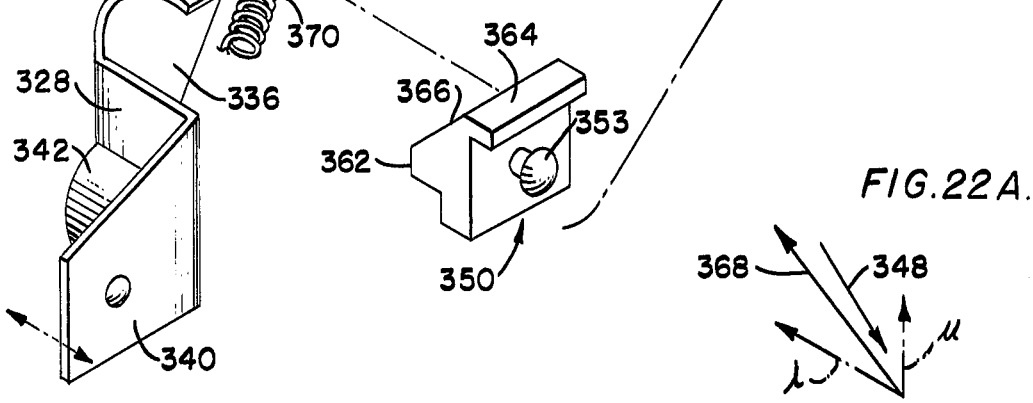
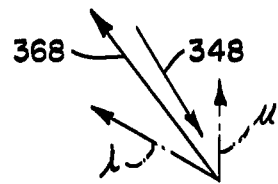
FIG. 22A.
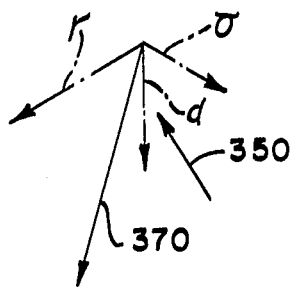
FIG. 22B.
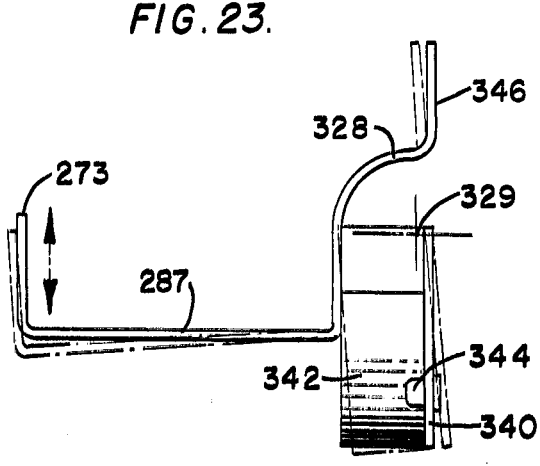
FIG. 23.

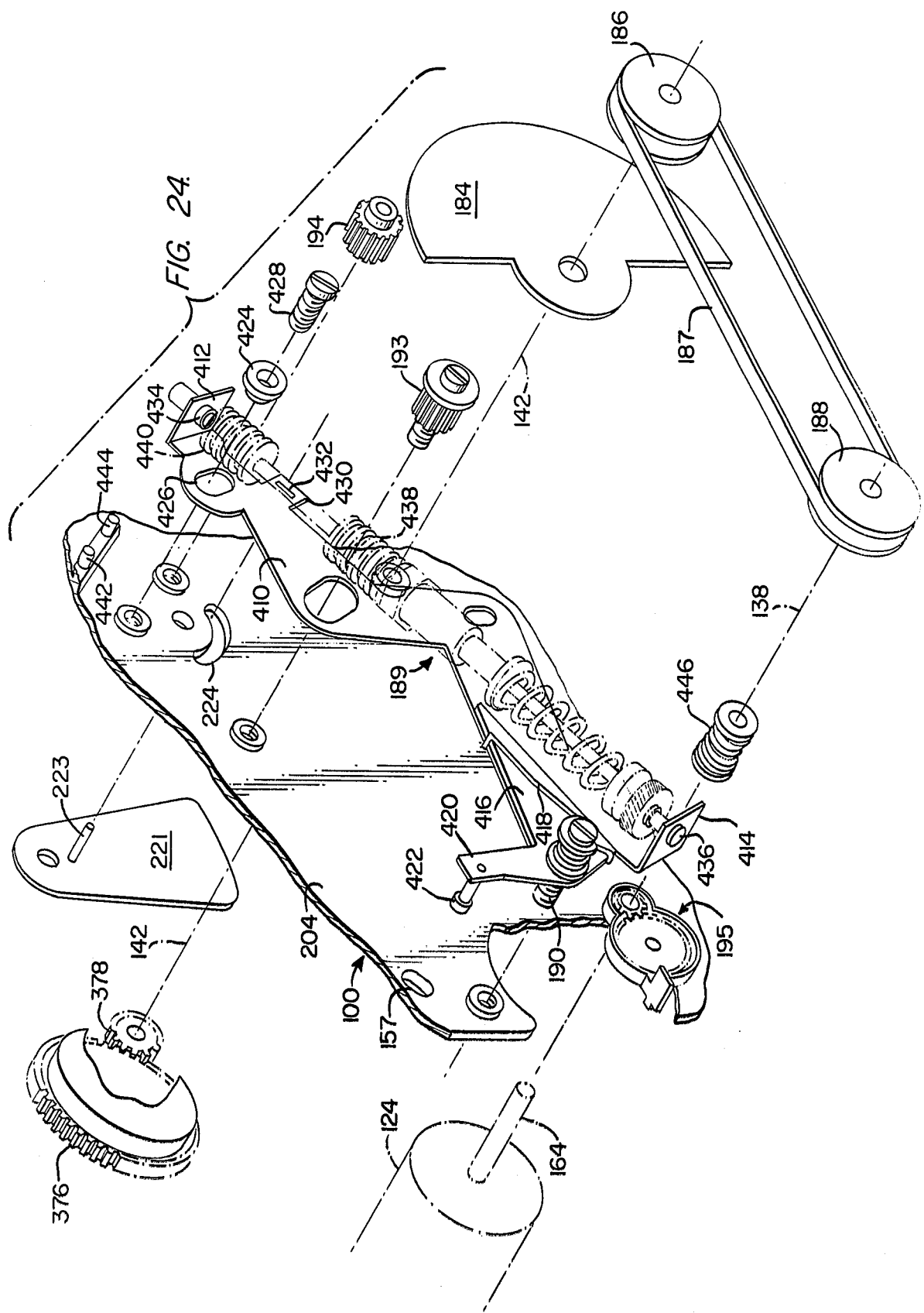

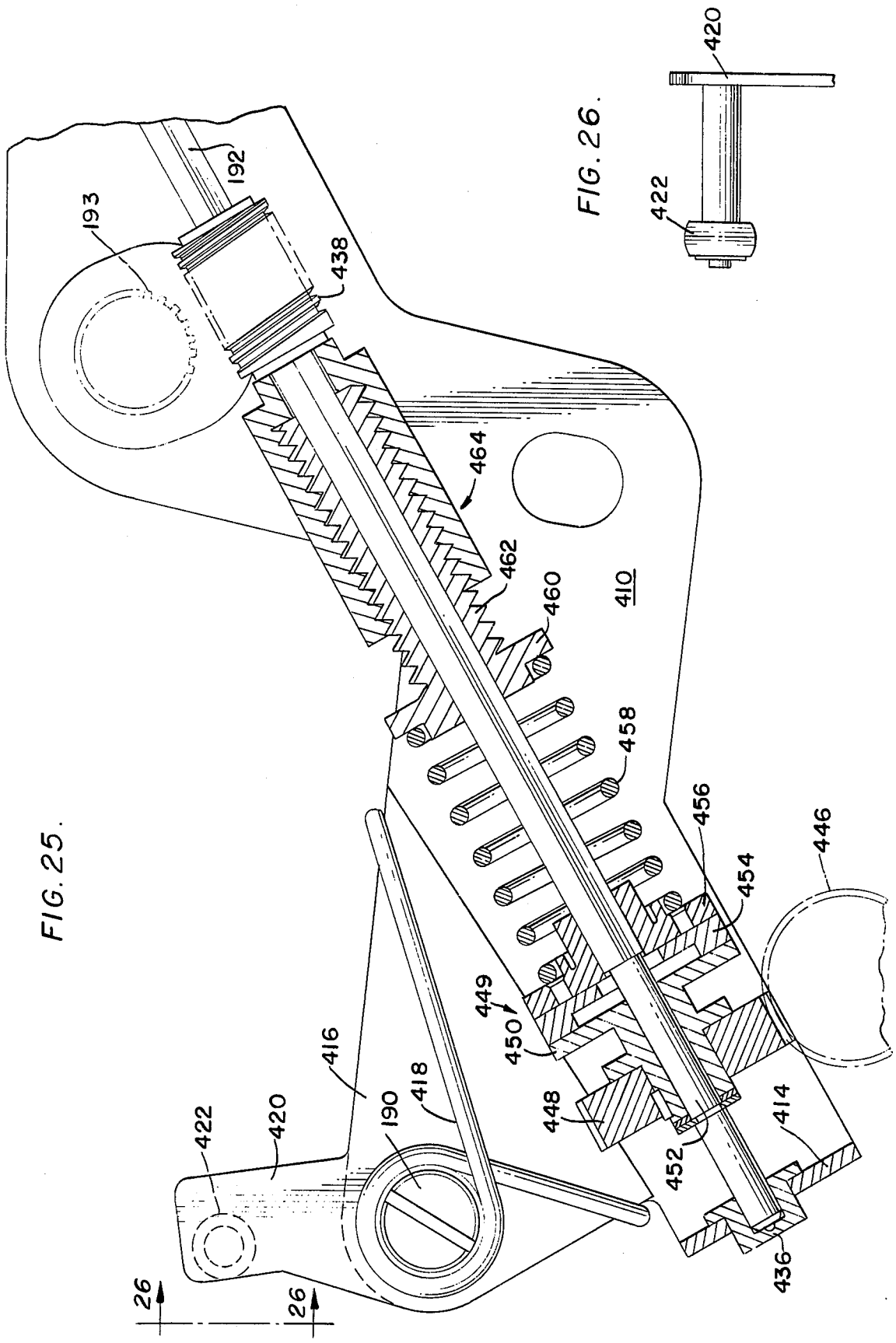

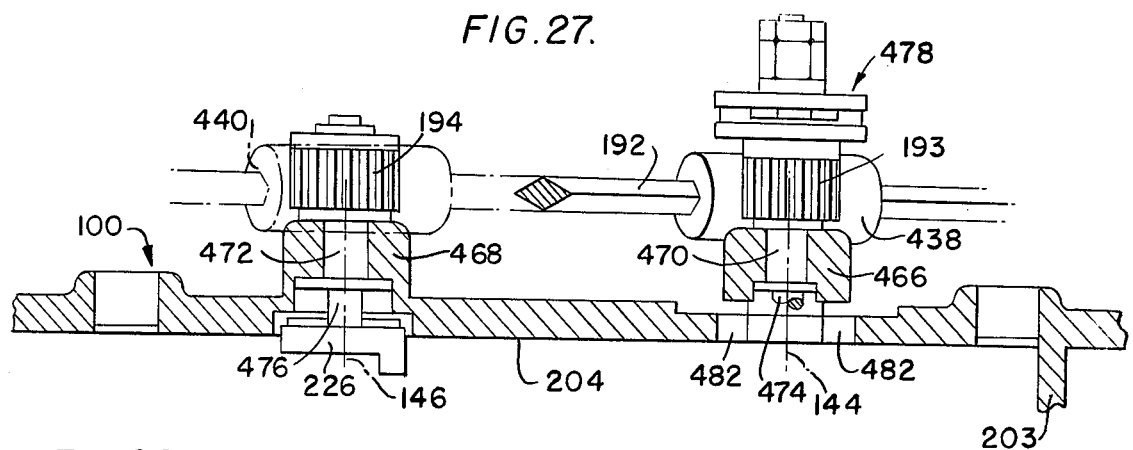

LOGIC SYSTEM FOR PHOTOGRAPHIC FILM STRIP HANDLING APPARATUS

BACKGROUND OF THE INVENTION

This invention relates to logic systems and more particularly, it concerns an electro-mechanical logic system for photographic film strip viewing apparatus operable automatically to process, project and rewind a film strip connected between supply and take-up spools contained in a multi-purpose cassette.

U.S. Pat. No. 3,830,564 issued Aug. 20, 1974 to John F. Batter, Jr., U.S. Pat. No. 3,909,120 issued Sept. 30, 1975 to Joseph A. Stella and U.S. Pat. No. 3,941,465 issued Mar. 2, 1976 to Irwin E. Figge, et al are representative of a larger number of prior art disclosures directed to a motion picture system in which a cassette contained film strip may be exposed, processed and viewed by projection of successive image frames formed on the film strip without removal from the cassette, principally as a result of a one use processing facility provided in the cassette. The system represented by this prior art has evolved to a point where one desiring to take and view motion pictures need merely place the cassette in an appropriately designed motion picture camera, expose the film strip in traditional fashion, remove the cassette from the camera and place it in a viewer apparatus, operable upon rewinding the film strip to apply cassette contained processing fluid to the strip, and within minutes of time, view the motion pictures he has taken by projection of light through the processed film strip.

Because the exterior appearance of the cassette remains unchanged whether processed or unprocessed and also because the same cassette will be re-used to view the processed film strip after it has once been processed, the viewing apparatus is appropriately automated to discern the condition of the film strip in the cassette and to program respective process, project or rewind operational modes in accordance with the information provided by the condition of the film strip in the cassette. Also because the viewer represents a basic piece of equipment constituting a major portion of the system from a cost standpoint, it must be capable of operation as effective for repeated viewing and rewinding of the processed film strip as it is for processing the film strip in the first instance.

Although the present state of the art relating to viewer/processors for such cinematographic systems has demonstrated functional viability, there is need for improvement of such equipment by which functional reliability of existing systems may be retained or improved but with lower manufacturing costs from the standpoint of both individual component manufacture and component assembly. The capability for film processing is perhaps among the more impressive characteristics of the viewer in such systems. This capability, however, has in the past required very complex viewer control logic which has detracted somewhat from otherwise effective operation of the viewer as a projection apparatus during which processed film is conventionally projected and rewound in accordance with well-known motion picture viewing operations.

SUMMARY OF THE PRESENT INVENTION

In accordance with the present invention, an improved viewing apparatus is provided for multi-purpose photographic film cassettes of the type mentioned and in which automated programming of diverse operating modes is effected by an integral programming cam disc in combination with an electronic logic system enabling the use of a single, unidirectional drive motor for all operations to be performed on the cassette and film contained therein. The programming cam disc cooperates with shiftable control components for determining the direction and other characteristics of film travel in the cassette, the positioning and retraction of cassette engaging components and to eject the cassette from the viewer automatically as the viewer is moved to the off position. Programming cam positioning is effected through a drive train originating with the main drive motor and under the direct control of one of two solenoids.

A unique power switch organization is provided which is not only responsive to cassette insertion for initiating automatic operation in accordance with the processed or unprocessed condition of the cassette contained film strip but also which enables continued operation of the drive motor to advance the logic system to an off condition after the cassette has been ejected.

Among the objects of the present invention are, therefore: the provision of an improved viewer for automated processing and projection of a multi-purpose cinematographic film cassettes; the provision of such a viewer which is totally automated to project, process and/or rewind the cassette contained film strip in accordance with the condition of the film strip in the cassette; the provision of an improved logic system for automating operation of such viewers; the provision of such a logic system in which the number of electro-mechanical switching devices is minimized; the provision of such a logic system which facilitates the use of a single integrally molded and rotatably indexible programming cam for conditioning the viewer to all operational modes; the provision of such a logic system which enables use of a single unidirectional drive motor; and the provision of a unique power switch organization by which operation is initiated and terminated automatically with cassette insertion and ejection, respectively.

Other objects and further scope of applicability will be apparent from the detailed description to follow taken in conjunction with the accompanying drawings in which like parts are designated by like reference numerals. Many of the features of the viewer system illustrated in the accompanying drawings and described hereinafter are the subject matter of other applications assigned to the assignee of the present invention and filed concurrently herewith.

BRIEF DESCRIPTION OF THE DRAWINGS

FIG. 1 is a perspective view illustrating the exterior structure of the viewer and cassette of the cinematographic system of the present invention;

FIG. 2 is a perspective view illustrating the opposite side of the cassette illustrated in FIG. 1;

FIG. 3 is an enlarged fragmentary view depicting the film strip structure employed in the cassette illustrated in FIG. 2;

FIG. 4 is an enlarged cutaway side elevation in partial cross-section illustrating the interior components of the cassette illustrated in FIGS. 1 and 2;

FIG. 5 is a fragmentary view illustrating the various portions of the film strip incorporated in the cassette;

FIG. 11 is an enlarged fragmentary cross-section taken on line 11—11 of FIG. 9;

FIG. 12 is an enlarged fragmentary plan view illustrating the general organization of the cassette well of the viewer illustrated in FIG. 1;

FIG. 20 is an enlarged side elevation illustrating the film feeding shuttle organization of the present invention;

FIG. 21 is an enlarged end elevation illustrating the components in FIG. 20;

FIG. 22 is an exploded perspective view of the feed shuttle of the present invention;

FIG. 22A is a force vector diagram applicable to the mechanism shown in FIG. 22;

FIG. 22B is a similar diagram of force vectors;

FIG. 23 is an enlarged end view of the mechanism shown in FIG. 22;

FIG. 24 is an exploded perspective view illustrating the shift plate assembly of the present invention;

FIG. 25 is an enlarged fragmentary side elevation in partial cross-section illustrating the shift plate mounted components;

FIG. 26 is a fragmentary end elevation as seen on line 26—26 of FIG. 25;

FIG. 27 is an enlarged fragmentary cross-section taken on line 27—27 of FIG. 10;

FIG. 28 is an enlarged fragmentary cross-section on line 28—28 of FIG. 27;

FIG. 29 is a fragmentary cross-section on line 29—29 of FIG. 28;

FIG. 30 is a cross-section on line 30—30 of FIG. 28;

FIG. 31 is a cross-section on line 31—31 of FIG. 29;

DETAILED DESCRIPTION OF THE PREFERRED EMBODIMENT

Figure 6:
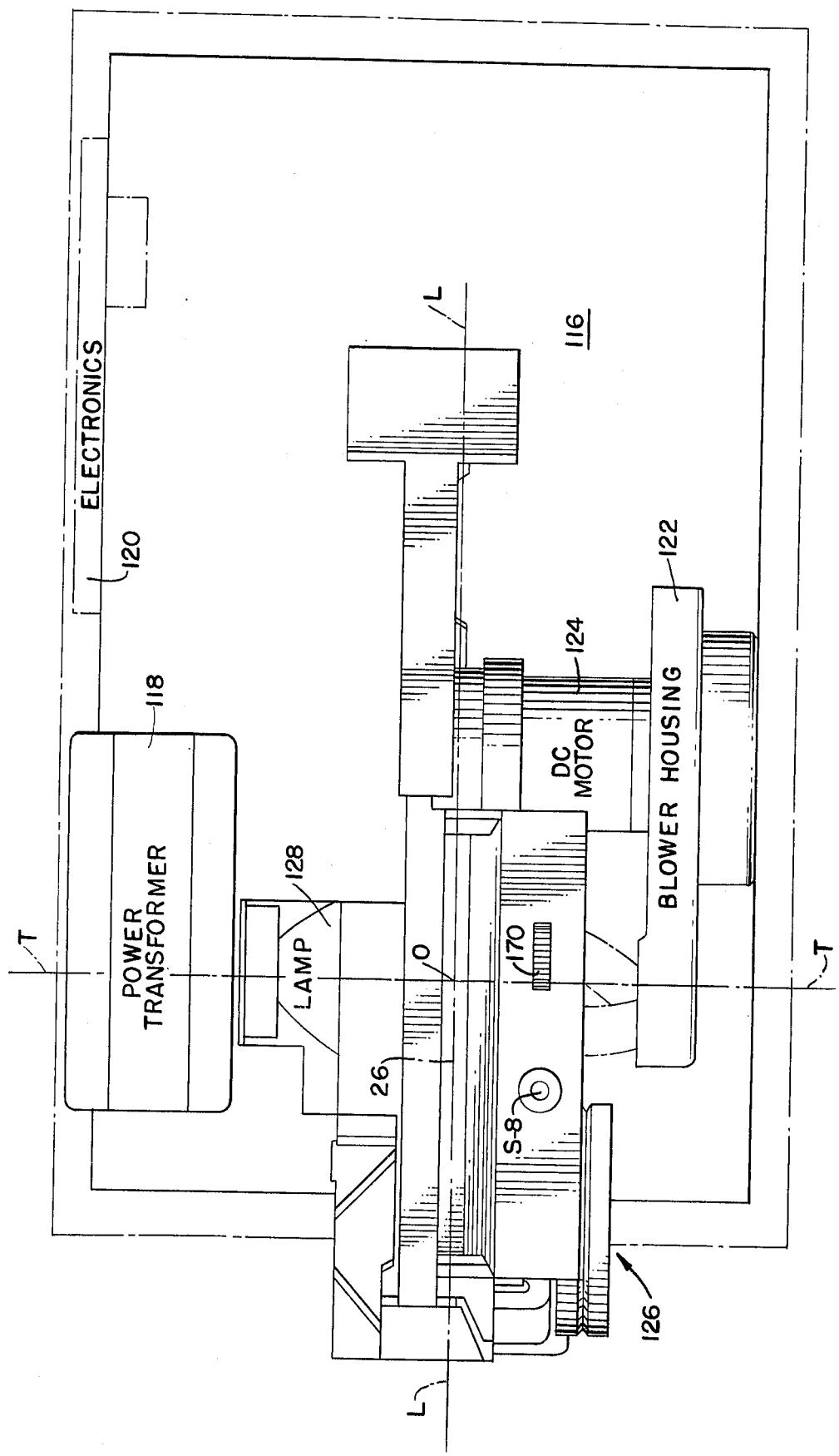
FIG. 6 is a plan view of the internal viewer structure.

The general exterior organization of components incorporated in the cinematographic system of the present invention is shown in FIGS. 1 and 2 of the drawings to include a viewer 25 having a cassette well 26 for reception of a film containing cassette 27. A translucent screen 28 is mounted on the front face of the viewer 25 for observation of motion pictures developed by light projected through a series of successively presented film carried transparent image frames to the rear face of the screen 28 by an internal optical system 29.

Although the cassette 27, in itself, is not novel with the present invention, a brief description of the cassette and its contents will facilitate a clearer understanding of the operating components of the viewer 25 to be described in detail below. As shown in FIG. 1 and 2 of the drawings, the cassette includes an exterior casing of generally parallelepiped configuration established by opaque planar side walls 30 an 31, end walls 32 and 33 and elongated top and bottom edge walls 34 and 35, respectively. In FIG. 4, the housing thus constituted is shown to contain a pair of film spools, respectively designated hereinafter as a supply spool 36 and a take-up spool 37, supported rotatably in the housing by annular, light-tight bearings 36 on the spools engaged by complementing ring-like embossments (not shown) on the interior of the side walls 30 and 31. Also, each spool is provided with a respective drive coupling hub or sprocket 38 and 40 for engagement by drive shafting to be described in more detail below. Each of the spools 36 and 37 is provided further with a pair of opposed flanges fixed to opposite ends of central hubs 42 to which opposite ends of a film strip 44 are permanently connected. In its path between the respective supply and take-up spools 36 and 37, the film strip 44 passes upwardly about a bobulator roll 46, downwardly about an idler roller 48, forwardly under a processor generally designated by the reference numeral 50, past an opening 52 in the bottom wall 35 of the cassette, about a snubbing roller 54 having a slotted hub 56 and back to the take-up spool 37. The film strip is, of course, initially packaged in the cassette and remains therein throughout exposure in an appropriate motion picture camera (not shown), processing and projection.

As shown in FIGS. 3 and 5, film strip 44 is constructed to establish a major central portion 58 of usable film contiguous with supply and take-up leader portions 60 and 62, respectively. The usable film portion, as shown most clearly in FIG. 3, includes a carrier base 64 of any suitably strong transparent material and a pair of rails 66 and 68 on one side thereof extending along the longitudinal margins or edges of the film strip. A series of equally spaced feed apertures 70 open through the rail 66 and margins of the carrier base 64 to enable the film to be incrementally advanced during both exposure and projection. One or both of the rails 66, 68 may be formed of a magnetic oxide material of a type employed for conventional magnetic sound recordings. The side of the film strip opposite the rails 66 and 68 is provided with an emulsion or photo-sensitive coating capable of being developed by a mono-bath processing composition to form a positive transparency suitable for projection. Also in this respect, it is noted that the rails 66 and 68 function to space successive convolutions of the film strip on the take-up spool, for example, after such a mono-bath processing fluid has been applied to the emulsion layer.

The supply and take-up leaders 60 and 62 of the film strip 44 are further provided with structural formations incident to complete operation of the cassette 27 as well as the viewer 25 in the overall cinematographic system of the present invention. Thus, the supply leader 60 includes the bottle shaped aperture 72 adapted to engage a pull tab 74 upon initiation of the first strip rewind movement from the take-up spool 37 to the supply spool 36 for processing. The pull tab 74 is detachably fixed to a tear strip 76 initially enclosing a pod or reservoir of processing fluid 78 such that as the film strip is rewound, the tear strip 76 will be removed to allow the fluid 78 to drain into a well 80 having an applicator nozzle opening 82 at its lower end. The supply leader 60 further includes a depressed tongue-like formation 84 operative upon initiation of processing to advance a slidable pressure pad 85 into a processing position in which it yieldably retains the film strip against the nozzle 82. A triangular opening 86 in the take-up leader 62 is provided to engage an upstanding tongue 87 on a slidable valve member 88 to move the valve member under the nozzle 82 and to cam the pressure pad 85 clear of the film strip and nozzle at the end of film processing. Finally, an elongated slot 90 is provided in line with the holes 70 for the purpose of interrupting advanced travel of the strip 44 by the incremental drive mechanism provided in the camera (not shown), as well as in the viewer 25.

It will be noted in FIG. 4 that the cassette carries a reflecting prism 91 in a position above the opening 52 and beneath a labyrinth type light seal 92. Also, a pressure plate 93 is positioned over the film strip 44 at the opening 52 and is spring biased downwardly to retain the film strip in a planar orientation for film exposure and projection or viewing.

Although it is contemplated that the cinematographic system of the present invention may be provided either with or without a facility for sound reproduction, the incorporation of a sound system necessitates a structural accomodation in the cassette 27. Thus, where the system is equipped for sound, the end wall 33 of the cassette is provided with head and capstan openings 94 and 95, respectively. A support plate 96 is mounted on a leaf-spring 97 secured to the processor 50 in a manner such that the plate 96 will oppose inward deflection of the film strip 44 as a result of contact by a sound head H with the rails 66 and 68 on the film strip 44. The opening 95 enables a capstan C to engage the rails 66 and 68 for purposes of continuously driving the film past the sound head without flutter or speed variation. Also, guide pin holes 98 are provided along the sides of the opening 94 to accurately position the head H with respect to the film strip 44 supported by the plate 96. While it might appear that the presence of the openings 94 and 95 would be inconsistent with the retention of the film strip 44 in a light-tight enclosure, it is to be noted in this respect that prior to exposure in a camera, the light sensitive film is contained entirely on the supply spool 36 with only the take-up leader 62 presented to the openings 94 and 95. After exposure in the camera which itself is light-tight the take-up leader 60 will be presented to the openings. During processing in the viewer 25 as will be described hereinafter, the film strip passing the openings 104 is no longer light sensitive.

Incident further to a clear understanding of the operational requirements of the viewer 25, it will be noted that the drive coupling hubs 38 and 40 of the respective supply and take-up spools 36 and 37 are exposed on the cassette exterior through the wall 31 as is the light reflecting prism 91 and the hub 56 of the snubbing roller 54. The opposite side wall 31 is provided with air vent holes 99 opposite the reflecting prism 91. In addition, a pair of electrically conductive cassette contacts CC are exposed near the bottom of the wall 31. The contacts CC are either in circuit continuity with each other as a result of the initial position of the valve member 88 or electrically isolated from each other after the valve member has been moved by the take-up leader 62 at the completion of film strip processing. Thus, the contacts CC provide an electrical indication of whether the cassette 27 is unprocessed or processed.

The general organization of components within the viewer 25 is illustrated with varying degrees of detail in FIGS. 6-10 of the drawings. As may be seen in FIGS. 6-8, the primary support structure or chassis is provided by a plate-like central casting 100 having a forwardly cantilevered portion 102 delimited essentially by a rear flange 104, a top flange 106, upper and lower front flanges 108 and 110 and a bottom flange 112. The cantilevered portion 102 is supported by an integral rear standard portion 114 secured to a base plate or pedestal 116. A power transformer 118, an electronics module 120 and a blower housing 122 are also supported by the base plate 116 whereas all other components are supported directly by the central casting 100. The casting supported components apparent in FIGS. 6 and 7 include a main DC motor 124, a sound module 126, a projection lamp 128 and the previously mentioned cassette well 26.

Figure 7:
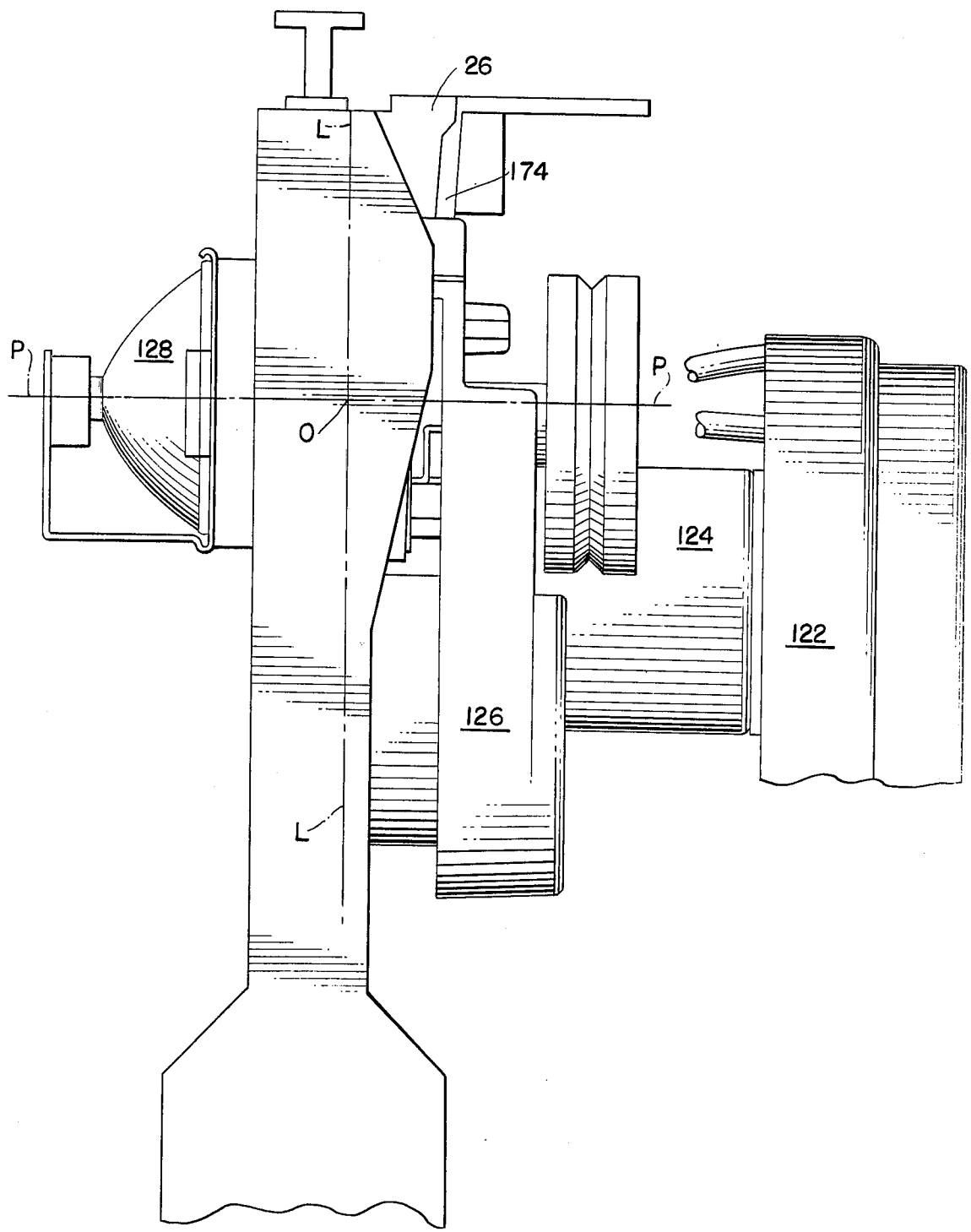
FIG. 7 is an enlarged fragmentary rear elevation of the internal viewer components.
Figure 8:
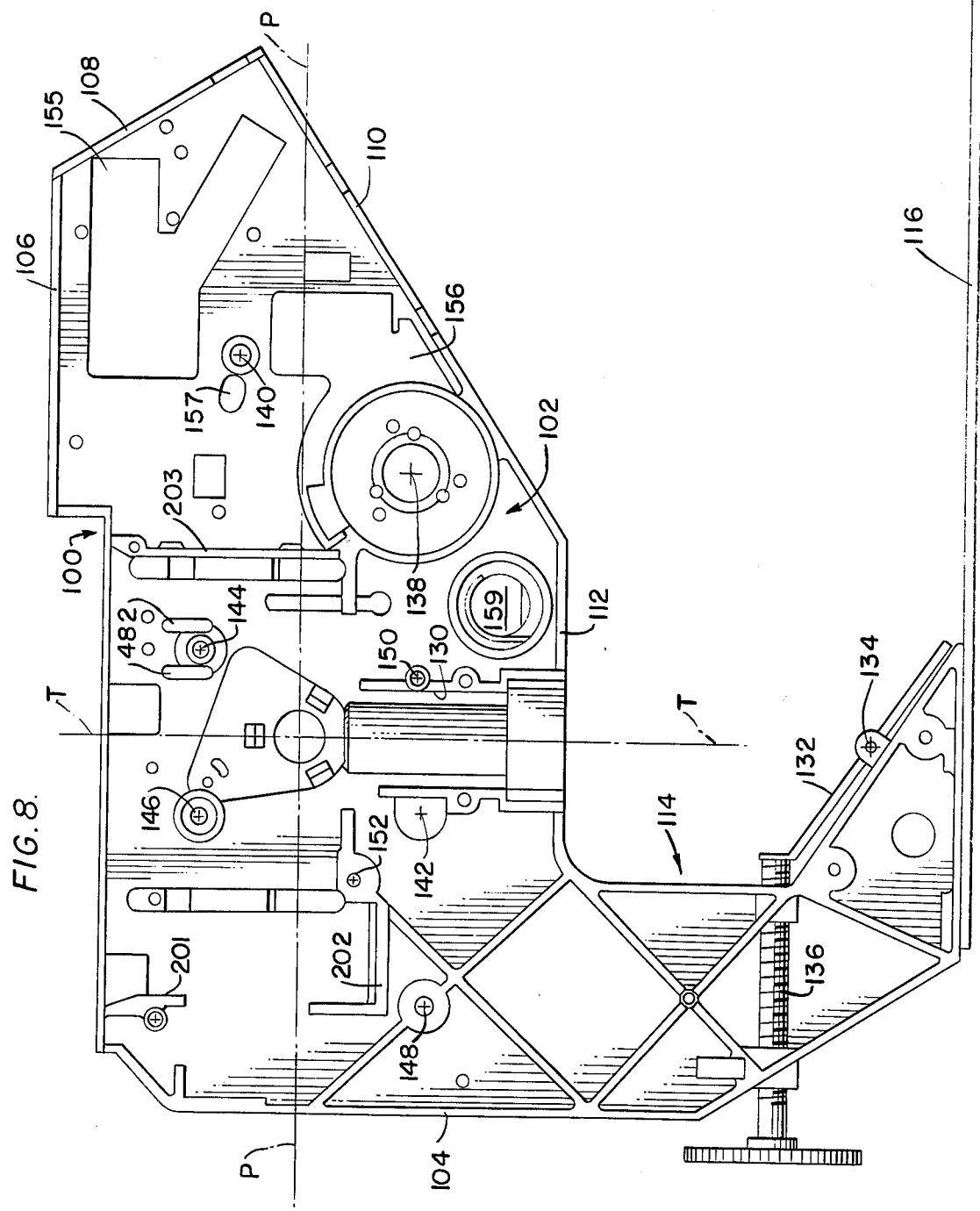
FIG. 8 is a side elevation illustrating the central chassis casting.

While other components and sub-assemblies or modules supported by the casting 100 will be identified and described below, it will be noted in FIGS. 6–8 that an optical center O of the viewer 25 is defined by the intersection of a vertical longitudinal plane L, a vertical transverse plane T and a horizontal plane P. The projection lamp 128 is supported on an axis defined by the intersection of the planes T and P whereas a lens mount 130 in the casting 100 is arranged to be coaxial with the intersection of the two vertical planes T and L. Also, an image reflecting mirror 132 is centered on the axis of the lens mount 130 and pivotally supported on a horizontal axis 134 lying in the plane T for framing adjustment of images projected to the screen 16 by an adjusting screw 136 threadably received in the standard portion 114 of the casting 100.

In light of the central disposition of the casting 100, various internal operating components will be mounted on one side or the other of the casting. For reference hereinafter, the side of the casting on which the lamp 128 is located will be identified as the "left side" whereas the side facing the blower 122 will be termed the "right side". Several shaft supporting axes extend through both sides of the casting and are seen from the right side in FIG. 8. Specifically, such axes include a motor shaft axis 138, a programming cam axis 140, a shutter axis 142, a take-up spool drive shaft axis 144 and a supply spool drive shaft axis 146. Casting formations are provided only on the right side to define a sound module pivot axis 148, a focusing link pivot axis 150, a shuttle cam axis 152 and a sound link supporting pin axis 154.

Many of the surface formations on the casting 100 illustrated in FIG. 8 will be described below in conjunction with the respective associated operating components. It will be noted at this point, however, that the web of the casting, in the region of the programming cam axis 140, is cut out or bored to provide a switch block opening 155, a latch gear opening 156, and a shift plate cam-follower opening 157. Each of these openings extends through the web and is presented on the left side of the casting; or on the side thereof opposite from that illustrated in FIG. 8, with the identical configuration.

In addition to the aforementioned openings in the casting 100, and as shown in FIGS. 8–11, a lamp-cooling air deflector 159 is integrally formed in the casting 100. The deflector is shown most clearly in FIG. 11 to include a hose coupling sleeve 160 on the right side of the casting and having a convergent passage 161 opening through the left side face of the casting web. An integral air deflecting baffle 162 is oriented on the left side of the casting web to direct air delivered from the blower housing 122 and through the passage 161, upwardly and rearwardly to the region of the projection lamp 128.

Figure 9:
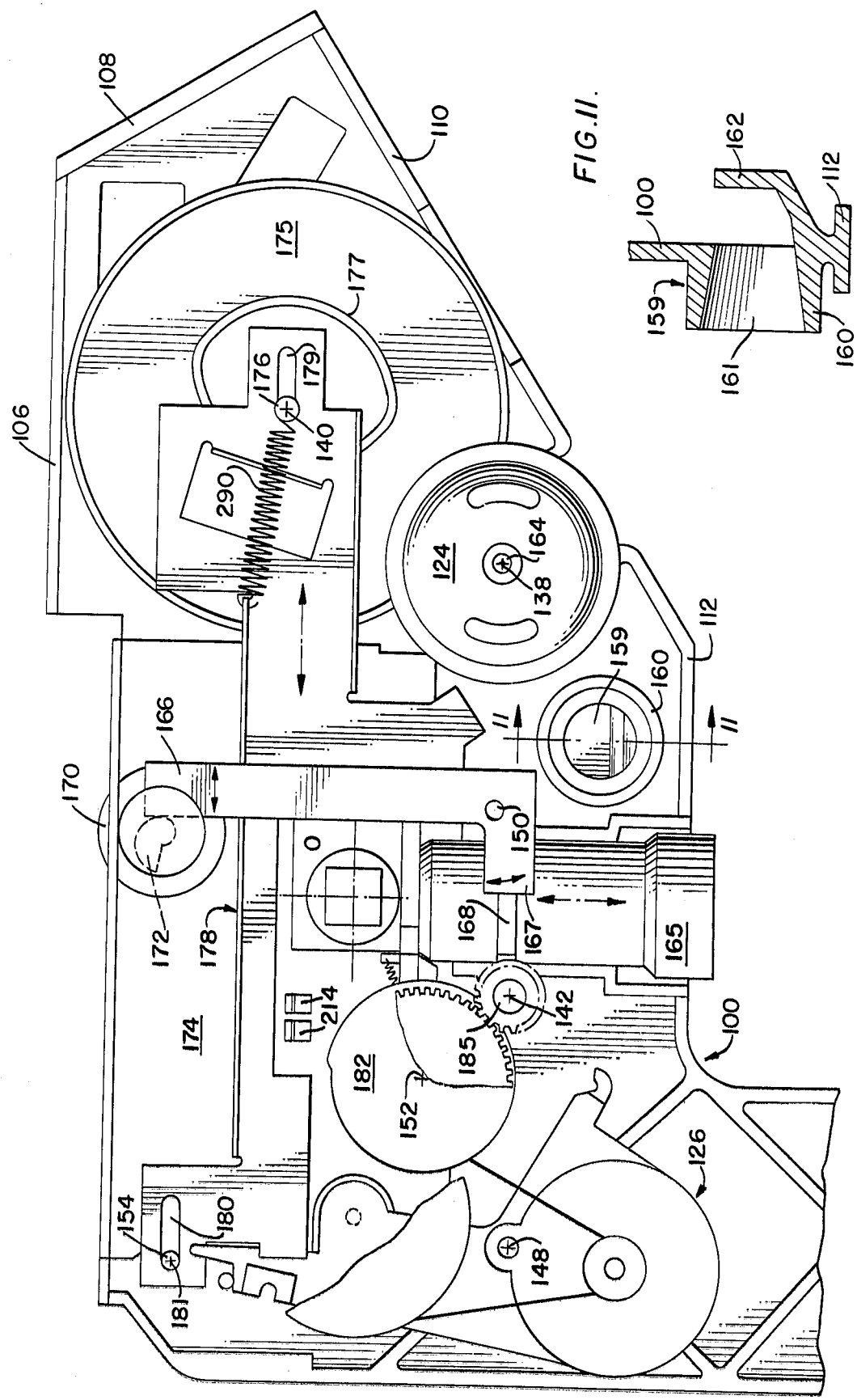
FIG. 9 is a fragmentary side elevation illustrating one side of the assembled internal viewer components.

Internal viewer components supported from the right side of the casting 100 are generally shown in FIG. 9 with several of the aforesaid axes also indicated for orientation. Thus, the motor 124 is supported on the axis 138 by an annular boss formation 163 in the casting 100. As previously mentioned, the motor 124 is a DC electric motor which need be capable of operation only in one rotational direction to deliver drive torque to a central output shaft 164 extending through opposite ends of the motor housing. In this respect, it will be noted by reference to FIG. 6 that the motor is aligned with the blower housing 122 such that a centrifugal fan impeller (not shown) may be mounted directly to the end of the motor shaft 164 extending into the blower housing 122. The other end of the motor shaft 164 extends through the casting 100 on the axis 138 for connection to components mounted on the left side of the casting 100 and which will be described in more detail below.

A projection lens 165 is supported by the lens mount 130 in the casting 100 for focusing adjustment vertically on the axis defined by the intersection of the aforementioned vertical planes L and T. Focusing adjustment of the lens 165 is effected by an L-shaped focusing link 166 having a lower relatively short leg 167 engageable with a barrel groove 168 in the lens 165. A focusing knob 170, presented at the top of the viewer 25, is provided with a cam 172 by which the link 166 may be adjustably pivoted about the axis 150 to adjust the vertical position and thus the focus of the lens 165. The focusing adjustment knob is supported by a flanged cassette well side plate 174 to be described in more detail below.

A viewer programming cam disc 175 is supported on an axle 176 projecting from the right side of the casting 100 in a manner to support the disc for rotation about the axis 140. The side of the cam disc 175 presented from the right side of the casting is formed with an axially projecting peripheral cam surface 177 for positioning a sound link generally designated by the reference numeral 178. Although the sound link 178 will be described in more detail below, it will be noted in FIG. 9 that one end of the sound link 178 is provided with a horizontal slot 179 to support the link at one end from an extension of the axle 176. The other end of the sound link 178 is similarly provided with a slot 180 through which a supporting pin 181 extends on the axis 154. Other operative components supported from the right side of the casting 100 include the sound module 126 as well as a film feed shuttle drive cam 182 disposed rotatably about the axis 152.

Figure 10:
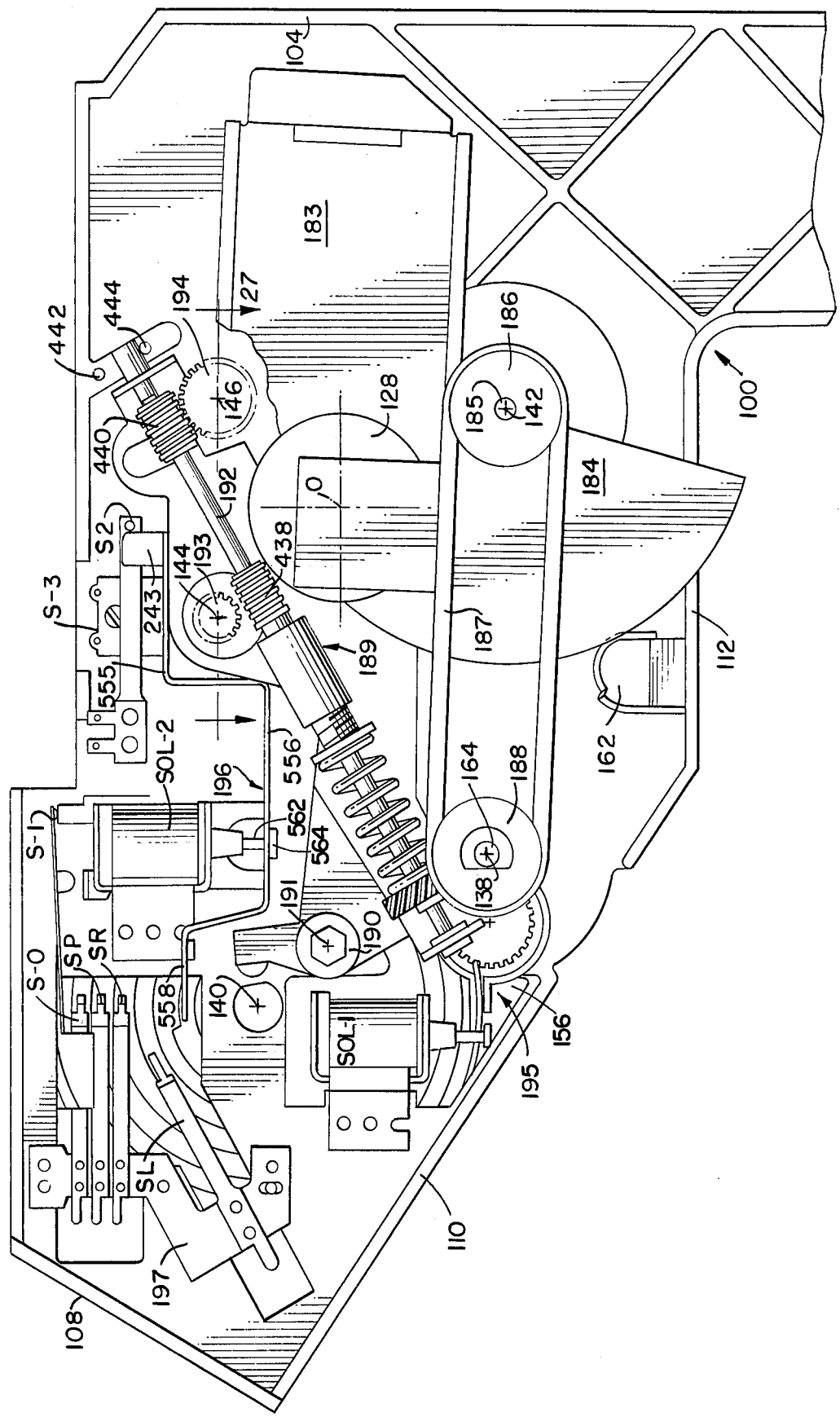
FIG. 10 is a fragmentary side elevation illustrating the opposite side of the interior viewer structure from the shown in FIG. 9.

Internal viewer components supported from the left side of the casting 100 are generally illustrated in FIG. 10 of the drawings. As shown, the lamp 128 is supported by a lamp bracket 183 to be spaced from the left side of the casting 100 (see also FIGS. 6 and 7). A shutter 184 is supported by a shaft 185 extending through and journalled in the casting 100 on the axis 142. Shutter rotation about the axis 142 is effected by a pulley 186 driven through a belt 187 by a pulley 188 keyed or otherwise non-rotatably secured at the end of the motor shaft 158 on the axis 138. A shift plate assembly 189 is supported by a pivot bolt 190 for pivotal movement about an axis 191. As will be explained in more detail hereinafter, the shift plate assembly 189 carries a transmisstion shaft 192 adapted to be rotatably driven by the motor shaft 158. Torque is transmitted from the shaft 192 to either a take-up spool drive gear 193 rotatably on the axis 144 or a supply spool gear 194 rotatably situated on the axis 146.

Also presented on the left side of the casting 100 is a cam disc latch gear assembly 195 in a position overlying the opening 156 and adapted to be controlled by a solenoid SOL-1; a cassette eject bar 196 controlled by a solenoid SOL-2; and a switch block 197 for supporting cam actuated program switches SO, SP, SR, SL in the opening 155, each of which is a normally open switch adapted to be closed by radial cam surfaces presented on the left side of the programming cam disc 175 in a manner to be described in more detail hereinafter. In addition to the afore-mentioned switches, illustrated in FIG. 10 is a normally closed switch S-1 is adapted to be opened upon actuation of the solenoid SOL-2 to lift the cassette eject bar 196; a normally open power switch S-2 adapted to be closed by insertion of the cassette 27 into the cassette well 26 and a jam sensing switch S-3 for mechanically detecting rotation or non-rotation of the take-up spool drive supported on the axis 144.

An understanding of the structure establishing the cassette well 26 as well as the components positioned within the well may be gained by reference to FIGS. 8 and 12–17 of the drawings. It will be recalled that in FIG. 8, the right side of the casting is shown essentially without operating components mounted thereon. Thus, it will be noted with reference to this figure that the casting 100 is provided with projecting flange-like formations 201, 202 and 203 to define the rear, bottom and forward peripheral wall portions respectively of the cassette well 26. A generally planar wall 204 lies within these peripheral wall portions to establish an interior surface along the left side of the well 26 in relation to the vertical longitudinal plane L and in the context of definitions provided above.

Figure 13:
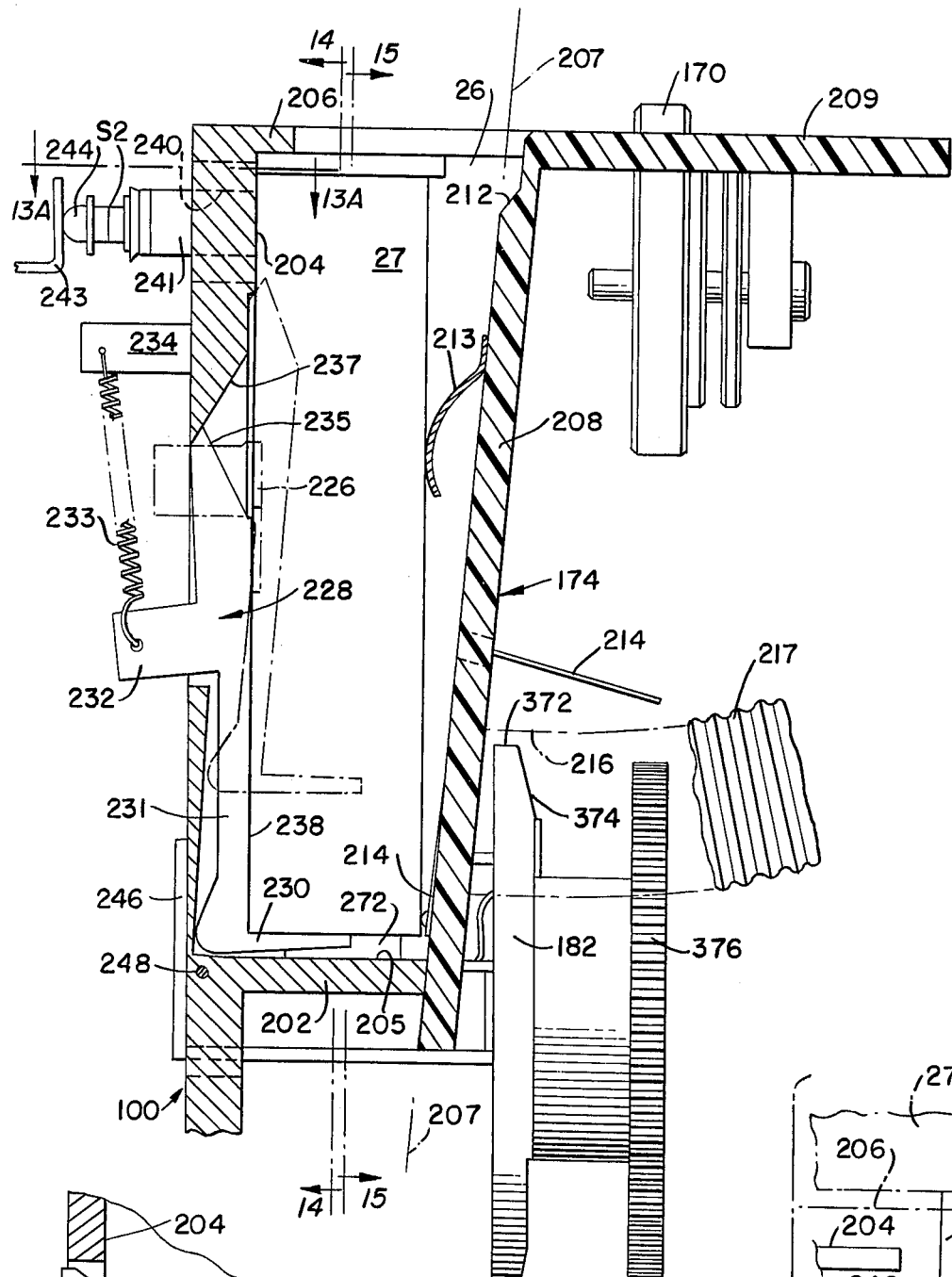
FIG. 13 is an enlarged cross-section on line 13—13 of FIG. 12.
Figure 14A:
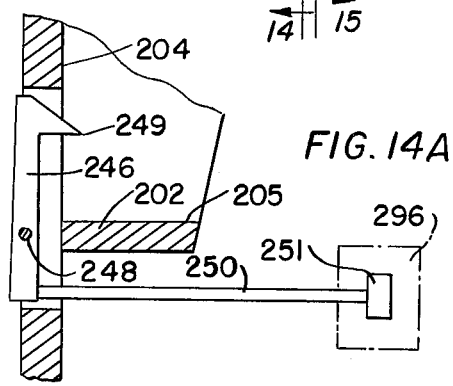
FIG. 14A is an enlarged fragmentary cross-section taken on line 14A—14A of FIG. 14.
Figure 13A:
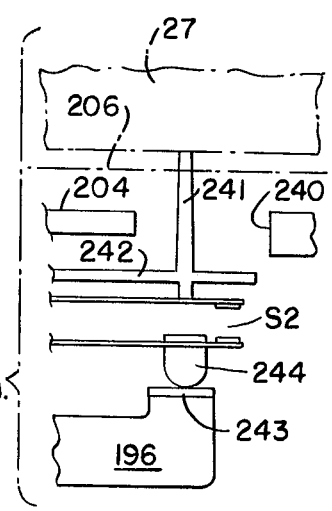
FIG. 13A is an enlarged fragmentary cross-section taken on lines 13A—13A of FIG. 13.
Figure 14:
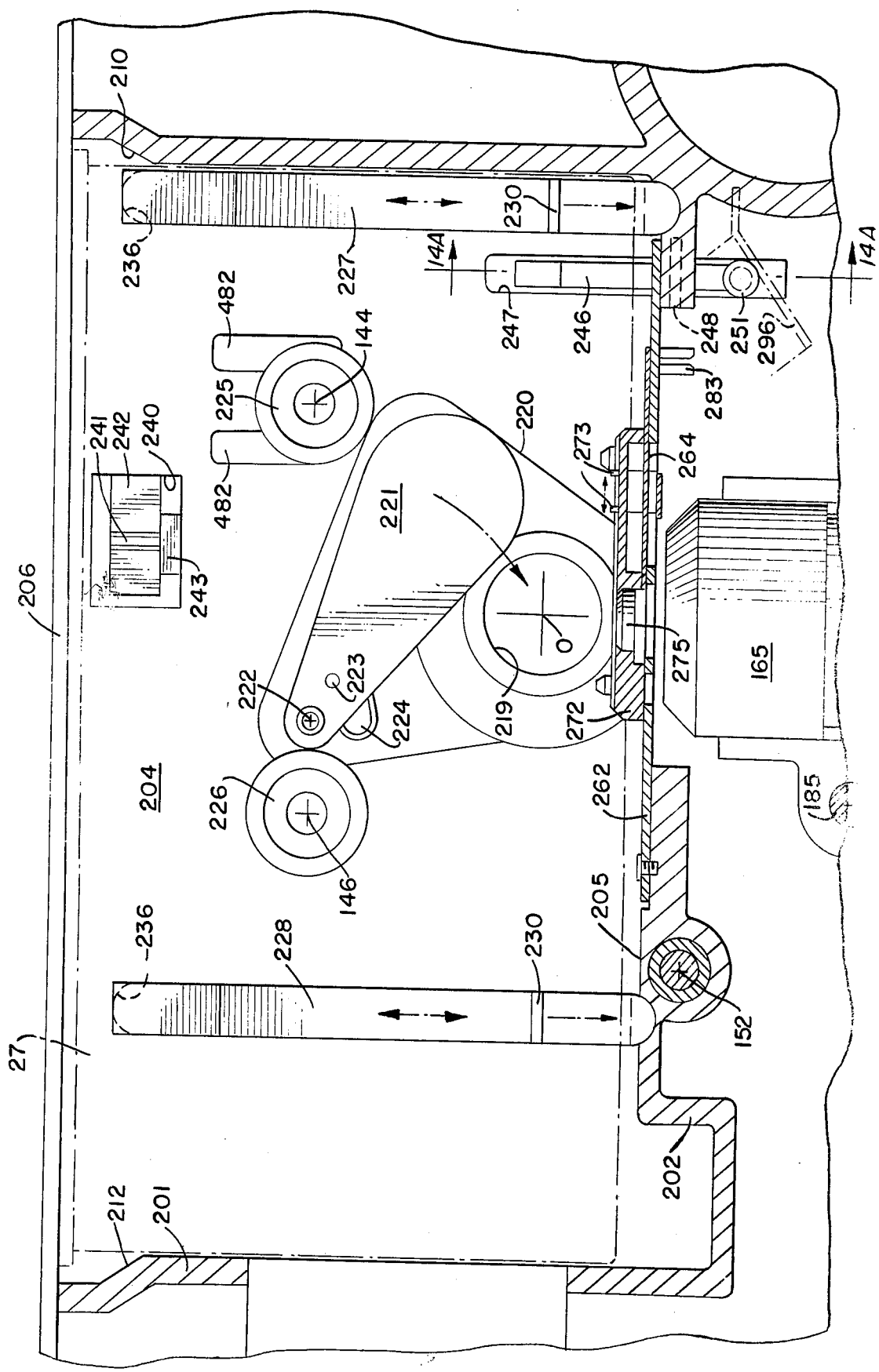
FIG. 14 is a fragmentary cross-section on line 14—14 of FIG. 13.

As shown more clearly in FIGS. 13 and 14, the interior surface of the wall 204 extends from a cassette floor 205 defined in part by the flange portions 202 and 203, upwardly to a top edge delineated by the underside of a transverse lip 206 extending the length of the well 26. Also as seen in FIG. 13, the distal edges of the flange formations 201, 202 and 203 lie in an inclined plane 207 and provide a bearing surface for the cassette well cover plate 174. Although the plate 174 has been generally identified above, it is more specifically characterized as being formed of plastic material so as to be dielectric or non-conductive. Also the plate 174 is of inverted L-shaped configuration in transverse section to establish an upright wall portion 208, secured in abutting engagement with the flange formations 201, 202 and 203, and joining at its upper edge in an integral horizontal flange portion 209. The flange 209 supports the focusing knob 170 so that it is presented at the top of the viewer 12 (see FIG. 12). In addition, the flange supports a push button replay switch S-8, the function of which will be described in more detail below.

Figure 15:
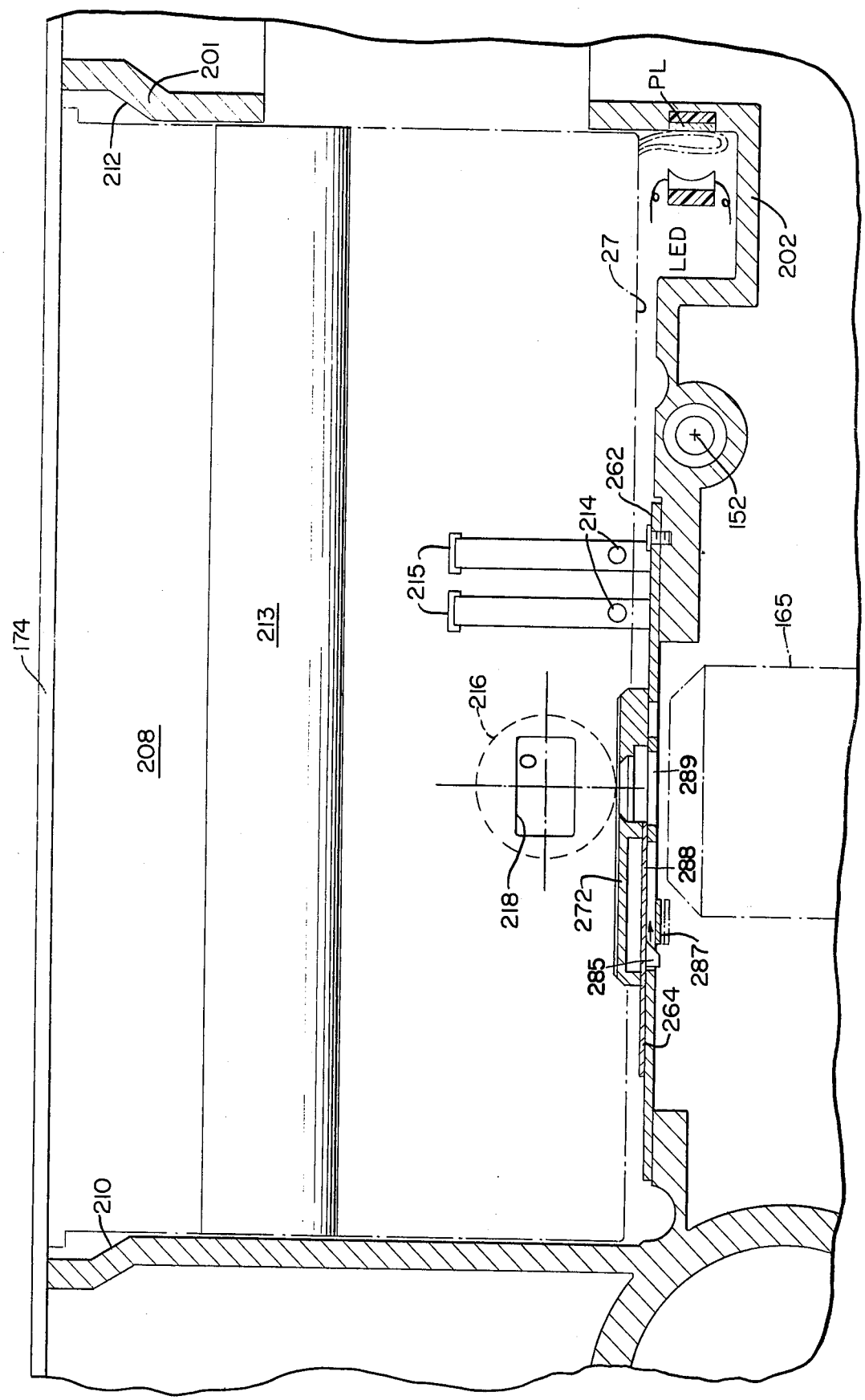
FIG. 15 is a fragmentary cross-section on line 15—15 of FIG. 13.

It will be observed by reference to FIGS. 12, 13 and 15 that the mouth of the well 26, as defined by the flange formations 201 and 203 at the ends and by the flanged cover plate 174 on the inclined right side of the well, is provided with outwardly flared or chamfered internal surfaces 210, 211 and 212 to facilitate initial inserting movement of the cassette 27 into the well 26. Also as seen in these figures, the interior of the inclined wall 208 of the flanged cover plate 174 supports an outwardly and downwardly extending cassette loading spring and binder 213 which extends longitudinally for the length of the well 26. In addition, a pair of conductive terminal strips 214 extend downwardly from the apertures 215 in a position to be engaged by the cassette contacts CC described above with reference to FIG. 2. The terminal strips extend outwardly through the apertures 215 as shown in FIG. 13 to facilitate their connection electrically to the electronics module 120.

As air conduit coupling 216 extends outwardly of the wall 208 to facilitate the connection of an air hose 217 from the blower housing 122. As shown in FIG. 15, the coupling 216 opens to the cassette interior through a generally rectangular opening 218 centered on the optical axis O to be aligned with the air vent holes 99 in the cassette 27. As above mentioned, the air vent holes 99 are disposed directly behind the reflecting prism 91.

Cassette well components presented from the left side wall surface 204 are illustrated most clearly in FIGS. 12A, 13, 13A and 14 of the drawings. As shown in FIG. 14, a circular projection light aperture 219 is provided in the wall 204 of the casting 100 to be concentric with the optical axis O and thus aligned with the projection lamp 128 as well as with the reflecting prism 91 presented on the side wall 30 of the cassette 27 when the latter is positioned in the well 26. It will be noted that the circular aperture 219 opens to the cassette well interior in the bottom of a generally triangular recess 220 machined in the wall surface 204. The recess 220 accommodates a blade-like blinder 221 pivoted on an axis 222 for movement from the open position depicted in FIG. 14 to a position overlying the circular aperture 219 in a manner to prevent entrance of light through the aperture to the cassette well interior. Pivotal movement of the blinder 221 in this manner is effected by a pin 223 extending through an arcuate aperture 224 in the wall 204 and into engagement with the shift plate assembly 189 as will be described in more detail below with reference to FIG. 24. The blockage of light passing through the aperture 219 and the reflecting prism 91 in the cassette is important to prevent exposure of the film strip 44 to unwanted light during the processing A pair of spool drive heads 225 and 226 are journalled for rotation in the wall 204 on the respective take-up and supply spool drive shaft axes 144 and 146. The drive heads 225 and 226 are designed for one way engagement with the drive sprockets 38 and 40 presented through the wall 30 of the cassette 27 and as shown in FIG. 13, project inwardly of the wall surface 204 so as to extend at least partially through the cassette wall 30. While the projection of the drive heads into the well 36 in this manner is needed to insure driving engagement thereof with the cassette contained film spools, it will be appreciated that because of this inward projection, the drive heads 225 and 226 present an obstruction to vertical sliding movement of the cassette along the wall surface 204.

To facilitate guiding the cassette 27 past the drive heads 225 and 226 and also to assist in ejecting the cassette 27 from the well 26, a pair of L-shaped members 227 and 228 are yieldably supported in the wall 204 at locations spaced along the length of the cassette well 26 for movement between a first position depicted by phantom lines in FIG. 13 and in which the cassette well 26 is empty, and a second position depicted by solid lines in FIG. 13 in which the cassette 27 is loaded into the well 26. Each of the L-shaped members 227 and 228 is similarly shaped to establish a cassette bearing foot 230 and a generally vertical leg portion 231 having a bracket formation 232 for engagement by one end of a tension spring 233, the other end of which is engaged with a similar bracket 234 or other means suitably fixed to the casting 100. The leg portion 231 is provided with an upwardly inclined or chamfered end surface 235 and is received within a shaped slot 236 in the wall 204. In particular, it will be noted that the slot 236 is provided with a downwardly inclined ramp surface 237 opening through the left side of the casting 100 in a manner such that the linear edge 238, presented to the well interior, moves to a position essentially flush with the inner wall surface 204 when the cassette 27 is loaded into the well. The surface 238 is inclined to approximate parallelism with the inner surface of the cover plate wall 208 in its initial or first position.

In light of the organization of the L-shaped members 227 and 228, together with the location of the spring blinder 213 on the cover plate wall 208, it will be seen that cassette insertion and retention within the well 26 is effected simply by inserting the bottom wall 35 of the cassette into the mouth of the well. Subsequent downward pressure on the top wall of the cassette will result in elongation of the springs 233 with downward and outward movement of the L-shaped members 227 and 228. Simultaneously, the loading spring 213 will operate to urge the upper portion of the cassette 27 toward the wall surface 204 such that the top wall of the cassette underlies the lip 206. The bia of the springs 233 acting on the cassette through the foot portions 230 of the L-shaped members 227 and 228 together with the bias of the loading spring will retain the cassette firmly in this loaded position.

Ejection of the cassette 27 from the well 26, in accordance with the present invention, is effected automatically by the programming cam disc 175 and the cassette eject bar 196 upon the viewer being programmed to an "off" condition. Although the complete operation of the programming cam disc and eject bar will become apparent from the description to follow, the interaction of the cassette 47 and the eject bar 196 may be understood by reference to FIGS. 13, 13A and 14 of the drawings. As shown in these figures, a wall 204 is provided with an aperture window 240 near the upper position thereof under the lip 206. A push rod or leg 241 formed integrally on a resilient plastic leaf 242 extends through the window 240 to engage the side of the cassette 27. The previously identified power switch S-2 is positioned between the plastic leaf 242 and a flange or tab 243 at the end of the eject bar 196. A switch button 244 is positioned such that movement of the flange tab 243 on the eject bar toward the cassette 27 will advance the leg 241 into the cassette to move it out from under the lip 206. Similarly, insertion of the cassette will engage the leg 241 to close the switch S-2 against the tab 243 on the eject bar 196. In light of this organization, it will be appreciated that movement of the tab 243 to advance the cassette laterally out from under the lip 206 will cause the L-shaped members 227 and 228 to move upwardly and eject the cassette 27 from the well. Also, it will be apparent that the switch S-2 will be either opened or closed depending on the absence or presence of the cassette 27 in the well 26.

As mentioned above, the snubbing roller 54 in the cassette 27 is intended to operate either as a freely rotatable guide roller during film processing or rewind, or as a fixed snubbing post to facilitte passage of the film strip to the take-up spool during incremental advance of the run in the film strip past the opening 52 in the bottom wall 35 of the cassette. Also it will be recalled that the slotted hub 56 of the snubbing roller is presented through the cassette wall 30 so that it will be placed against the wall surface 204 upon cassette insertion into the well 26. Control over snubbing roll rotation is effected by a snubber pawl 246 as shown in FIGS. 12, 13 and 14A of the drawings. The pawl 246 is disposed in an opening 247 near the bottom of the wall 204 and pivotally supported on a pintle 248. A snubbing roller hub engagement tang 249 projects inwardly through the aperture 247 whereas an actuating rod 250 projects from the lower end of the pawl 246 outwardly past the cassette well 26 to a roller 251 at its outer end positioned to be engaged by a portion of the sound link 178. Although the complete operation of the pawl 246 by the sound link 178 will be more apparent from the description to follow, it will be understood from this limited description, that movement of the sound link will pivot the snubbing pawl in the manner to either prevent rotation of the cassette contained snubbing roller 54 or retain it against rotation.

Figure 16:
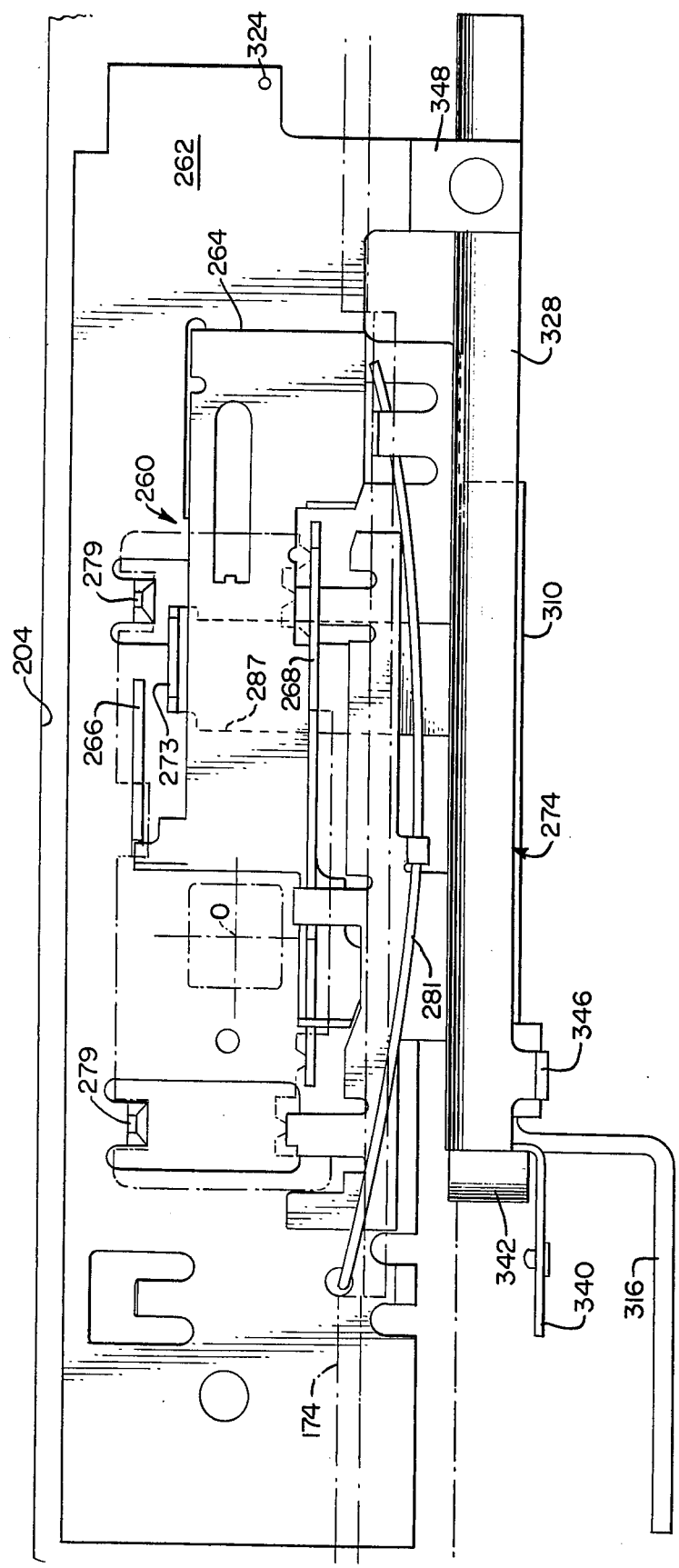
FIG. 16 is an enlarged plan view illustrating a portion of the cassette well floor of the invention.

As shown in FIGS. 12 and 14-17 of the drawings, an aperture block assembly, generally designated by the reference numeral 260, is positioned on the floor 205 of the cassette well 26. Individual components of this assembly are shown most clearly in FIG. 17 to include a foundation plate 262, a blinder plate 264, left and right pressure plate lifters 266 and 268, respectively, a moveable side guide 270 and an aperture block 272. These components, in conjunction with a feed claw 273 integral with a feed shuttle 274 (FIG. 16) to be described, are oriented in the well 26 to extend through and operate within the opening 52 in the bottom wall of the cassette 27. Thus, the aperture block defines a framing window 275 located in a longitudinal groove 276 to delineate elevated film strip tracks 277 and is peripherally dimensioned under chamfered edges 278 to fit closely within the cassette opening 52 and thus locate the bottom portion of the cassette precisely in the well 26. Also, the tracks 277 cooperate with the pressure plate 93 in the cassette 27 to retain the film strip 44 in a vertically fixed planar orientation as it passes the window 275. Lateral positioning of the film strip as it passes the window 275 is effected by fixed guide pins 279 struck out of the foundation plate 262 and extending upwardly beyond the level of the tracks 277 to guidingly engage one edge of the film strip 44. The opposite edge of the film strip is engaged by a pair of similarly shaped guide pins 280 upstanding from the side guide 270. The side guide is slidably mounted on the foundation plate 262 and biased toward the fixed guide pins 279 by a wireform spring 281 as shown in FIG. 16.

While the retention of the film strip against the tracks 277 on the aperture block by the pressure plate 93 in the cassette is desirable during the projection for viewing of successive frame images carried on the film strip, the drag forces exerted on the film strip during film processing and/or rewind are objectionable and moreover, the retention of the film strip precisely in a fixed orientation with respect to the framing window 275 is not necessary during these operational modes. To this end, the left and right plate lifters 266 and 268 are positioned for vertical movement within the aperture block 272 and are movable from a depressed or retracted position upwardly into engagement with the cassette contained, downwardly biased pressure plate 93 to space the pressure plate from the film and the tracks 277. Upward movement of the lifters 266 and 268 is effected by camming surfaces 282 provided on the blinder plate 264 which is shiftable longitudinally with respect to the foundation plate 262 and aperture block 272, the latter being fixed to each other and to the cassette well floor 205. Such longitudinal shifting of the blinder plate is accomplished by connection of sound link carried structure to be described with a depending bifurcated lug 283 on the blinder plate 264 and which extends through an elongated slot aperature 284 to be presented under the well 26 as may be seen in FIG. 14, for example.

The blinder plate 264 also carries a depending cam tab 285 which extends through an opening 286 in the foundation plate 262 to engage an arm 287 on which the film feeding claw 273 is integrally mounted. Thus it will be appreciated that simultaneously with elevation of the pressure plate lifters 266 and 268, the claw 273 will be depressed by the camming tab 285 (FIG. 15) on the blinder plate 264 to a position out of engagement with the film strip 44, such as during rewind and/or processing operations. The blinder plate is further formed with an opaque plate or body portion 288 positioned adjacent a cut-out 289 and normally positioned forwardly and clear of the framing window 275 in the position illustrated in FIG. 16 of the drawings. Rearward movement of the blinder plate by the sound link 178 however, moves the plate portion under the window 275 to prevent upward passage of light to the film strip 44, again principally during processing thereof.

The term "sound link" has been used to designate the elongated plate-like link member 178 because of the function this member serves in linking operation of the sound module 126 to the cam surface 177 on the programming cam disc 175. Although the term, therefore, is aptly applied to the link 178, the link has broader application in the operation of the viewer and as such, would be incorporated to effect operation of the snubber pawl 246 and blinder plate 264 in the cassette well 26 even though the sound module 126 might be omitted from the viewer as an optional system feature.

Figure 18:
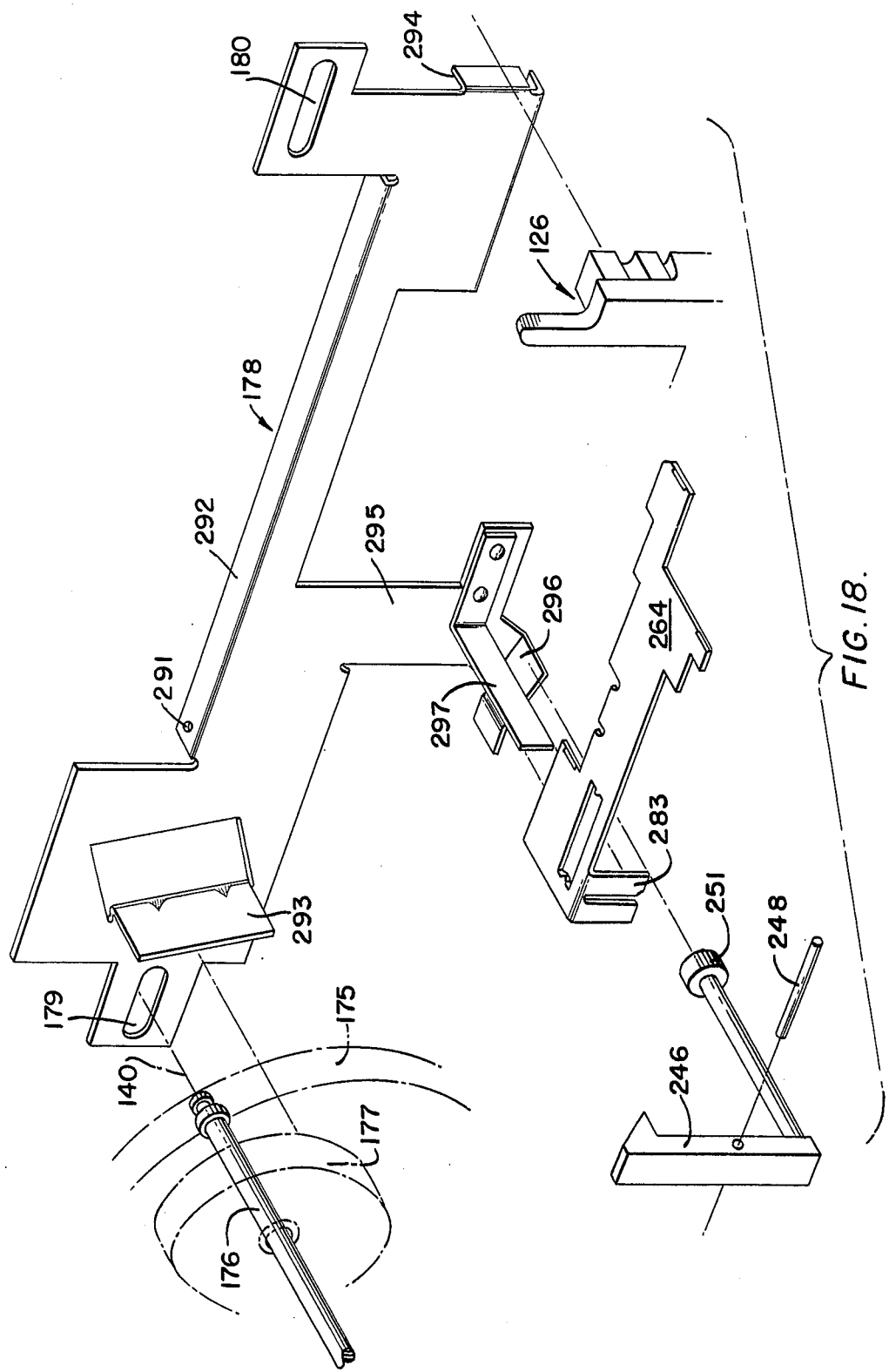
FIG. 18 is an exploded perspective view illustrating the sound link component of the present invention.
Figure 19:
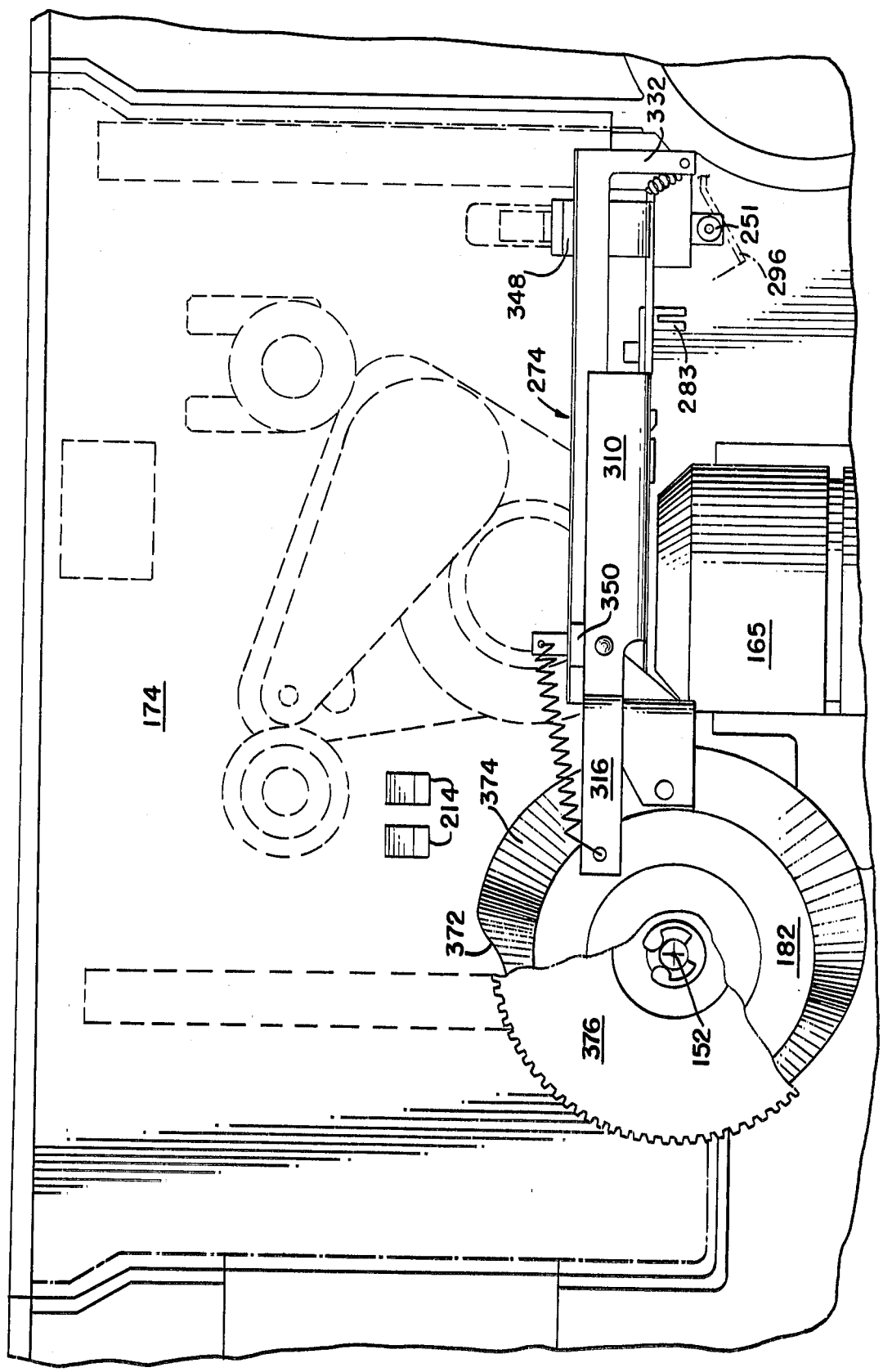
FIG. 19 is an enlarged fragmentary side elevation of the viewer well components previously shown in FIG. 10.

The structural organization of the sound link 178 and related components is illustrated most clearly in FIGS. 9 and 18 of the drawings. As pointed out above in connection with the illustration of FIG. 9, the sound link is supported from the right side of the casting 100 by slots 179 and 180 in engagement respectively with the programming cam axle 176 at its front end and the pin 181 at the rear end thereof. Also as shown in FIG. 9, a tension spring 290 extends from the axle 176 to an aperture 291 at the front end of a reinforcing flange 292 to the axle 176 in a manner such that the sound link is biased forwardly toward the axle 176 and against the peripheral cam surface 177 on the right side of the programming cam disc 175.

As shown most clearly in FIG. 18, a tab 293 is struck out from the front end portion of the link 178 to establish an inclined cam follower surface to engage the peripheral cam surface 177. In light of the tab 293 together with the spring 290 and slots 179 and 180, it will be appreciated that the link 178 will be moved forwardly or rearwardly parallel to the axes of the slots 179 and 180 with variations in the throw of the cam surface 177. A similar flange 294 is struck out at the rear end of the link 178 to serve as a pusher plate to engage the upper end of the sound module 126. It will be appreciated by reference to FIG. 9 that rearward movement of the sound link 178 will effect a retraction of the head H and capstan C from the openings 94 and 95 in the cassette 27 whereas forward movement of the link 178 will permit the head and capstan to advance into an operative position with respect to the film strip 44 presented in the openings 94 and 95.

Near the longitudinal center of the sound link 178, a depending leg portion 295 is provided to support a rearwardly inclined projecting flange 296 at its lower end and an L-shaped spring clip 297 elevated slightly above and slightly rearwardly of the flange 296. The position of the clip 297 enables the projecting leg thereof to engage the depending bifurcated lug 283 provided on the blinder plate 264. To this end, it will be appreciated that the projecting leg portion of the clip 297 is of a sufficient length to extend across the width of the cassette well 26.

The flange 296 establishes an actuating ramp to be engaged by the roller 251 connected to the snubber pawl 246. Thus it will be seen that rearward movement of the link 178 and ramp flange 296 will elevate the roller 251 to pivot the pawl 246 about the pintle 248 out of the well 26. Forward movement of the link 178, on the other hand, will allow the roller 251 to drop and thus pivot the pawl 246 into the well for engagement with the snubbing roller hub 56 carried by the cassette 27.

Figure 17:
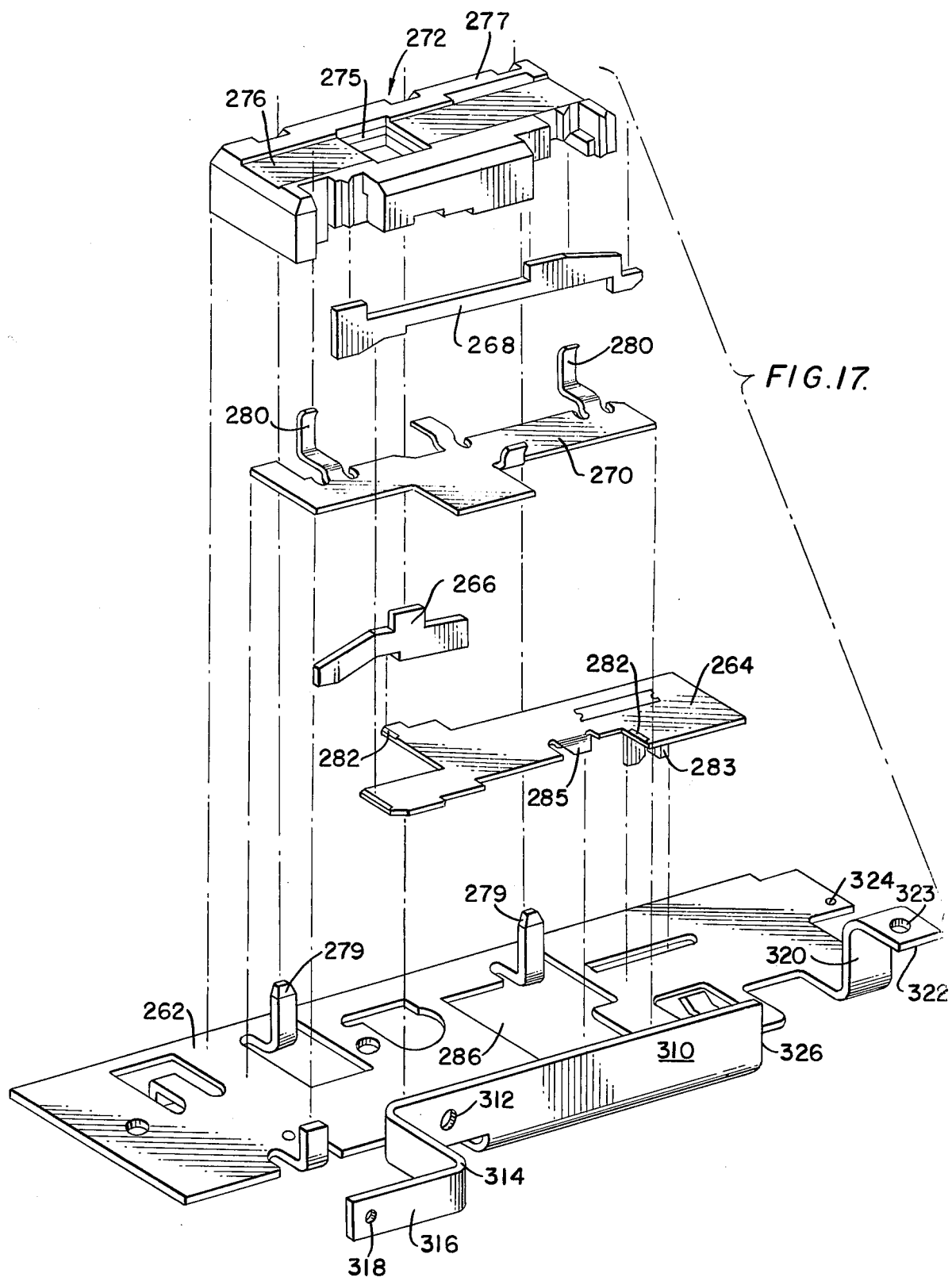
FIG. 17 is an exploded perspective view of the components shown in FIG. 16.

The structure and operation of the film strip feed shuttle 274 may be understood by reference to FIGS. 19-23 of the drawings in conjunction with FIGS. 9, 16 and 17. In FIG. 16, the aperture block assembly, including the foundation plate 262, is shown from above with the line of the cassette well cover plate 174 at its juncture with the cassette well floor superimposed thereon in phantom lines. The lower portion of the cover plate 174 adjacent the aperture block assembly 260 is cut out so that the right side of the foundation plate 264 may extend past the wall 208 of the plate 174 and be presented on the right side of the cassette well exterior (See also FIG. 21.) With reference to FIG. 17, portions of the foundation plate 262 which extend beyond the cover plate 174 include a vertical flange 310 having an aperture 312 therein and joining at its rear end with an L-shaped portion 314 to establish a laterally displaced, rearwardly extending supporting tab 316 having an aperture 318 formed therein. At the front right corner of the foundation plate, an inverted L-shaped bracket formation 320 is provided to establish the laterally projecting horizontal supporting tab 322 having an aperture 323 therein. The bracket formation 320 also projects outwardly through the cover plate 174. An aperture 324 is located near the front end of the plate 262 to be exposed on the external underside of the cassette well 26. It will be noted further in FIGS. 16 and 17 that the flange 310 projects laterally beyond the bracket 320 and terminates at an end 326 spaced longitudinally from the bracket.

As shown most clearly in FIGS. 22 and 23, the shuttle 274 is formed with an elongated body portion 328 having an arcuate cross-section extending through a quadrant of a circle concentric with the longitudinal axis 329 of the shuttle. The arm 287 supporting the claw 273 is integral with the body through a depending flanged leg 330 joining as a tangent with the lower edge of the transversely arcuate body 328. A depending tab 332 extends similarly in tangential fashion from the lower edge of the body 328 at the front end thereof. The rear end of the body is provided with a cam follower bracket 334 formed as a double bent extension of a depending tangential web 336. The bracket 334 includes a normal flange 338 joining with an axial flange or tab 340. The normal flange 338 supports a peripheral cam follower 342 in a position to underlie the body 328. A radial cam follower button 344 is supported from the tab 340 on the side thereof adjacent the peripheral cam follower 342 and under the axis 329. An aperture spring tab 346 is struck upwardly from the upper edge of the transversely arcuate body portion 328.

The shuttle 274 is supported for both reciprocable and rotational motion on the axis 329 and with respect to the foundation plate 262 by a pair of longitudinally spaced, inner and outer bearing blocks 348 and 350 respectively. The blocks are molded from low friction material, such as a synthetic resinous material sold under the trademark "Delrin AF" and are shaped for attachment to the foundation plate 262 by projecting post formations 352 and 353 adapted to extend through the apertures 323 and 312, respectively, in the tabs 316 and 322. After insertion through the apertures, the post formations are deformed ultrasonically to provide the headed formations shown.

The front or inner bearing block 348 is formed with a pair of perpendicular bearing surfaces, 356 and 358 to engage the convex surface of the arcuate shuttle body 328. The outer and rear bearing block 350 is provided with external bearing surfaces 362 and 364 joined by a chamfered surface 366 to engage the inner concave arcuate surface of the body 328.

To retain the shuttle 274 against the respective bearing blocks 348 and 350, a pair of tension springs 368 and 370 are employed. As will be seen in FIGS. 17 and 20-22, the spring 368 at the front of the shuttle extends from an aperture near the bottom of the depending tab 332 back to the aperture 324 in the front of the foundation plate 262 (FIG. 17). The axis of tension spring 368 is therefore essentially inwardly toward the block 348 and upwardly against the bearing surfaces 356 and 358. In the vector diagram of FIG. 22A, the spring 368 and block 348 are represented by solid line arrows whereas the force vector components acting on the tab 332 are presented by arrows $i$ and $u$.

The spring 370 extends between the upstanding tab 346 or the shuttle body 328 rearwardly, outwardly and downwardly to the tab 316 formed on the foundation plate 262. The spring 370, therefore, not only biases the rear end of the shuttle body against the respective bearing surfaces of the outer bearing block 350 but also, exerts a major force component rearwardly to retain the cam follower 342 against a peripheral cam surface 372 on the shuttle drive cam 182 (see FIG. 19). The force components acting on the tab 346 are represented in FIG. 23B by the arrows $d$, $o$ and $r'$.

The drive cam 182, in addition to having the peripheral camming surface 372, is provided with a radial cam surface 374 for engagement by the cam follower button 344 supported by the vertical flange portion 340 of the shuttle body 328. The button will be biased against the radial cam surface 374 as a result of tension in the spring 368 at the opposite or forward end of the shuttle body. The cam 182 is driven rotatably about the axis 152 as a result of its being coupled with a gear 376 in meshing engagement with a pinion gear 378 keyed to the right hand end of the shuttle shaft 185 described above and as shown in FIG. 9 of the drawings.

Rotation of the shaft 185 and correspondingly rotation of the cam 182 in direct synchronization with the shutter 184 will effect a combined axial reciprocation of the shuttle 274 as a result of variations in throw of the peripheral cam surface 372 and simultaneously rotational movement about the longitudinal axis 329 of the body. As a result of this combined shuttle movement, the claw 273 will be elevated to engage the sprocket holes 70 in the film strip 74 during forward reciprocation of the claw 273 and body 328 but retracted downwardly out of engagement with the sprocket holes 70 upon return or rearward reciprocating movement of the claw and body. It will be appreciated therefore that the claw will be driven to advance the film strip 44 so that each image frame thereon will be positioned successively over the aperture window 275 of the aperture block 272. Moreover, depression of the shuttle arm 287 by the cam tab 285 on the blinder plate 264 will operate only to move the follower button 344 away from the radial cam surface 374 against the bias of the tension spring 368.

A more complete understanding of the shift plate assembly 189, previously identified generally with reference to FIG. 10, as well as the components associated therewith, may be gained by reference again to FIG. 10 and FIGS. 24-26 of the drawings. In FIG. 24, the assembly 189 is shown to include a base plate 410 having a somewhat S-shaped peripheral contour and formed with out-turned flanges 412 and 414 at opposite upper and lower ends, respectively. As mentioned above, the plate 410 is supported along the left side of the casting 100 for pivotal movement about the axis 191 by the pivot bolt 190. The bolt 190 also extends though a bracket plate 416 having a triangular portion overlying the lower end portion of the base plate 410. The bracket plate is yieldably restrained against pivotal movement on the axis 191 independently of the base plate 410 by a torsion spring 418. The bracket 416 includes an upstanding arm portion 420 supporting near its upper end a cam follower 422. As shown in FIGS. 24 and 26, the cam follower 422 projects in parallel with the pivot axis 191 and is aligned to extend through the cam follower opening 157 in the casting 100 for engagement with the left side of the programming cam disc 175 in a manner to be described.

The upper end of the plate 410 is supported for limited movement in a plane normal to the axis 191 by a flanged collar 424 adapted to extend through a slot-like aperture 426 in the base plate 410 and be secured against the casting 100 by a screw 428. Also, it will be noted that the plate 410 is provided with a depending ear portion or tab 430 having a slot 432 formed therein. The pin 223 on the blinder 221 described above extends through the arcuate aperture 224 and the slot 432. In light of the organization of these components thus shown in FIG. 24, it will be appreciated that upward pivotal movement of the plate 410 about the axis 191 will pivot the blinder 221 upwardly whereas downward movement of the plate 410 will effect pivotal movement of the blinder downwardly in the manner described above with reference to FIG. 14.

As may be seen in FIG. 10, and 24, the shift plate assembly 189 carries the power transmission shaft 192, by way of end bearing journals 434 and 436 mounted in the respective end flanges 412 and 414, for free rotation on its longitudinal axis which extends in an upwardly inclined relationship under the takeup stool axis 144 and over the supply spool axis 146. Worms 438 and 440 are positioned on the transmission shaft 192 to engage either one or the other of the respective take-up and supply spool worm gears 193 and 194 depending on the pivotal position of the shift plate 410. In this latter respect, it will be noted that the upper shaft journal 434 is extended beyond the flange 412 as an extension of the shaft 192 and positioned between a pair of pins 442 and 444 extending from the upper righthand side of the casting 100. Thus, when the shaft extension is loaded against the pin 444, the worm 440 will be in engagement with the supply spool drive gear 194 whereas the worm 438 will be displaced out of engagement with the take-up worm gear 193. Movement of the shaft extension against the pin 442, however, will move the worm 438 into engagement with the take-up worm gear 193 and displace the worm 440 out of engagement with the supply spool worme gear 194. Thus it will be seen that for a given direction of rotation in the shaft 192 and worms 438 and 440, rotation of the supply spool gear 194 during engagement therewith by the worm 440 will drive the supply spool gear in one direction whereas the same direction of rotation in the worm 438 during engagement thereof with the take-up spool worm gear 193 will effect rotation of the gear 193 in an opposite direction. This operation is consistent with the previously described operation of the cassette spools 36 and 37 with reference to FIG. 4 of the drawings. In other words, during advance of the film strip from the supply spool 36 to the take-up spool 37, the take-up spool is rotatably driven whereas the supply spool rotates solely under the influence of the tension on the film strip 44. During rewind, however, the supply spool 36 must be rotatably driven whereas the take-up spool 37 is rotated by the film strip tension.

The transmission of drive torque from the motor shaft 164 through the shaft 192 to the respective spool worm gears 193 or 194, is depicted most clearly in FIGS. 24 and 25 of the drawings. As mentioned previously, the motor shaft 164 extends along the axis 138 through the casting 100 ultimately to the pulley 188 for transfer of torque by the belt 187 to components disposed on the axis 142. Also keyed on the motor shaft 164 is a helical gear 446 in a position to engage a helical gear 448 supported plate assembly 189. As shown in FIG. 25, the gear 448 is keyed for rotation with a clutch 449, specifically a clutch face 450, on a circular end portion 452 of the shaft 192. A cooperating clutch face 454 is carried by a plate 456 coupled to the shaft 192 by virtue of a square or otherwise non-circular shaft cross-section extending from the portion 452 along the remaining length of the shaft 192 to the journal 434 at the upper end thereof. The clutch faces 450 and 454 are retained in engagement by a concentric compression spring 458 extending between the plate 456 and a collar 460 integrally formed on the externally threaded portion 462 of an adjustment screw assembly 464. It will be appreciated that torque transmitted through the friction clutch 449 will be dependent on the axial force exerted by the spring 458 and that such force will be adjustable by virtue of the assembly 464. Thus, motor shaft torque is transmitted through the worm gear 446 to the gear 448 and then to the shaft 192 by way of the clutch faces 450 and 454. In practice, the clutch faces will be adjusted so that the torque transmitted to the shaft will be limited such that upon reaching the end of the film strip as during rewind, rotation of the supply spool will cease without breaking the film strip even though motor torque continues to be transmitted to the gear 448.

In FIGS. 27-31, support structure for the take-up and supply spool drive heads 225 and 226 are shown. Also shown in these figures is the drive organization by which torque is transmitted from the transmission shaft 192 on the shift plate assembly 189 through the worms 438 and 440 to the heads 225 and 226, respectively. In particular, support for the respective rotatable drive heads 225 and 226 is provided by a pair of hub bosses 446 and 468 carrying flanged bearing sleeves 470 and 472 for rotatably supporting head connected shafts 474 and 476 on the axes 144 and 146. In connection with the supply spool head 226, the shaft 476 thereof is keyed directly to the drive gear 194, thus effecting a direct transmission of torque from the transmission shaft clutch 449 to supply spool drive head 226 when the gear 194 is engaged by the worm 440.

Torque transmission from the transmission shaft mounted worm gear 438 through the gear 193 to the take-up spool drive head 225, however, is limited by an adjustable low torque transmitting clutch 478. Also it will be noted that the supporting boss 466 for the take-up spool drive head 225 is spaced from the exterior surface of the wall 204 by a recess 480 and further that the wall in the region of the hub 466 is provided with vertical slots 482 positioned equally on opposite sides of the axis 144 and extending through the wall 204. (See also FIG. 14.)

As shown most clearly in FIG. 28 of the drawings, the clutch 478 includes a plate 484 threadably received on the outer end of the shaft 474 to be axially adjustable along the axis 144 and secured against rotation with respect to the shaft by lock nut assembly 486 or other equivalent means. The gear 193 is formed with a clutch plate portion 488 at its outer end and is journalled for rotation on the shaft 474 by a bearing sleeve 490. A clutch spring 492 illustrated most clearly in FIG. 30, is keyed to the clutch plate 484 and is situated between the clutch plate 484 and the clutch plate portion 488 to enable transmission of torque from the worm 193 through the clutch spring to the clutch plate 484 and the shaft 474.

As mentioned, the clutch 478 is a low torque transmitting clutch and as such, will allow the drive to the take-up spool 37 in the cassette 27 to slip under the drag on the film strip 44 due to a partial wrap thereof on the snubbing roller when the latter is fixed against rotation as during operation of the film feeding shuttle claw 273 during incremental advance of the film strip for projection.

As shown in FIGS. 29 and 31, the rear face of the take-up spool drive head 225 supports a commutator disc 494 for rotation directly therewith. The disc incorporates a pair of diametrically opposed metal or otherwise electrically conductive segments 495 interconnected electrically by a hub 496. The segments 495 are spaced by non-conductive plastic quadrant portions 497.

As shown in FIG. 29, the previously identified jam sensing switch S-3 is adapted to be received in the recess 480 and slotted apertures 482 and is fitted with brushes 498 retained in engagement with a radial face of the commutator disc 494. In light of this organization, it will be seen that during rotation of the take-up spool drive head 225 and thus also of the commutator disc 494, the brushes 498 will alternate between conditions of circuit continuity and discontinuity as they alternately contact the conductive segments 495 and the non-conductive segments 497. If, on the other hand, rotation of the take-up spool drive head 225 is interrupted for any reason, such as for example in the event the film strip becomes jammed in its path from the supply spool or when the film strip 44 reaches the end of its length on the supply spool, the switch S-3 will cease pulsing to provide an indication of such condition.

The programming cam disc 175, as mentioned, is mounted on the right side of the casting 100 and carries on its exposed right side, the peripheral sound link cam 177. The left side of the cam is presented through the above-identified openings 155-158 in the casting web for cooperation with the several switches SO, SP, SR, and SL, the latch gear assembly 195, the eject bar 196 and the follower 422 of the shift plate assembly 189. The structure of the camming disc 175 and the relationship particularly of the cam surfaces presented on the left radial face thereof, in the context of the disclosed embodiment, to components presented on the left side of the casting 100 will now be described with reference to FIGS. 32-37 of the drawings.

Figure 32:
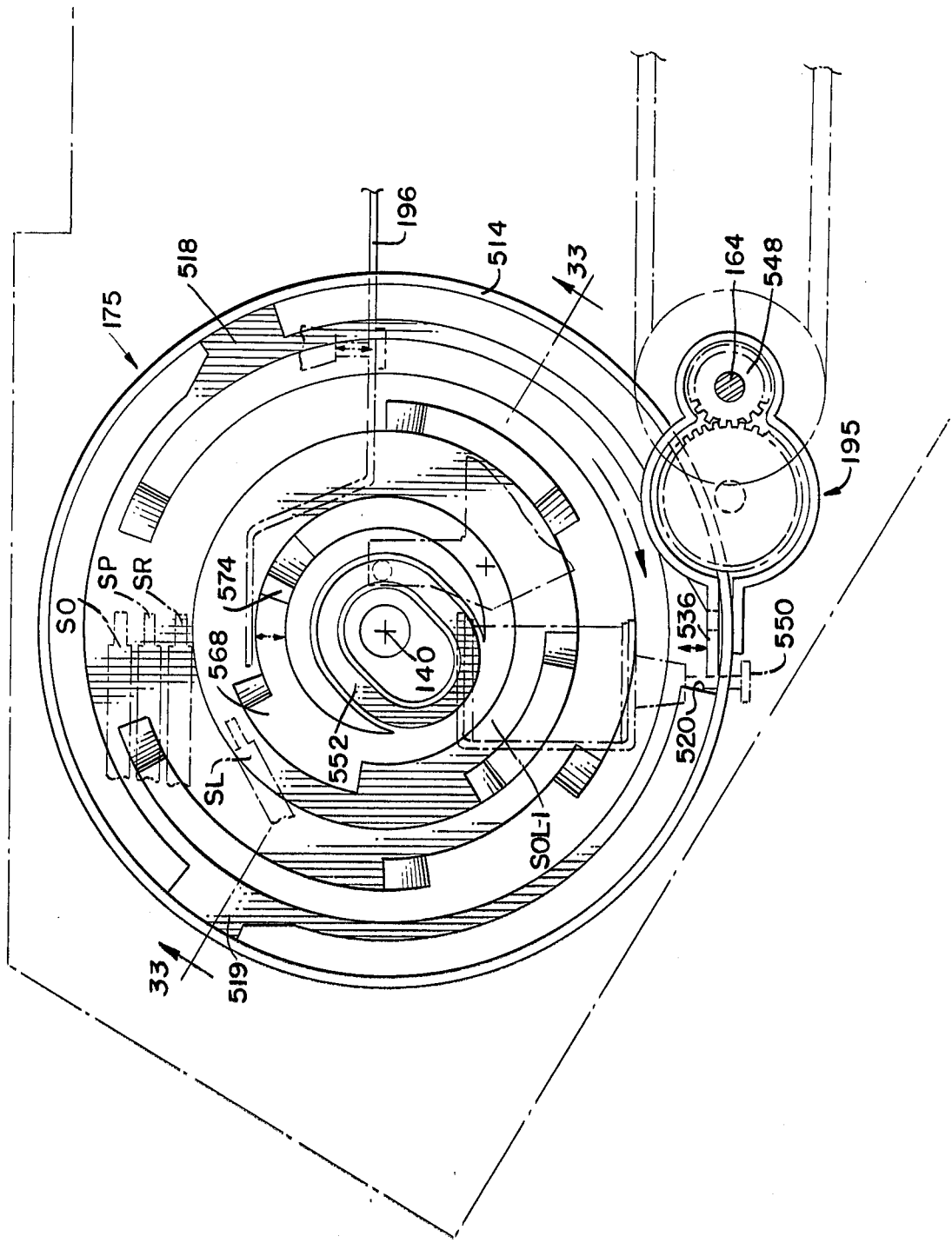
FIG. 32 is a side elevation of one side of the programming cam incorporated in the viewer of the present invention and latch gear assembly with other components superimposed thereon in phantom lines.
Figure 33:
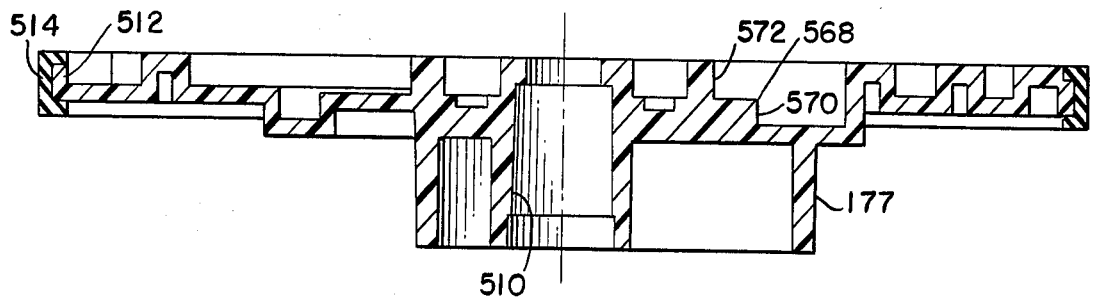
FIG. 33 is an enlarged cross-section taken on line 33—33 of FIG. 32.
Figure 34:
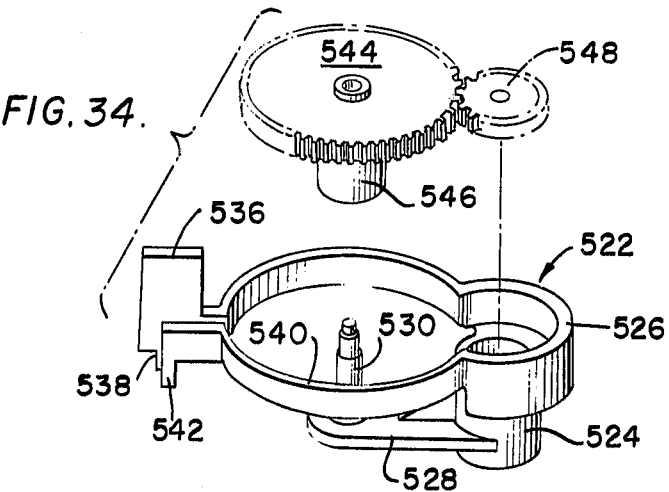
FIG. 34 is an exploded perspective view illustrating the components of the latch gear mechanism employed in accordance with the present invention for indexing the programming cam of FIGS. 32 and 33.
Figure 35:
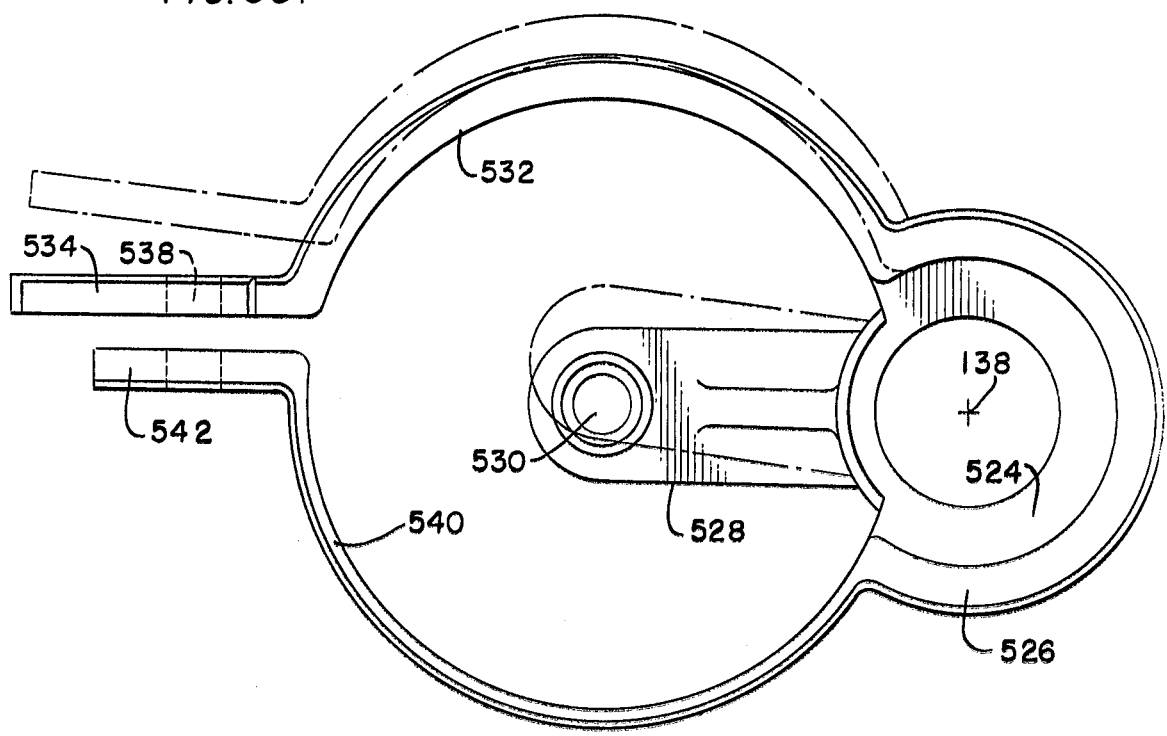
FIG. 35 is an enlarged side elevation of the latch member shown at a smaller scale in FIG. 34.

As shown most clearly in FIG. 33, the cam disc 175 is preferably formed as an integral molding of an appropriate synthetic resinous material to establish a central mounting hub 510, the axially projecting peripheral cam 177, several cam surfaces on the opposite side to be described and a peripheral rib or flange 512. A rim or tire 514 of a pliant friction material such as urethane, neoprene or the like is secured about the peripheral flange 512 as shown. In the overall cinematographic system incorporating the viewer 25 and the cassette 27, the disc 175 functions to program the several components of the viewer for one of three operational modes; namely, "project", "rewind/process" and "off". To this end, the programming disc 175 is adapted to be driven rotatably about the axis 140 in a clockwise direction as seen in FIG. 32 to successive indexed positions spaced approximately 120° from each other and latched in each of these indexed positions throughout the duration of the operational mode so programmed. The physical rotating and latching of the programming disc 175 is accomplished by the latch gear assembly 195 in conjunction with an outer peripheral cam slot 516 interrupted by three latching notches 518, 519 and 520. The components of the latch gear assembly 195 are shown most clearly in FIG. 34 to include an integrally molded latch member 522 shaped having a pivot hub portion 524 extending axially from a pinion gear housing portion 526 and supporting at its extending end, a radial arm portion 528 in turn carrying an integral latch gear axle 530. The gear housing portion 526 joins on one side with an arcuate follower bracket 532 extending radially on the end thereof opposite from the hub 524 as a flange 534 having a solenoid lift tab 536 extending to one side or outwardly, and a cam follower tab 538 extending in the opposite direction or inwardly. The gear housing portion 526 extends from its opposite side through a similar arcuately shaped spring portion 540 having at its distal end a stop flange and tab formation 542. A latch gear 544 having an integral capstan 546 projecting concentrically therefrom is journalled on the axle 530 in a position mesh with a drive pinion 548 disposed concentrically in the housing portion 526.

In FIG. 32, the latch gear assembly is shown in its mounted position relative to the programming cam disc 175. As such, the pinion gear 548 is keyed for rotation on the motor shaft 164 on the axis 138. Also, the latch member is pivoted freely about the axis 138. The flange 536 in the mounted latch gear assembly is positioned to overlie a plunger foot 550 on the solenoid SOL-1.

In light of this organization, it will be seen that when the solenoid SOL-1 is energized to lift the plunger foot 550, the flange 536 on the latch member 522 will be elevated to lift the follower tab 538 from the respective notch 518, 519 or 520 in which it was previously located upwardly to the radius of the peripheral cam track 516. Simultaneously, the capstan 546 will engge the tire 514 to rotate the cam disc 175. Once such rotation is initiated, the solenoid SOL-1 may be de-energized without changing the driving condition of the latch gear assembly 195 until the follower tab 538 drops into the next successive notch 518-520. As soon as the follower tab drops into such a notch, the capstan will move radially away from the tire 514 so that continued rotation of the motor shaft 164 and of the capstan 546 will have no rotational effect on the cam disc 175. Thus, it will be appreciated that not only is the programming disc drive disengaged, but also the follower tab 538 operates to latch the disc in the programmed position. In this respect it will be noted that the flange and tab 542 lie on the outside of the tire 514 and through the arcuate spring portion 540, exerts an outward bias on the follower 538. Thus, the freely pivoted mounting of the member 522 on the axis 138 will allow movement of the latch gear assembly solely under the force of the solenoid SOL-1 and the return bias of the arcuate spring portion 540.

Proceeding inwardly from the peripheral track 516, the left side of the cam disc 175 is formed with concentric radial cam surfaces to be aligned with the respective switches SO, SP SR and SL. The normally opened switch SO functions to provide an indication of viewer operation, a condition which exists in all rotary positions of the cam disc 175 except the "off" position. Thus, the cam track underlying the switch SO is an elongated angular track having a relatively short interrupted portion during which the switch SO will be returned to its normally open condition. The switches SP and SR indicate that the cam is programmed for project and rewind respectively whereas the switch SL is closed during operation of the projection lamp 128. The cam surfaces underlying these latter switches are therefore positioned appropriately to close or open the switches during the respective operations indicated thereby. Centrally of the left cam face of the disc 175 is a peripheral cam track 552 in which the shift plate cam follower 422 engages. Outwardly of the track 522 is a cam track formation adapted to engage for actuation the cassette eject bar 196 the functioning of which was previously described generally with reference to FIG. 13A.

Figure 37:
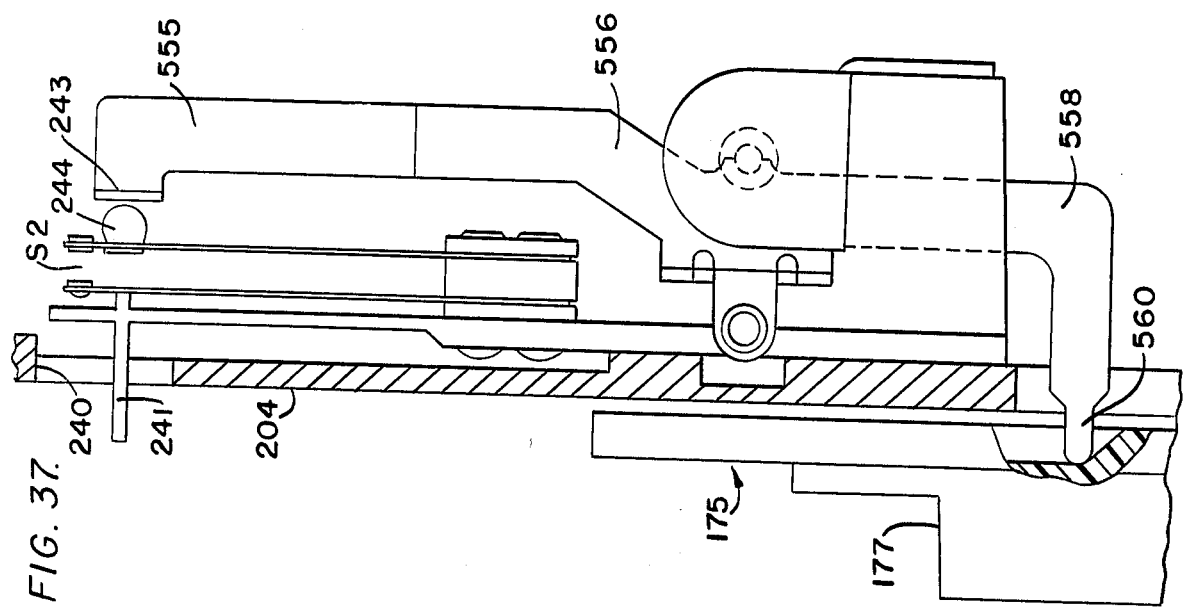
FIG. 37 is a fragmentary cross-section on line 37—37 of FIG. 36.
Figure 36:
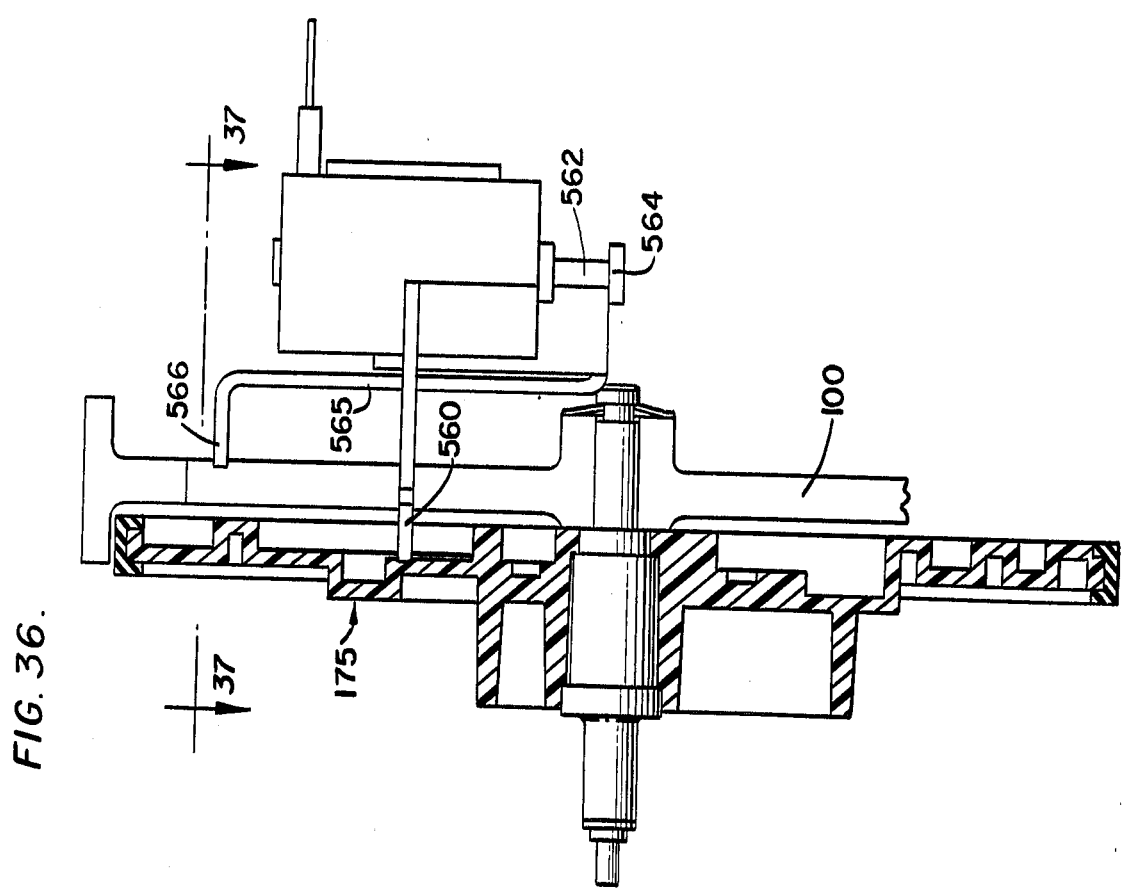
FIG. 36 is an end view of the cassette eject bar of the present invention superimposed on the programming cam shown in cross-section.

As shown in FIGS. 10, 36 and 37, the eject bar 196 extends from the rear end thereof having the push tab 243, forwardly through a horizontal arm portion 555, downwardly through a central U-shaped portion 556 and upwardly to a horizontal front end portion 558 terminating at an inwardly turned axial cam follower leg 560. At the base of the U-shaped portion 556, the eject bar pivotally engages a plunger 562 on the solenoid SOL-2 and which is provided with an enlarged diameter foot 564. An upstanding flange 565 supports a horizontal push tab 556 in a position to engage and open the switch S-1 (See FIG. 10) when the solenoid SOL-2 is actuated to lift the eject bar 196 upwardly.

As shown in FIGS. 32 and 33, the left face of the cam disc 175 is provided with a stepped radial cam formation 568 having two increments of axial throw represented by the axial surfaces 570 and 572. The inner portion of the cam formation 568 is formed with an eject lug 574 positioned to be engaged by the follower leg 560 of the eject arm 196 when the latter is released by the solenoid SOL-2 to the lower of its two positions. The lug 574 will advance the follower leg 560 outwardly causing pivotal movement of the eject bar 196 about the plunger rod 560 of the solenoid SOL-2, moving the push flange 243 inwardly to eject the cassette 14 from the cassette well. When the solenoid SOL-2 is energized, however, the follower leg 560 is positioned radially so as not to be engaged by the lug 174 and may rest on the axial surface 570 in its elevated position without the solenoid SOL-2 being energized. If the latter condition exists during programming rotation of the cam disc 175, that is, if the solenoid SOL-2 is not energized and the follower leg 560 is supported in its upper position by the axial surface 570, the cam surface 568 will move the end of the leg 560 outwardly so that it will fall down on the surface 572 to be engaged by the eject lug 574 upon rotation of the cam disc to the "off" position.

A full understanding of the operation of the power switch S2 may now be appreciated in light of the illustration of the switch in FIG. 37 as well as the manner in which the eject bar is actuated by the programming cam lug 574 (FIG. 32) to eject the cassette. In particular, it will be noted that the power switch S2 is formed having separate inner and outer contacts each supported independently on resilient leaf springs. The significance of this is that the power switch S2 will be moved from an opened or off condition to a closed or on state by outward movement of the push rod 241, as when the cassette is inserted into the cassette well, due to movement of the inner switch contact against the outer switch contact irrespective of whether the latter is retained by the push flange 243. Conversely, movement of the outer contact of the switch S2 by the push tab 33 inwardly against the inner contact will occur solely as a result of movement in the push flange 243 whether or not a cassette is in the well. The significance of this operation is that the power switch S2 will be closed automatically upon cassette insertion but will not open upon cassette ejection unless the push flange 243 has moved outwardly after cassette ejection to allow the outer contact of the switch S2 to move away from the inner contact thereof. Thus, the motor 128 will continue to operate after cassette ejection for a sufficient duration to drive the programming cam 175 until the lug 574 thereon has moved past the follower lug 560 on the eject bar, fully to the off position. As soon as the cam lug 574 passes the follower 560 on the eject bar, the eject bar will pivot to allow the switch S2 to open and shut off the motor.

Although a complete understanding of detailed operation of the viewer 25 will be gained form the description of logic circuitry to follow below in conjunction with FIGS. 39–52 of the drawings, completely automated operation of the viewer 25 to perform the appropriate operation on the cassette 27 and the film strip contained therein is predicated on (1) the insertion of the cassette into the cassette well 26, (2) the processed or unprocessed condition of the film strip 44 indicated by the shunted or open circuit condition of the cassette contacts CC, and (3) whether the cassette 27 is equipped for "sound" or "silent" operation during the projection of motion pictures on the viewer screen 28. Also it will be appreciated that the film strip 44, in a given cassette, will either be stationary with no rotation of the supply and take-up spools 36 and 37 as during an "off" condition of the viewer; advanced from the supply spool 36 to the take-up spool 37 by a combination of take-up spool drive and operation of the feed shuttle 274 as in a "project" mode of operation; or rewound from the take-up spool to the supply spool by driving the supply spool either during film strip processing or after a projection to enable subsequent projection cycles, a mode of operation termed "rewind/process".

As explaned above, insertion of a cassette into the cassette well 26 closes the power switch S-2 to turn on the viewer 25 automatically. Thereafter, the particular operational mode to which the viewer will be programmed is determined by the angular position in which the programming cam disc 175 is latched by engagement of the latch tab 536 in on or the other of the notches 518, 519 and 520. An understanding of the viewer programming function served by the cam disc 175 may be understood by reference to FIG. 38 of the drawings.

Figure 38:
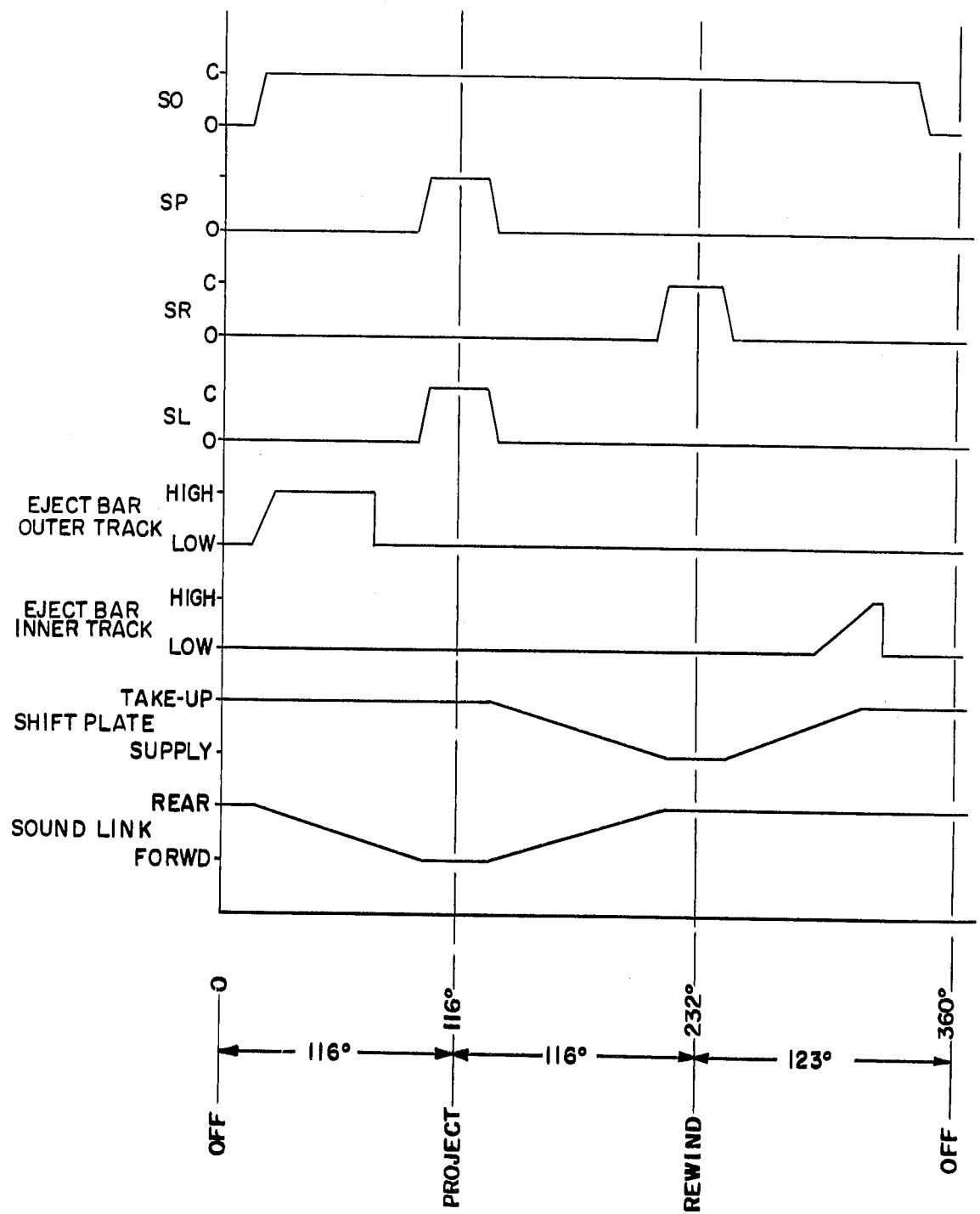
FIG. 38 is a schematic diagram illustrating the relation of cam tracks to angular positioning of programming cam disc shown in FIGS. 32 and 35.

In FIG. 38, the condition of the cam surfaces on the programming disc 175 are depicted in connection with 360° of programming cam disc rotation. Thus movement of the cam disc through approximately 116° of rotation reprograms the viewer from the off mode to the project mode; movement through another 116° changes the condition from the project mode to the rewind/process mode and movementt through a premaining 123° returns the cam disc from the rewind/process mode back to the off mode. Operation of the programming cam control switches SO, SP, SR, and SL is believed self-explained from the illustration given in FIG. 38.

It will be noted that the track 568 moves from a low condition to a high condition as the cam disc 75 is advanced from the off mode to the project mode to enable the eject bar 196 for subsequent actuation by the inwardly disposed cam track 574 after the rewind/process mode.

The condition of the shift plate assembly 189 is controlled by the track 562 to be in driving engagement with the take-up spool 37 in both the off mode and the project mode but shifts to engagement with the supply spool in the rewind/process mode. Also it will be recalled from FIGS. 14 and 24 that the blinder 221 moves from the position shown in FIG. 14 in which it is clear of the projection lamp aperture 219 as the shift plate moves from engagement with the take-up spool to the supply spool. In other words, the blinder 221 will be positioned over the projection lamp aperture 219 when the programming cam disc is in the rewind/process mode position.

The sound link, being positioned by the cam surface 177 on the disc 175, is positioned by the cam surface 177 to be rearward when the viewer is in the off mode and rewind/process mode and forward only when the viewer is in the project mode. As a result of this positioning of the sound link 178, in the off mode of the viewer 25, the sound module 126 (if present) will be retracted so that the head H and capstan C are clear of the cassette well 26; the snubber pawl 246 will be pivoted outwardly of the cassette well; and the blinder plate 264 will be positioned to cover the framing window 275 in the aperture block assembly 260. This condition will also exist during the rewind/process mode of viewer operation. As the disc 175 is rotated to condition the viewer 25 for the project mode of operation, the sound link is moved to its forward position thereby to position the sound module 126 for sound operation, shift the blinder plate 264 to open the framing window 275 and pivot the snubber pawl so that the tang 249 thereon engages the snubbling roller 54 of the cassette.

In the normal projection of a processed cassette, the viewer 25 will operate generally such that the film strip will be fed automatically from the supply spool to the take-up spool with operation of other viewer components to present a projected motion picture image on the screen 28. When the projection operation has been completed, the cam disc 175 will advance to the rewind position to condition the viewer for the rewind/process mode and rewind the film strip 44 back to the supply spool. At the end of the rewind cycle, the programming disc 175 will be advanced to the off position causing the cassette to be ejected and the viewer turned off. The specific operation of the viewer on a processed cassette will be described in more detail below.

If the cassette is unprocessed, the viewer 25 will be operated first in a dummy project mode to advance the film strip 44 completely from the supply spool to the take-up spool, the film strip will be rewound for a short duration of time such that the supply leader will pull the tear strip 76 to allow the processing fluid 78 to drain into the well 80. At this time the motor 124 is turned off for a sufficient period of time to allow the processing fluid to drain completely into the well 80. Thereafter the film strip 44 is rewound for processing. At the end of processing rewind, the motor 124 is again turned off for approximately 30 seconds for an imbibition interval to allow the processing fluid 78 to react chemically with the emulsion layer on the film strip. The viewer will then be programmed in the project mode for a mandatory projection cycle to ensure that the processing fluid is completely dried. Also during this mandatory project cycle, the replay button switch S-8 is disabled or inhibited so that the mandatory project cycle will occur without interruption by an operator. Thereafter the film will be rewound as a processed cassette.

A more complete operation of the viewer operational modes will be apparent from the following description of logic circuitry with reference to FIGS. 39–52 of the drawings.

Figure 39:
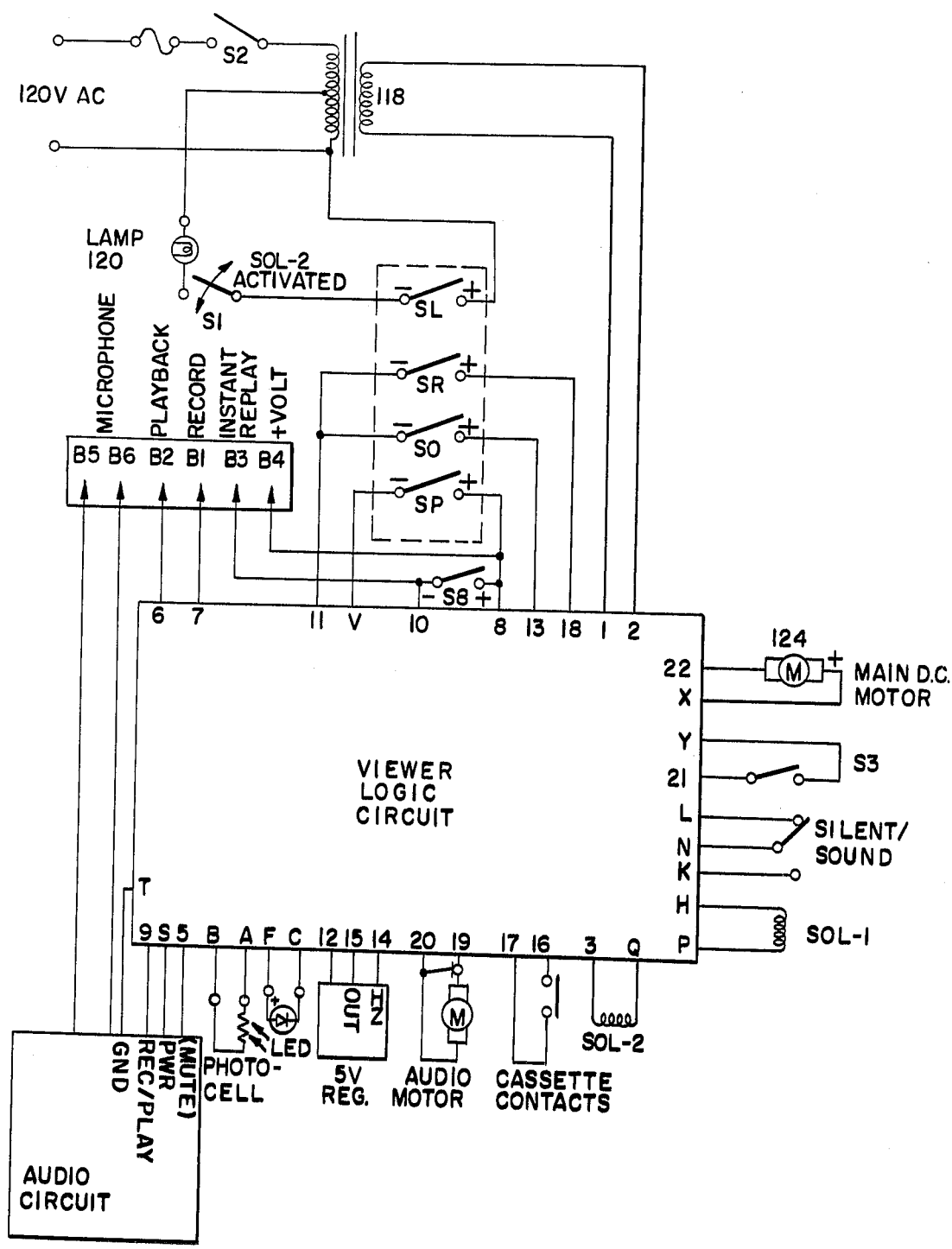
FIG. 39 is a diagram illustrating the interconnections between the logic circuitry of the invention and the various other major components of the invention.
Figure 40:
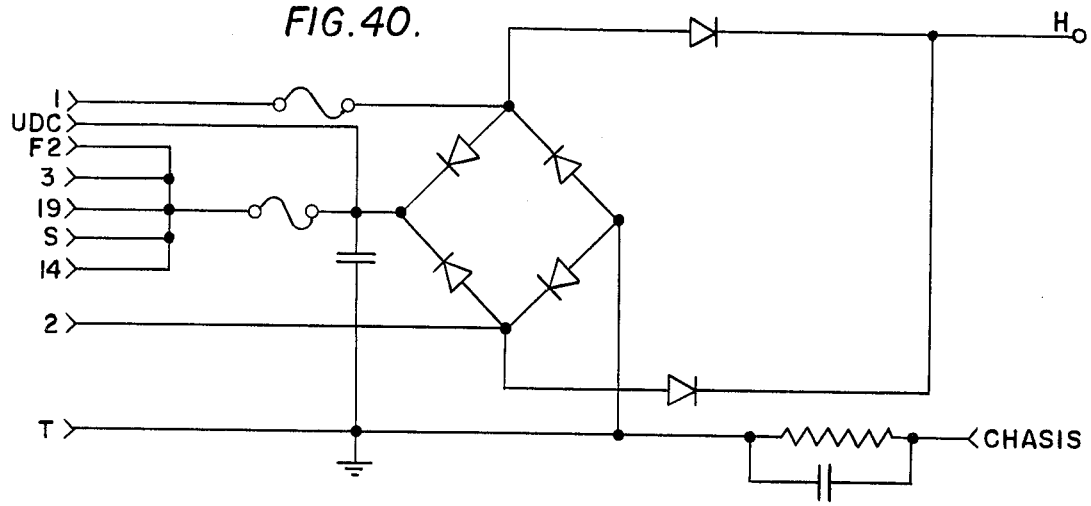
FIG. 40 is a circuit diagram of a full wave rectifier.

Insertion of a cassette 27 into the well 26 causes the power switch S2 to be closed. As shown in the system block diagram of FIG. 39 closure of S2 causes 120 volts of external AC power to be applied to the primary of a step-down transformer. A voltage of 13.3 volts AC is then available at the secondary of the transformer and, as shown in FIG. 40, is applied to a full wave rectifier. The rectified AC output is used to power an audio system drive motor, the solenoids SOL-1 and SOL-2, the optional audio circuitry, the motor start-up delay circuit of FIG. 46, and the motor shut-off and speed control circuit of FIG. 51. As shown in FIG. 39, the rectified AC output is also applied to a 5 volt regulator. The 5 volt output of the regulator is used to power the integrated circuits that make up the control logic of the present invention.

Figure 46:
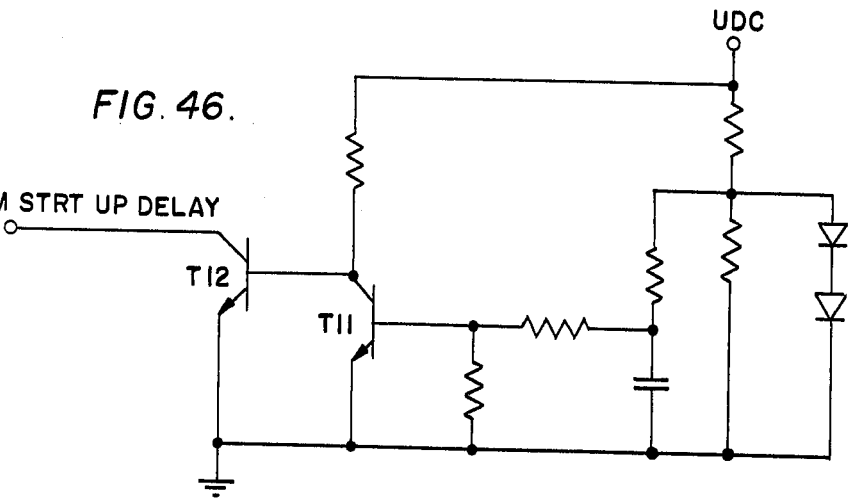
FIG. 46 is a DC motor start-up delay circuit.

When power is applied by the closure of S2, the start-up delay circuit of FIG. 46 momentarily delays the actual start-up of the main DC motor 124 so that filter capacitors of the motor have time to charge. In addition, a memory reset pulse (DM) is generated and used to set the flipflops in the logic control circuitry to their proper initial states.

Figure 41:
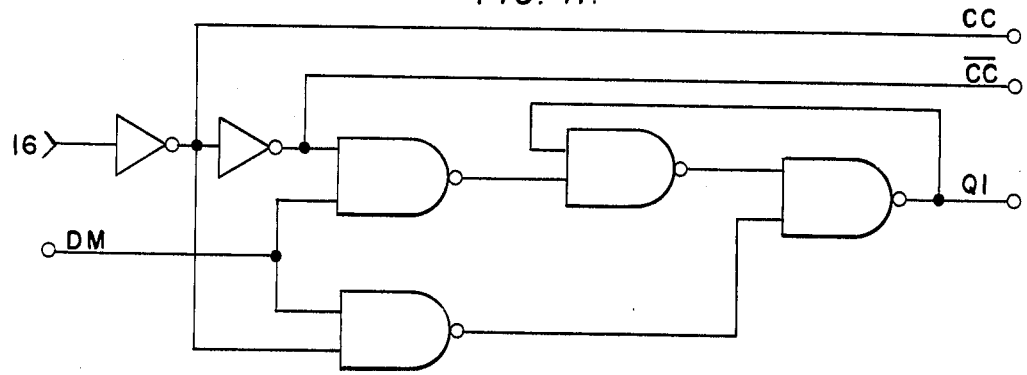
FIG. 41 is a flipflop memory circuit that determines whether a cassette is processed or unprocessed.

As shown in FIG. 41, when power is turned on and the DM signal momentarily goes high, the output (Q1) of the cassette identification flipflop is set to reflect the state of the cassette contact input signal CC. This cassette contact signal information is locked into the flip-flop when the DM signal returns to its normally low state. The state of the cassette contact input signal is determined by the condition of the cassette contacts CC within the cassette 27. If the cassette is unprocessed, the cassette contacts are internally connected and, as shown in FIGS. 39 and 41, the cassette contact input signal CC is high. However, if the cassette is processed the contacts are not connected and the resultant input signal CC is low. Thus, the state of the cassette contact input signal indicates whether or not the cassette has been processed and the memory reset signal gates this information into the cassette identification flipflop.

Figure 42:
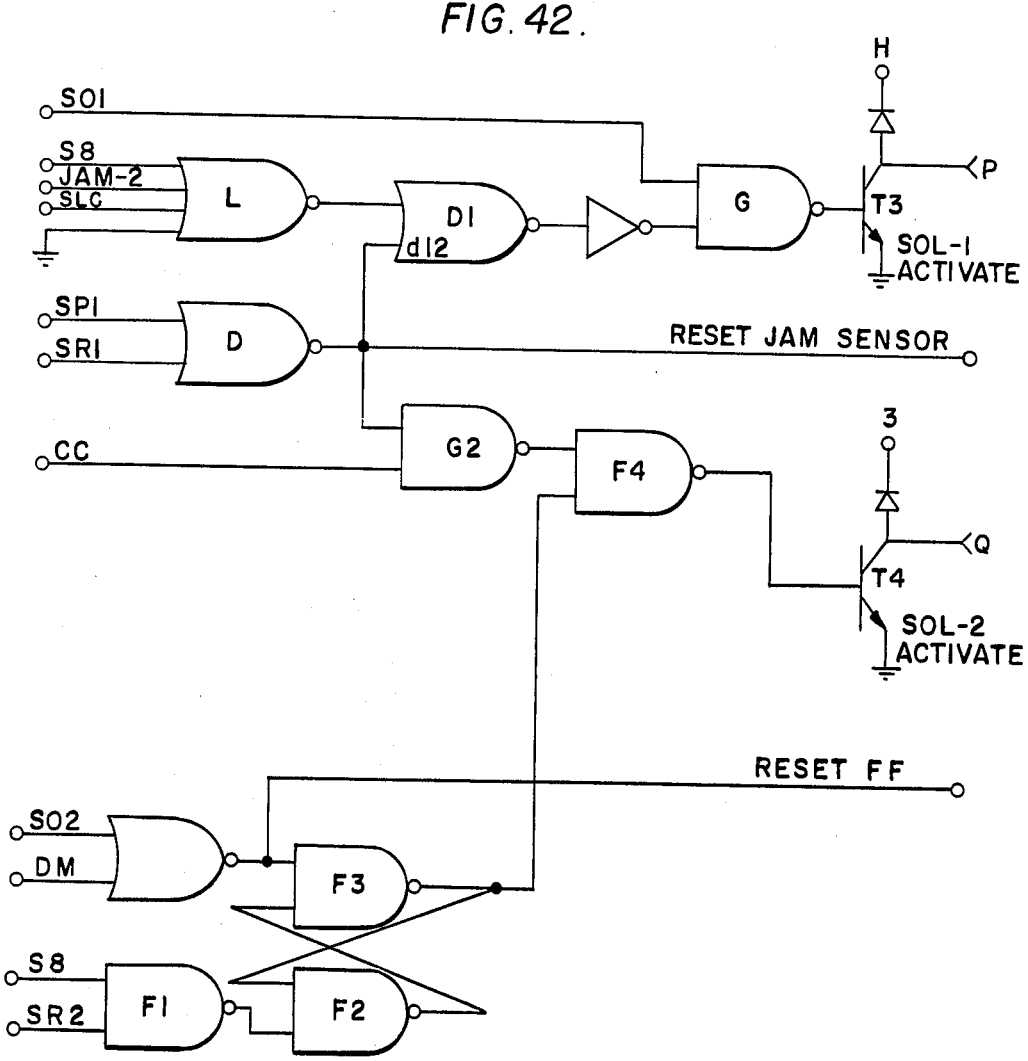
FIG. 42 is a logic diagram of solenoid activation circuitry.

Assuming the cassette 27 is unprocessed, the cassette contact CC signal is a high, the processed cassette signal $\overline{CC}$ is low, and the Q1 output of the cassette identification flip-flop of FIG. 41 is high. As shown in FIG. 42, after power is turned on, the output of Gate G2 is forced low because the unprocessed cassette signal CC is high and neither the project mode program switch SP nor the rewind mode program switch SR is selected (i.e. both SP1 and SR1 are low and output of Gate D is, therefore, high). The low output of Gate G2 forces the output of Gate F4 high and causes activation transistor T4 to conduct, thereby energizing SOL-2. When SOL-2 is energized, the projection lamp switch S1 of FIG. 39 is opened, thus turning off the projection lamp 128. The activation of SOL-2 also lifts the cassette eject bar 196 which is then mechanically held in the up position (despite any subsequent de-energization of SOL-2) until the control cam has cycled once through the "off" mode. When the eject bar 196 is in the up position the programming cam 175 can cycle through the off mode without ejecting the cassette and turning off the viewer.

Figure 43:
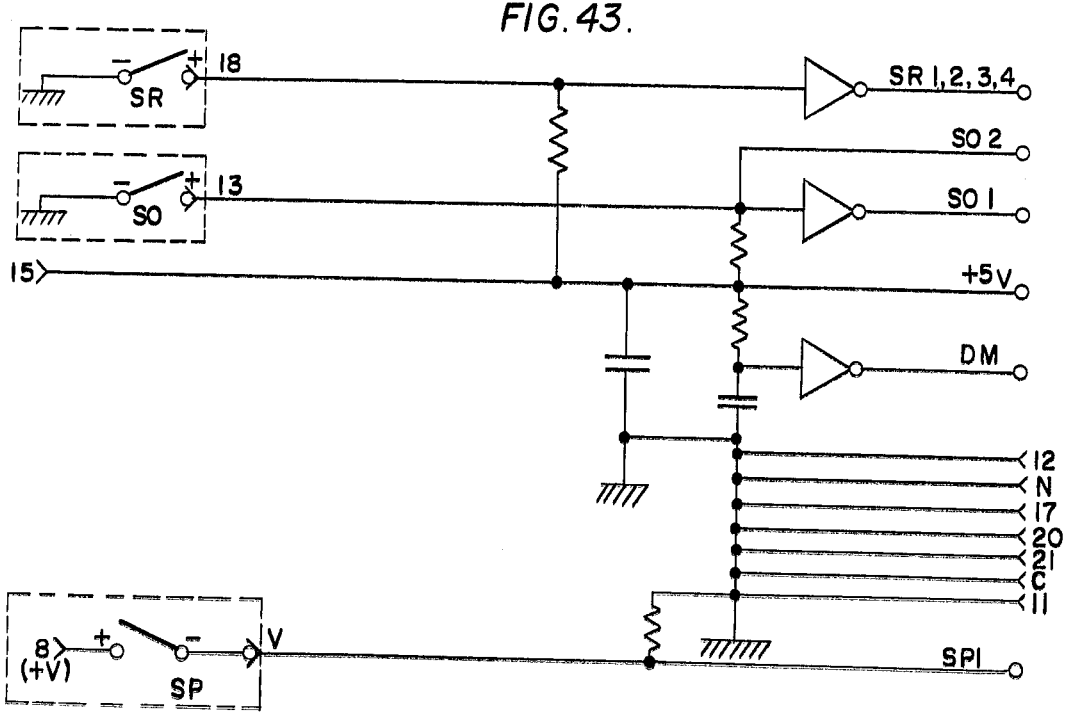
FIG. 43 is a program control switch reading circuit the switch information to the other logic circuitry of the invention.

The position of the programming cam 175 at this point causes program switch SO to be opened and, as shown in FIG. 43, the opened SO switch generates a low signal at SO1. The low SO1 signal forces a high at the output of Gate G of FIG. 42 and causes the transistor T3 to turn on and, thus, energize SOL-1. The energizing of SOL-1 causes the programming cam 175 to rotate to its first program position, the "dummy project" mode. The new programming cam position causes SO to close, thus changing the state of SO1 to a high and de-energizing SOL-1.

The position of the programming cam also causes the SP program switch to close and, as shown in FIGS. 42 and 43, the SP1 signal consequently changes to a high, the output of Gate D is forced low, the transistor T4 is turned off, and SOL-2 is de-energized. In addition, the control cam closes program switch SL. Despite the closing of SL, the projection lamp 128 does not turn on because SOL-2 had previously opened S1, and, as can be seen in FIG. 39, both S1 and SL must be closed before the projection lamp is turned on.

Figure 45:
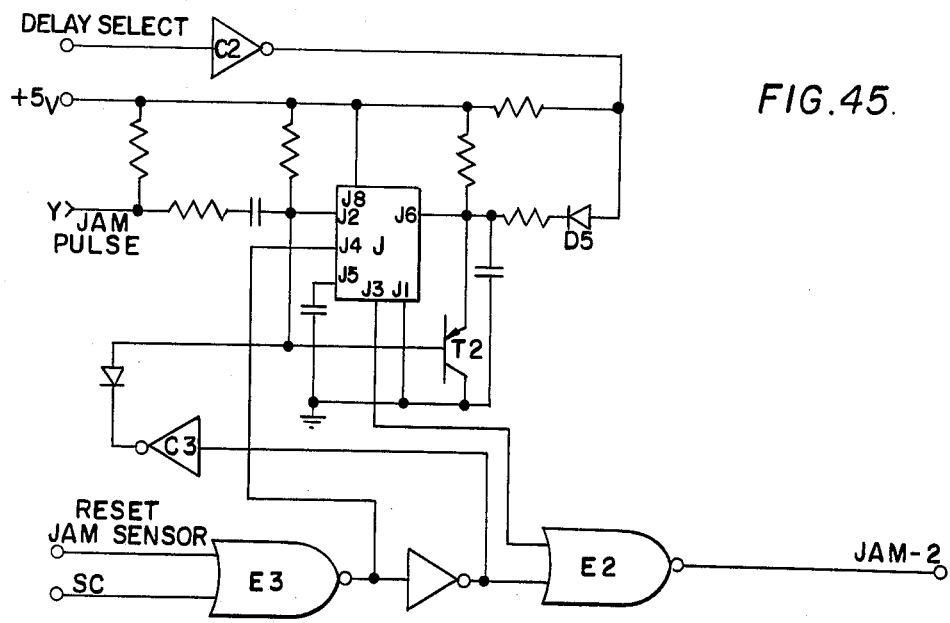
FIG. 45 is a jam pulse sensor timing circuit diagram.

The film is projected in the dummy project mode and, during projection, switch S3 alternately opens and closes due to the rotation of the shaft of the film take up reel. The switching of S3 generates a jam pulse signal. When dummy projection of the film stops, S3 stops alternating and the jam pulse signal input to the jam pulse detector of FIG. 45 is shut off. Approximately 3 seconds after the jam pulse input stops, the logic circuitry of FIG. 45 generates a high jam-2 signal. Following is a brief description of the manner in which the jam-2 signal is generated.

When the jam pulse input at pin J2 of the timing device J of FIG. 45 stops and the reset input at pin J4 is high, the internal charging capacitor of device J begins charging. The charging time of the internal capacitor is defined by the output of inverter C2 since the output of C2 determines whether diode D5 conducts and the state of D5 determines the external resistance of the timing device J and, therefore, the RC charge time of the internal capacitor. If the output of C2 is high, the capacitor charges in approximately 3 seconds, and if the output of C2 is low, the capacitor charges in approximately 33 seconds. When the internal capacitor is charged, the output of the timing device at pin J3 is forced low and stays low until the input pin J4 of the timing device is forced low and the internal capacitor is discharged through conducting transistor T2.

Thus, when the jam pulse input stops, the input at pin J4 is an enabling high due to the fact that the viewer is in the project mode (i.e. the SP1 signal is high, the output of Gate D of FIG. 42 is low, and the output of Gate E3 of FIG. 45 is high). In addition, the output of inverter C2 of FIG. 45 is high because the low processed cassette signal CC of FIG. 49 forces the output of Gate H1 high and the output of Gate E1 low. Thus, given the high at pin J4 and the high at the output of C2, the output pin J3 of the timing device J goes low approximately 3 seconds after the jam pulse input stops. This low signal forces the output of Gate E2 (Jam-2) high.

As shown in FIG. 42, the high jam-2 signal forces a low at the output of Gate L and, in combination with the high SP1 signal generated by closed program switch SP, energizes SOL-1. The activation of SOL-1 causes the programming cam to rotate to its next program position, the "rewind-process" mode.

In the new program position, the programming cam 175 opens program switches SP and SL. As shown in FIG. 43, the opening of SP causes the SP1 signal to go to a low state. The low SP1 signal forces a high on the output of Gate D of FIG. 42 and a low on the output of Gate D1, thus de-energizing SOL-1. In addition, the high output of Gate D of FIG. 42 forces the output of Gate E3 of FIG. 45 low and thereby forces the input at pin J4 of timing device J low and the output of inverter C3 low. The low on pin J4 causes the internal charging capacitor of device J to discharge and the low at the output of C3 turns on transistor T2 and allows the capacitor to discharge through the conducting transistor T2. The discharging of the internal capacitor resets timing device J and causes the output at pin J3 to be forced high. Thus, the jam-2 signal is forced low and the SOL-1, energizing circuitry of FIG. 42, is no longer activated. It can readily be understood that whenever the jam pulse detector circuitry of FIG. 45 causes the programming cam to rotate by forcing jam-2 high, the timing device J will be reset and the jam-2 signal will be forced low when the rotation of the control cam causes both the SP and SR switches to be momentarily open.

As shown in FIG. 42, the opening of program switch SP also forces the output of Gate G2 low and thereby energizes SOL-2. Following the activation of SOL-2, the SR program switch closes and de-energizes SOL-2, the SR program switch closes and de-energizes SOL-2 by forcing the output of Gate G2 in FIG. 42 to a high. Since the viewer is in the rewind mode, the film rewinds and, as explained above, switch S3 alternates as the take-up reel rotates. The rewind motion causes the tear strip 76 of the processor 50 to be peeled back, thereby causing the processing fluid 78 to be released to the well 80 and nozzle opening 82. After the rewinding of the film 44 and the associated peeling of the tear strip 76 has progressed for approximately ½ of a second, the main DC motor 124 is shut off, thus stopping the rewinding operation.

Figure 48:
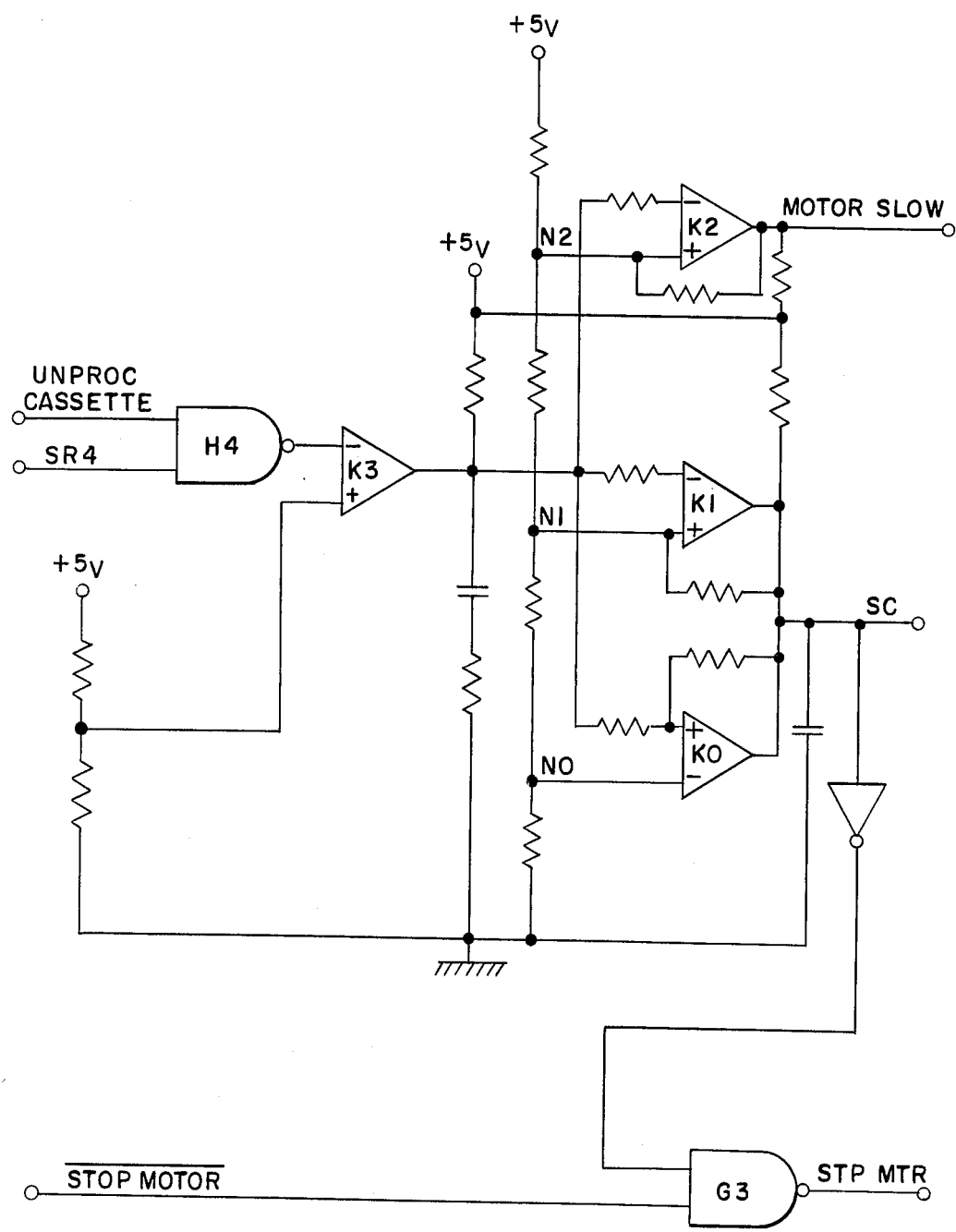
FIG. 48 is a differential amplifier motor control circuit.

The main DC motor 124 is shut off when the wire or'd output of differential amplifiers K0 and K1 (SC) of FIG. 48 are forced for a high state. The high SC signal forces the output of Gate G3 of FIG. 48 high, thus turning on transistor T7 of FIG. 51 and turning off the power transistor T5 that supplies power to the main DC motor 124.

SC was forced high one-half second after the closing of the SR switch due to the operation of the circuit of FIG. 48. As shown in the figure, when the SR switch was closed, the subsequent high SR4 signal in combination with a high signal forced at the output of Gate H3 of FIG. 49 (by the low $\overline{CC}$ signal), forced a low at the output of Gate H4 of FIG. 48. This low output turned off the output of differential amplifier K3 and, thus, caused the voltage at nodes N0, N1, and N2 to begin "charging" to their respective "trigger" voltage levels at different rates. Approximately one-half second after K3 was turned off, the voltage at N0 reached its trigger value and, consequently, the output of K0 (SC) was forced high. As explained previously, this high SC signal turned off the motor 124 and, in addition, inhibited the generation of the jam-2 signal which, if activated, would have energized SOL-1 (see FIG. 45).

Approximately 5 seconds after SC is forced high, the voltage at N1 reaches its trigger value and the output of K1 is thereby forced low. Since the outputs of K0 and K1 are wire or'd together, the low on K1 pulls the SC signal low and, in the manner explained above, the motor is turned on and the film starts rewinding again.

Approximately 10 seconds after the motor has turned on, the voltage at N2 reaches its trigger value and the output of K2 is forced high. This high turns on transistor T8 of FIG. 51 and the motor speed is thereby reduced since the operation of T8 diminishes the motor current control output of differential amplifier M2.

Figure 49:
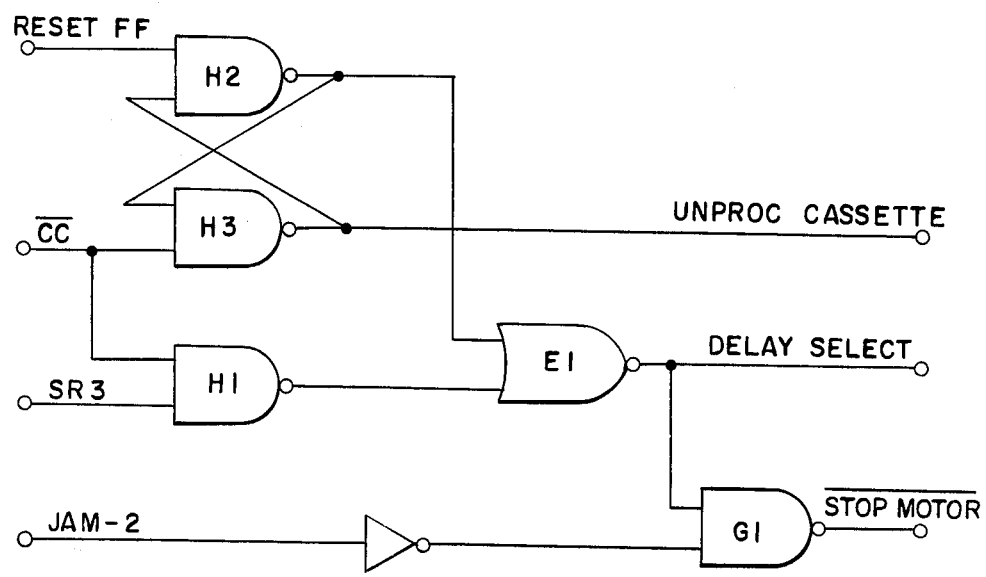
FIG. 49 is a circuit that determines the state of the jam pulse sensor circuit of FIG. 45.

When the film stops rewinding, the cassette contacts open and cause the processed cassette signal $\overline{CC}$ of FIG. 49 to go high, thereby signaling a processed cassette. The transition of the processed cassette signal to the high state causes the output of Gate H1 of FIG. 49 to go low and, since the output of the cassette process transition flipflop (at Gate H2), is already low, the output of Gate E1 goes high, the output of Gate G1 is forced low, the DC motor 124 is turned off, and the output of the timing inverter C2 of FIG. 45 is forced low. When the motor is turned off, the film stops rewinding and switch S3 stops alternating. Since the output of inverter C2 is low, the jam pulse sensor of FIG. 45 generates a jam-2 signal approximately 33 seconds after the cassette contacts open and the S3 switch stops alternating. The jam-2 signal energizes SOL-1 and forces a high at the output of Gate G1 of FIG. 49, thus starting the main DC motor 124. SOL-1 then causes the programming cam to rotate to the "off program" mode.

The rotation of the programming cam to the off mode causes the SR program control switch to open and SOL-1 to be thereby de-energized (see FIG. 42). The opening of the SR switch also causes the SR4 signal of FIG. 48 to go low, the output of K3 to be turned on, the output of K2 to go low, transistor T8 to be turned off, and the motor slow output to be thereby turned off. In addition, the S0 switch opens and re-energizes SOL-1, thus causing the programming cam 175 to rotate again. Since the eject bar 196 is in the up position (caused by the last activation of SOL-2), the cassette will not be ejected and the programming cam will by-pass the off mode and continue to rotate to the project mode. The opening of the S0 switch also resets the cassette process transition flipflop (H at output of Gate H2) of FIG. 49, thus causing the output of inverter C2 of FIG. 45 to go high, and resets SOL-2 replay activation flipflop of FIG. 42 (H at output of Gate F3).

The subsequent rotation of the programming cam through the off mode to the project mode causes switch S0 to close, thereby de-energizing SOL-1. The eject bar 196 is automatically returned to the down position and the projection lamp switch S1 is closed. Both the SP and the SL program switches close and, due to the closure of the SL switch, the projection lamp turns on. The film is then projected and the S3 switch alternates as the take-up reel rotates. When the film stops projecting and the S3 switch stops alternating, the jam pulse sensor logic of FIG. 45, after a delay of approximately 3 seconds (since the output of inverter C2 is high), generates the jam-2 pulse, thus energizing SOL-1 and causing the programming cam to rotate to the rewind mode.

When the programming cam rotates to the rewind mode the SP switch opens and, as shown in FIG. 42, the output of Gate D is forced high and SOL-1 is thereby de-energized. Also, the SR switch is closed and the SL switch opens and turns off the projection lamp. The closure of the SR switch causes the film to rewind and the rewinding motion causes the S3 switch to alternate. When the film stops rewinding, the programming cam then rotates to the off mode.

In the off mode the SR switch is opened and, as explained above, Sol-1 is de-energized, the S0 switch opens, the cassette is ejected (since the cassette eject bar 196 was in the down position), the S2 power switch is opened, and the DC motor 124 is turned off.

Figure 47:
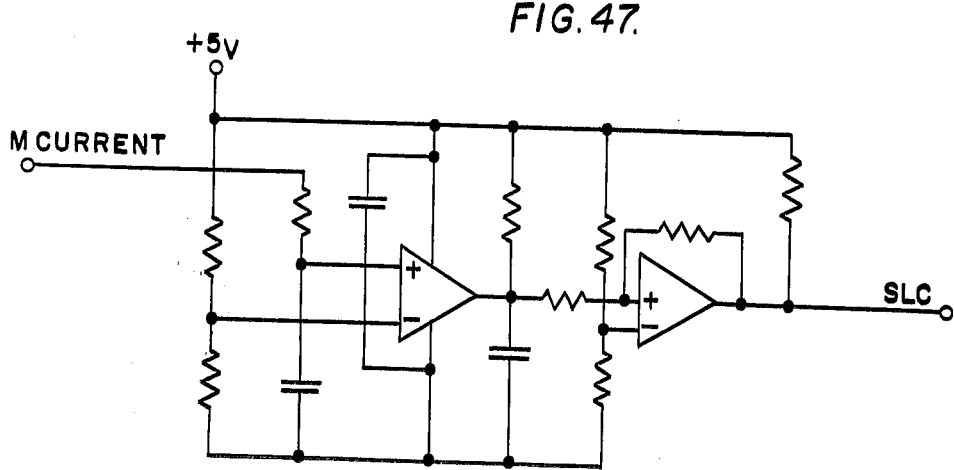
FIG. 47 is a motor current monitoring circuit.

If the main clutch 449 of the DC motor drive to the cassette spools slips during operation of the viewer, the circuit of FIG. 47 first senses the change in motor current that is associated with the higher motor torque and then energizes SOL-1, thereby causing the viewer to cycle to the next mode.

This circuit serves to cause the program cam to advance to the off position at the end of the rewinding operation when the clutch 449 will start slipping. The jam 2 signal after a three second delay would also cause the program cam to rotate to the off position, but the slippage of the clutch 449 for three seconds would cause too much wear on this clutch. The circuit of FIG. 47 causes rotation of the program cam from the rewind position after about one and a half seconds following the rise of the motor current to a level indicating the clutch 449 is slipping. The circuit of FIG. 47 does not have any effect when the motor drives the take-up reel in the project mode because the low torque transmitting clutch 478 will slip, rather than the clutch 449, and the motor current will not rise sufficiently to activate the circuit of FIG. 47. The circuit of FIG. 47 also does not have any effect during the thirty second delay following the film processing cycle at the rewind position because the motor is turned off for the thirty second delay, after which the jam 2 signal causes the program cam to rotate to the off position.

Whenever a cassette is inserted into the viewer the power is automatically turned on and the film is then automatically projected. After projection the film is automatically rewound, the cassette is ejected, and the power is turned off. Following is a detailed description of the operation of the logic circuits that perform these functions.

As explained above, when a cassette is inserted into the viewer the power switch S2 is closed, power is supplied to the logic circuitry and other electrical components of the viewer, the DC motor 124 is turned on, SOL-1 is energized due to the open position of switch S0, and a memory reset pulse (DM) sets the flipflops in the logic control circuitry to their proper initial states. Since the cassette in this case has been processed, the cassette contacts on the cassette are not internally shorted and, as shown in FIGS. 39 and 41, the cassette contact signal $\overline{CC}$ is therefore low. This low cassette contact signal is initially gated into the cassette identification flipflop of FIG. 41 by the memory reset pulse and the output Q1 of the flipflop is thereby set to a low state. Thus, the cassette input signal $\overline{CC}$ and the cassette identification flipflop signal Q1 indicate to the logic circuitry that a processed cassette has been inserted into the viewer. The control commands subsequently generated by the operation of the viewer control cam are processed by the logic circuitry of the viewer in light of the identification of the cassette as a processed cassette.

In the present case, due to the energizing of SOL-1, the programming cam is initially rotated to the project mode. In the project mode, switch S0 closes, the SP1 signal of FIG. 42 goes high, the output of Gate G is forced low, transistor T3 is turned off, and SOL-1 is thereby de-energized. The SP and S1 switches also close and, as shown in FIG. 33, the closure of S1 causes the projection lamp to be turned on.

As the film is projected the rotation of the shaft of the film take-up reel causes a switch S3 to open and close. A explained previously, the switching of S3 generates a jam pulse which is applied to the input of the circuit of FIG. 45. When the film stops projecting, the takeup reel stops rotating, the S3 switch stops switching, and the jam pulse signal is shut off. Approximately 3 seconds after the jam pulse input is sut off, the circuit of FIG. 45 generates a signal that forces the output of Gate E2 of FIG. 45 to go high. This output, designated jam-2 forces the output of Gate D1 to go high, the output of Gate G to go high, transistor T3 to be turned on, and SOL-1 to be energized. The energizing of SOL-1 causes the programming cam to rotate to its next position, the rewind mode.

In the rewind mode, the SP switch opens, thereby causing the SP1 signal to go low, jam-2 to be inhibited, the timing device J of FIG. 45 to be reset, transistor T3 to be turned off, and SOL-1 to be de-energized. Following the opening of SP, the SR switch closes, the projection lamp is turned off by the opening of the SL switch, and the film begins to rewind.

During the rewind process the associated switching of S3 again generates the jam pulse. As explained above, when all of the film has been rewound, the shaft of the take-up reel stops rotating, the S3 switch stops alternating SOL-1 is energized after a delay of approximately 3 seconds, an the control cam rotates to the next mode, the off mode.

In the off mode the SR switch opens, thereby forcing the output of Gate D of FIG. 42 to go high, the output of Gate D1 to go low, the output of Gate G to go low, transistor T3 to be shut off, and SOL-1 to be de-energized. In addition, switch S0 is opened, the cassette is ejected by the operation of the cassette eject bar 196, and the main power switch S2 is opened.

The above description concerned the operation of the viewer when a processed "silent" (i.e. no sound track) cassette was inserted into the viewer. However, if the processed cassette has a sound track and the appropriate optional sound equipment has been installed in the viewer, the above logical operations are performed in addition to the playing or recording of sound while the viewer is in the project mode. The operation of the optional sound equipment is controlled by a silent-/sound (S/S) program switch that is first enabled by the insertion of a "sound" cassette into the viewer and is then operated by the program cam.

The sound cassette has a small control "bump" on its exterior which, when the cassette is inserted into the viewer, mechanically enables the S/S switch to be controlled by the cam during the appropriate mode. Silent cassettes do not have this bump and, consequently, the S/S switch is disabled when the viewer operates with a silent cassette.

When the system is in the audio mode it is necessary to smooth the operation of the main DC motor 124 which controls the rate of the feeding of the film. This is necessary to improve the fidelity of the sound reproduction. Thus, when a sound cassette is inserted into the viewer and the control cam is rotated to the project mode, the S/S switch is selected so that a ground is applied to pin L of FIG. 52, transistor T9 is turned on, and the LED at pin F is turned on.

Figure 51:
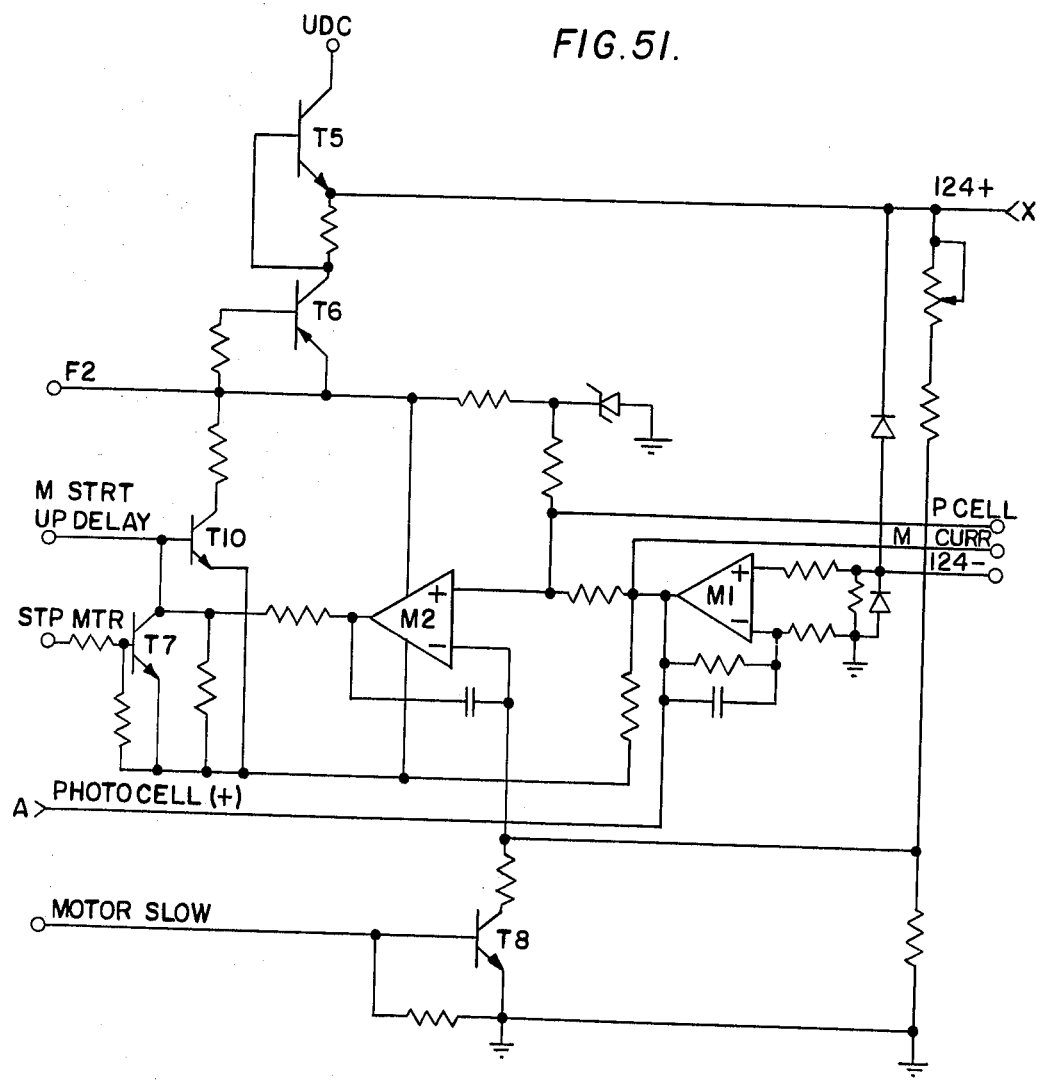
FIG. 51 is a diagram of a DC motor shut-off and speed control circuit.
Figure 52:
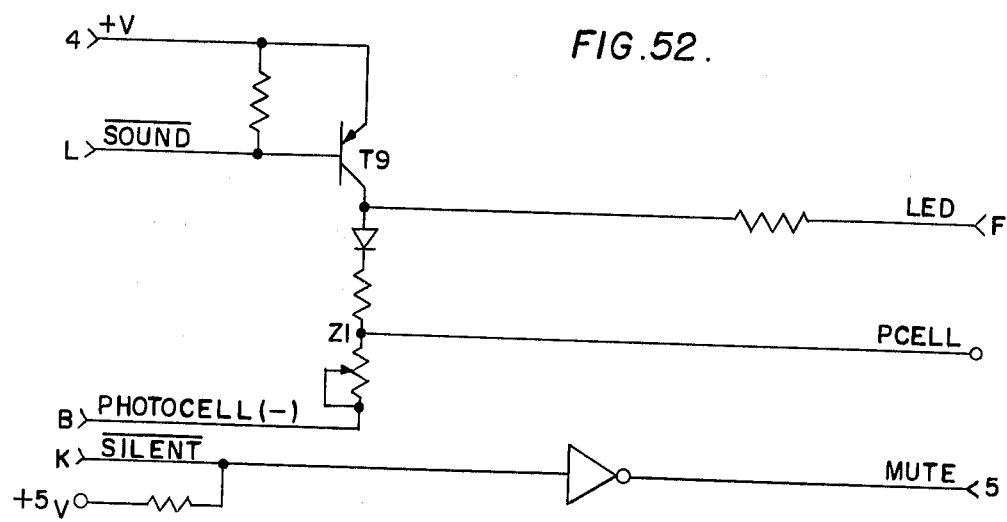
FIG. 52 is a DC motor supply current modulating circuit.

When transistor T9 is turned on by the activation of S/S, the current flowing at node Z1 of FIG. 52 is modulated by the intermittent activation of a resistive photocell PC at pins A and B of FIGS. 51 and 52. The photocell is intermittently activated when the light from the LED at pin F is intermittently interrupted by a "loop" of film that is interposed between the LED and the photocell (see FIG. 15). The movement of the loop of film is due to the mechanical film feeding operation of the viewer. Since the photocell is not a fast switching device, the movement of the loop of film and the corresponding interruption of the light from the LED is essentially integrated to a smooth function by the slow response time of the resistive photocell. Thus, the changes in the resistance of the photocell modulate the current that is flowing at point Z1 and this modulation is essentially an integration of the movement of the loop of film during the film feeding operation.

The photocell-modulated current is applied to the positive input of operational amplifier M2 of FIG. 51 and effectively modulates the amplified motor current that is monitored by operational amplifier M1. The output of M2 is applied to the bae of transisitor T10 which, by means of transistor T6, controls the current that is flowing to the main DC motor 124 through the power transistor T5. Thus, the changes in resistance of the photocell PC effectively modulate the supply current to the DC motor and thereby ensure that the motor speed is smooth in relation to the movement of the film through the viewer.

The activation of the S/S switch also has an effect upon the MUTE signal output of FIG. 52 when "sound" is selected on the S/S switch during the project mode (i.e. ground on pin L and pin K pulled up) it can be seen that the output of inverter C1 of FIG. 52 is forced low. Thus, the MUTE signal is low. The low MUTE signal activates the record/play select circuitry of FIG. 44 as well as the optional audio circuitry shown in FIG. 39. The circuit of FIG. 44 determines whether play or records has been selected by the remote control unit of FIG. 39.

Figure 44:
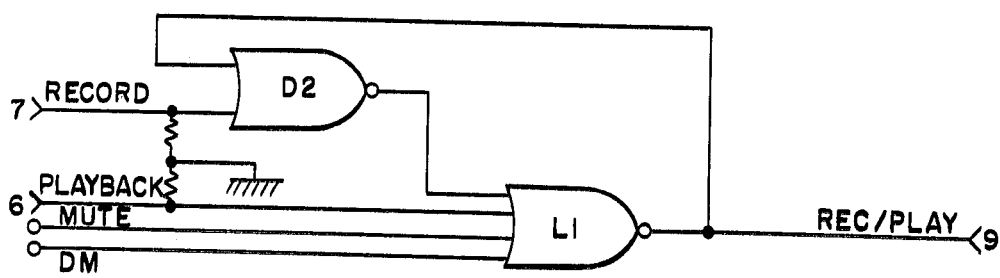
FIG. 44 is a record/playback determining logic circuit.

If "record" is selected on the remote control unit, the output of Gate D2 of FIG. 44 is forced low and, if the MUTE signal is low (S/S switch selected in "sound" position), the output of Gate L1 (record/play signal) is forced high. If "playback" is selected on the remote control unit the output of Gate L1 is forced low. The record/play signal that is generated by the output of Gate L1 of FIG. 51 is routed to the audio circuitry where it activates the appropriate audio equipment.

When the programming cam rotates to the rewind mode the S/S switch of FIG. 52 is selected so that the MUTE output goes high, (i.e. ground on pin K of S/S switch) thus disabling the audio circuitry while the viewer is rewinding the film.

Depression or closure of the instant replay button switch S-8 causes the programming cam 175 to cycle to the next operational mode. Thus, if the instant replay switch S-8 is closed while the viewer is in the project mode, the viewer will immediately cycle to the rewind mode. If the instant replay button is depressed while the viewer is in the rewind mode, the viewer will cycle through the off mode to the project mode. If the instant replay switch is closed while an unprocessed cassette is in the viewer, there will be no change in the viewer operation. Following is a description of the operation of the logic circuitry in the preferred embodiment when the instant replay mode is selected.

Figure 50:
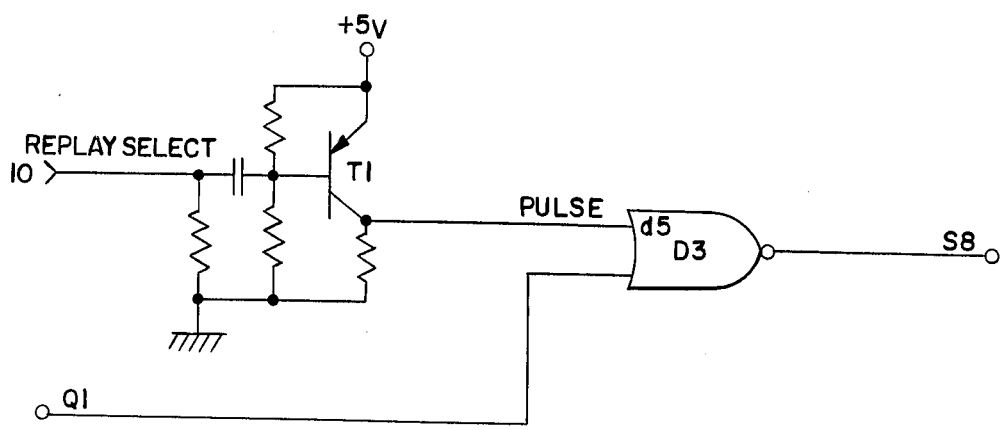
FIG. 50 is a logic diagram of an instant replay inhibiting circuit.

When the viewer is in the project mode and the instant replay switch is closed, a voltage is applied to Pin 10 of the instant replay pulse generation logic circuit of FIG. 50. If an unprocessed cassette is in the viewer, signal Q1, the output of the cassette identification flip-flop of FIG. 41, will be high and will inhibit Gate D3 of FIG. 50. Thus, if instant replay is selected while an unprocessed cassette is in the viewer, the circuit of FIG. 50 will not generate the instant replay activation pulse. However, if a processed cassette is in the viewer, signal Q1 will be low and will enable Gate D3 of FIG. 50. Thus, a voltage applied to Pin d5 of Gate D3 and the output of Gate D3 will momentarily go high. The high output of Gate D3 (logic signal S8) will activate Gate L of FIG. 42. The output of Gate L will then be forced low, and, since the input at Pin d12 of Gate D1 is also low, (due to the effect of the high SP1 signal caused by the closing of switch SP when the viewer is in the project mode) the output of Gate D1 will be forced high.

The high on the output of Gate D1 will force the output of Gate G to go high, transistor T3 to conduct, and SOL-1 to be energized. The energizing of SOL-1 will cause the programming cam 175 to rotate to the next operational mode, the rewind.

When the programming cam 175 rotates to the rewind mode switch SP opens and de-energizes SOL-1 by forcing the output of Gate D of FIG. 42 high. In addition, switch SL opens and shuts off the projection lamp. At this time, if the cassette has a sound track, the S/S switch forces the MUTE signal high and thus mutes the audio. Even though at this point the viewer has stopped projecting the film, the jam-2 signal is not generated in the usual manner because it is inhibited by a low signal on both SR1 and SP1.

Immediately following the inhibition of jam-2 the SR switch is closed and the film begins rewinding. If the viewer is allowed to finish rewinding, the film switch S3 will stop alternating and the delayed jam-2 signal that is subsequently generated will activate Gate L of FIG. 42 and will thereby energize SOL-1. The energizing of SOL-1 will cause the cam 175 to rotate to the off mode and the viewer will be turned off.

However, if the instant replay switch is selected before the viewer has finished rewinding, the resultant momentary high S8 signal will be applied to the input of Gate F1 in the SOL-2 activation control circuitry of FIG. 42. Since signal SR2 is also high due to the previous selection of program switch SR, the output of Gate F1 is forced low. The low at the output of Gate F1 is forced low. The low at the output of F1 forces the output of Gate F4 to go high, transistor T4 to conduct, and SOL-2 to be energized. In addition, the S8 signal activates Gate L of FIG. 42 and thus causes SOL-1 to be energized. The activation of SOL-2 causes the eject bar 196 of the viewer to be lifted to the "up" position on the cam 175 and also opens the lamp projection switch S1. As has been explained previously, the activation of SOL-1 causes the programming cam to rotate to the next operational mode, the off mode.

The movement of the programming cam into the off mode causes the SR switch to open and to de-energize SOL-1 by forcing the output of Gate D in FIG. 42 to a high state, thus turning off transistor T3. The S0 switch is also opened, thereby causing the S02 signal of FIG. 43 to go high. The high S02 signal resets the SOL-2 activation flipflop of FIG. 42 (output of Gate F3 is high) forces a low on the output of Gate F4, and thus de-energizes SOL-2. The opening of the S0 switch also causes signal S01 to go low, as shown in FIG. 43. The low S01 signal forces the output of Gate G of FIG. 42 to go high, transistor T3 to be turned on, and SOL-1 to be energized.

Since the eject bar 196 was lifted to the up position on the programming cam by the previous activation of SOL-2, the cam will bypass the off mode and continue to rotate to the project mode. Thus, even though the programming cam cycles through the off mode, the cassette will not be ejected and the main S2 power switch will remain closed.

After the programming cam has rotated to the project mode, switch S0 is closed and, as explained previously, SOL-1 is de-energized. In addition, the eject bar 196 is mechanically returned to the down position and switches SP and S1 are closed. (If the cassette has a sound track the S/S switch forces the MUTE signal to go low at this point, thereby activating the audio circuitry). The closing of S1 turns on the projection lamp and the viewer begins projecting.

Thus it will be seen that as a result of the present invention, there is provided a highly effective viewing and processing apparatus for cinematographic systems employing multi-purpose film cassettes of the type described and by which the above-mentioned objectives are fulfilled. It is contemplated that various changes and/or modifications may be made in the embodiment disclosed without departure from the inventive concepts manifested thereby. It is expressly intended, therefore, that the foregoing description and accompanying drawing illustrations are illustrative of a preferred embodiment only, not limiting, and that the true spirit and scope of the present invention be determined by reference to the appended claims.

What is claimed is:

1. Apparatus for use with a cassette containing an elongated strip of material; means for receiving said cassette; drive means for advancing the elongated strip of material; a programming member mounted for displacement between first, second, and third program positions; means responsive to said programming member being in said first program position to cause said drive means to advance said elongated strip of material in a first direction and responsive to said programming member being in said second position to advance said elongated strip of material in a second direction; means to displace said programming member between said program positions proceeding from said first program position to said second program position, from said second program position to said third program position, and from said third program position to said first program position; means defining first and second cam follower tracks carried by said programming member; a cam follower operable to engage said first track or said second track as said programming member is advanced to said third program position; ejecting means operable by said cam follower to eject said cassette from said cassette receiving means; said first track being contoured to guide said cam follower to actuate said ejecting means to eject said cassette from said cassette receiving means when said programming member is advanced to said third program position; said second track being contoured to guide said cam follower in a manner to fail to actuate said ejecting means to eject said cassette from said cassette receiving means when said programming member is advanced to said third program position; and eject control means to selectively switch said cam follower from said first track to said second track at a given position of said programming member in its displacement from said first program position to said third program position whereby said programming member will advance from said second program position through said third program position without ejecting said cassette when said cam follower has been switched to said second track.

2. Apparatus for use with a cassette containing a supply spool, a take-up spool and a film strip; said spools being operable to wind said film strip from said supply spool onto said take-up spool and rewind said film strip from said take-up spool onto said supply spool upon said spools being driven, means defining a cassette well to receive said cassette; drive means operable to drive said spools to wind or rewind said film strip when said cassette is in said well; a programming member rotatable between first, second, and third program positions; means responsive to said programming member being in said first program position to cause said drive means to wind said film strip from said supply spoolonto said take-up spool and responsive to said programming member being in said second position to rewind said film strip from said take-up spool onto said supply spool; means to rotate said programming member between said program positions proceeding from said first program position to said second program position, from said second program position to said third program position, and from said third program position to said first program position; means defining first and second cam follower tracks carried by said programming member; a cam follower operable to engage said first track or said second track as said programming member is advanced to said third program position; ejecting means operable by said cam follower to eject said cassette from said well; said first track being contoured to guide said cam follower to actuate said ejecting means to eject said cassette from said well when said programming member is advanced to said third program position; said second track being contoured to guide said cam follower in a manner to fail to actuate said ejecting means to eject said cassette from said well when said programming member is advanced to said third program position; means to guide said cam follower from said second track to said first track at a given position of said programming member in its rotation from said first program position to said third program position; and eject control means to selectively switch said cam follower from said first track to said second track whereby said programming member will advance from said second program position through said third program position to said first program position without ejecting said cassette when said cam follower has been switched to said second track.

3. The apparatus of claim 2 wherein one of said first and second program positions is a film processing position and wherein said cassette further comprises means to apply film processing material to said film strip as said film strip is being wound between said spools while said programming member is at said film processing position, said apparatus additionally including means for sensing whether the film strip in the cassette is unprocessed or processed, said eject control means being responsive to said sensing means determining that said film strip is unprocessed after said programming member has been rotated past said processing position to switch said cam follower from said first track to said second track.

4. In an automatic handling system for a photographic film strip contained in a cassette during exposure, processing and viewing operations, the cassette containing also supply and take-up spools between which the film strip is passed, the combination comprising: means defining a well to receive the cassette during viewing, processing and rewinding operations; a motor operable when energized to supply power for the performance of said operations; indexible programming means driven also by said motor for controlling said operations; and means for energizing and de-energizing said motor upon cassette insertion and ejection from said well, respectively, said motor energizing and de-energizing means including a power switch having a pair of normally spaced contacts, separate resilient means supporting each of said contacts, yieldable means in said cassette well and positioned adjacent one of said contacts whereby insertion of said cassette into said well will deflect said yieldable means and said one of said contacts against the other of said contacts to energize said motor, and movable cassette ejecting means adjacent the other of said contacts, said ejecting means being movable in one direction by said programming means to deflect the other of said contacts against said one contact and said cassette engaging means to eject the cassette from the well while maintaining said contacts in a position to continue energization of said motor until said ejection means is retracted in an opposite direction by said programming means.

5. The apparatus recited in claim 4 wherein said programming means comprises a rotatable cam disc and wherein said cassette ejecting means comprises an eject bar movable by said cam disc against the bias of said resilient means supporting said other contact.

6. The apparatus recited in claim 5 wherein said cam disc includes a circular camming track having an eject lug formed therein and including means to lift said eject bar to a position out of alignment with said cam track to selectively disable activation of said eject bar by said cam disc.

7. In an automatic handling system for an elongated strip of material contained in a cassette, said system comprising: means for receiving the cassette drive means for effecting the advancement of the strip of material; a motor operable when energized to supply power to said drive means; an indexible programming member driven also by said motor for controlling operation of said system; and means for energizing and deenergizing said motor upon cassette insertion and ejection from said receiving means, respectively, said motor energizing and deenergizing means including a power switch having a pair of normally spaced contacts, yieldable means in said receiving means and positioned adjacent one of said contacts whereby insertion of said cassette into said receiving means will deflect said yieldable means and said one of said contacts into engagement with the other of said contacts to energize said motor, and movable cassette ejecting means adjacent said other of said contacts, said ejecting means being movable in one direction by said programming member to deflect said other of said contacts into engagement with said one contact and said cassette engaging means to eject the cassette from said receiving means while maintaining said contacts in engagement thereby continuing energization of said motor until said ejection means is retracted in an opposite direction by said programming member.

8. An apparatus comprising:
means for operably receiving a cassette containing an elongated strip of material;
a motor and
means responsive to operably positioning the cassette in said apparatus for automatically electrically energizing said apparatus, including the energization of said motor, to perform a plurality of operations with the elongated strip of material in a predetermined sequence and for subsequently at least partially ejecting the cassette from said apparatus, said electrically energizing and cassette ejection means comprising:
a first electrical contact;
a second electrical contact;
means for mounting said first electrical contact and resiliently urging said first electrical contact in the direction away from said second electrical contact;
means for mounting said second electrical contact in alignment with said first electrical contact and resiliently urging said second electrical contact in a direction away from said first electrical contact;
a push rod having one end disposed in operative relationship with said first electrical contact and mounted for displacement between an initial position, wherein its other end is disposed to be engaged by a cassette being introduced into said apparatus, and a second position to which it is automatically displaced by the cassette when the cassette is in its operative position within said apparatus and wherein it effects a displacement of said first electrical contact into engagement with said second electrical contact;
a cassette ejection member mounted for displacement between an initial position wherein it restrains the movement of said second electrical contact in a direction away from said first electrical contact to position said second electrical contact in spaced apart relationship to said first electrical contact, and a second position wherein it exerts a force through said first and second electrical contacts to position said push rod in its said initial position to facilitate the ejection of a cassette operably mounted in said apparatus from said apparatus; and
a programming member mounted for displacement under the influence of said motor from an initial position prior to the energization of said apparatus through at least one other position during said predetermined sequence of operations and back to its said initial position, said programming member being operably associated with said ejection member so as to effect its displacement from its said initial position into its said second position as said programming member reaches its said other position thereby facilitating the ejection of the cassette from its operative position in said apparatus while maintaining said first and second electrical contacts in engagement, and so as to permit the subsequent return of said ejection member to its said initial position under the influence of said motor so that said second electrical contact moves out of engagement with said first electrical contact to deenergize said apparatus as said programming member returns from its said other position into its said initial position.

* * * * *